(12) United States Patent
Fujie et al.

(10) Patent No.: US 8,628,588 B2
(45) Date of Patent: Jan. 14, 2014

(54) COLORING COMPOSITION, INK FOR INKJET RECORDING AND INKJET RECORDING METHOD

(71) Applicant: FUJIFILM Corporation, Tokyo (JP)

(72) Inventors: Yoshihiko Fujie, Blackley (GB); Keiichi Tateishi, Blackley (GB); Clive Edwin Foster, Blackley (GB)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/906,486

(22) Filed: May 31, 2013

(65) Prior Publication Data

US 2013/0319287 A1   Dec. 5, 2013

(30) Foreign Application Priority Data

May 31, 2012   (JP) ................................. 2012-124656

(51) Int. Cl.
*C09B 67/10*   (2006.01)
*C09D 11/00*   (2006.01)

(52) U.S. Cl.
USPC .................. 8/637.1; 8/624; 8/642; 106/31.47

(58) Field of Classification Search
USPC .......................... 8/637.1, 624, 642; 106/31.47
See application file for complete search history.

(56) References Cited

U.S. PATENT DOCUMENTS

| | | | |
|---|---|---|---|
| 4,554,555 A | 11/1985 | Aruga et al. | |
| 2011/0232525 A1 | 9/2011 | Iseki et al. | |

FOREIGN PATENT DOCUMENTS

| | | | | |
|---|---|---|---|---|
| EP | 1333070 A1 | 8/2003 | | |
| EP | 1564258 A1 * | 8/2005 | .............. | C09B 11/24 |
| GB | 1503380 | 3/1978 | | |
| JP | 60190478 A | 9/1985 | | |
| JP | 2002533524 A | 10/2002 | | |
| JP | 2002533524 A5 | 8/2006 | | |
| JP | 2011195782 A | 10/2011 | | |
| WO | 0037574 A1 | 6/2000 | | |

OTHER PUBLICATIONS

STIC Search Report dated Aug. 1, 2013.*
Partial European Search Report, dated Oct. 2, 2013, issued by the European Patent Office in counterpart European Application No. 13169754.2.

* cited by examiner

*Primary Examiner* — Eisa Elhilo
(74) *Attorney, Agent, or Firm* — Sughrue Mion, PLLC

(57) ABSTRACT

There is provided a coloring composition containing: a compound represented by Formula (1) or Formula (4): and a copper compound that is soluble in water:
Formula (1) $D\text{-}(SO_3M)_4$ or Formula (4) $(L)_m\text{-}(D')_n$ wherein D, M, L, D', m and n are defined in the claims and in the specification.

16 Claims, No Drawings

COLORING COMPOSITION, INK FOR INKJET RECORDING AND INKJET RECORDING METHOD

CROSS-REFERENCE TO RELATED APPLICATION(S)

The present application claims priority from Japanese Patent Application No. 2012-124656 filed on May 31, 2012, the entire contents of which are incorporated herein by reference.

BACKGROUND

1. Field

The present invention relates to a compound having a xanthene structure, a coloring composition containing a copper compound, an ink for inkjet recording and an inkjet recording method.

2. Description of the Related Art

An inkjet recording method is a method of printing by dispersing an ink droplet and attaching it to a recording medium such as paper as known in the related art. By this printing method, it is possible to print a high-resolution and high-quality image conveniently at a high speed. In particular, in color printing, a technical development has been recently performed for an image forming method which can replace photographs.

In the case of forming a color image by using an inkjet recording method, it is common to use a yellow ink, a magenta ink, a cyan ink and a black ink. Conventionally, water-based inks have been mainly used as these inkjet inks in terms of safety, such as malodor and hazard associated with fire-fighting. These inks are required to fail within suitable ranges in viscosity, surface tension, and the like, to be excellent in nozzle clogging and storage stability, to impart a recording image at a high concentration, and to be excellent in light fastness, ozone fastness, water fastness and moisture fastness.

Such a performance is mostly satisfied by using a water-based ink containing water or a mixture of water and a water-soluble organic solvent as a main solvent. However, characteristics such as hue, brighteness, light fastness, ozone fastness, water fastness and moisture fastness are influenced considerably by colorants and additives, and various dyes have conventionally been studied.

As a water-based ink capable of realizing a recording image having excellent light fastness, an ink has been reported, which contains a specific metal compound in the ink. Japanese Patent Application Laid-Open No. 2002-533524 (hereinafter JP-A-2002-533524) discloses an ink composition containing a colorant and a specific metal salt. Japanese Patent Application Laid-Open No. 2011-195782 (hereinafter JP-A-2011-195782) discloses an ink composition containing a specific anthrapyridone-based dye and a copper compound that is soluble in water.

However, the inks described in JP-A-2002-533524 and JP-A-2011-195782 do not sufficiently exhibit all the performances such as hue, ozone fastness and light fastness, which are required for use as an inkjet ink.

An object of the present invention is to provide a coloring composition capable of improving light fastness without deteriorating hue and ozone fastness.

The present inventors have intensively studied for a coloring composition capable of improving light fastness without deteriorating hue and ozone fastness, and have found out that the above-mentioned problems can be solved by a coloring composition containing a coloring compound having a specific structure as exemplified below and a copper compound, which is not described in JP-A-2002-533524 and JP-A-2011-195782. Further, the present inventors have intensively studied and have fount out that an unexpected effect that the coloring composition has an excellent stability over time as well can be obtained.

SUMMARY

That is, the means to solve the problems is as follows. Further, in the present specification, "to" indicates a range including the numerical values described before and after "to" as a minimum value and a maximum value, respectively.

(1) A coloring composition containing: a compound represented by Formula (1) or Formula (4); and a copper compound that is soluble in water:

D-(-SO$_3$M)$_4$  Formula (1)

Formula (2)

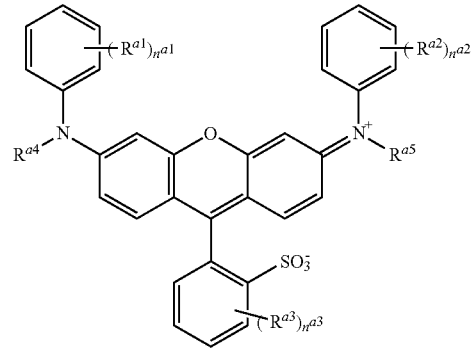

wherein, in Formula (1), D represents a residue structure in which four hydrogen atoms are removed from the compound represented by Formula (2), M represents a hydrogen atom or a counteraction, and a plurality of M may be the same or different, in Formula (2), $R^{a1}$, $R^{a2}$ and $R^{a3}$ each independently represent a monovalent substituent, $R^{a4}$ and $R^{a5}$ each independently represent a hydrogen atom or a monovalent substituent, $n^{a1}$ and $n^{a2}$ each independently represent the number of 0 to 5, and $n^{a3}$ represents the number of 0 to 4, and when $n^{a1}$, $n^{a2}$ and $n^{a3}$ each represent the number of 2 or more, a plurality of $R^{a1}$ may be the same or different, a plurality of $R^{a2}$ may be the same or different, and a plurality of $R^{a3}$ may be the same or different (hereinafter referred to as "each of pluralities of $R^{a1}$, $R^{a2}$ and $R^{a3}$ may be the same or different"):

(L)$_m$-(D')$_n$  Formula (4)

Formula (5)

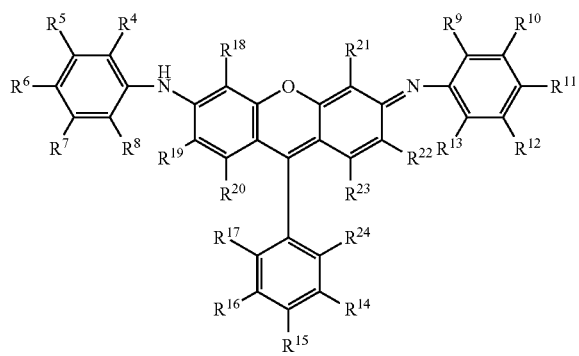

wherein in Formula (4), L represents a di- to tetravalent linking group, D' represents a residue structure in which one hydrogen atom is removed or two, three, four, or five hydrogen atoms are removed, from the compound represented by Formula (5), m represents an integer of 1 to 10, provided that a plurality of L may be the same or different when m represents an integer of 2 to 10, n represents an integer of 2 to 10, provided that a plurality of D' may be the same or different, in Formula (5), $R^4$ to $R^{24}$ each independently represent a hydrogen atom or a substituent, and Formula (5) has at least one ionic hydrophilic group.

(2) The coloring composition according to (1), wherein the compound represented by Formula (1) is a compound represented by Formula (3):

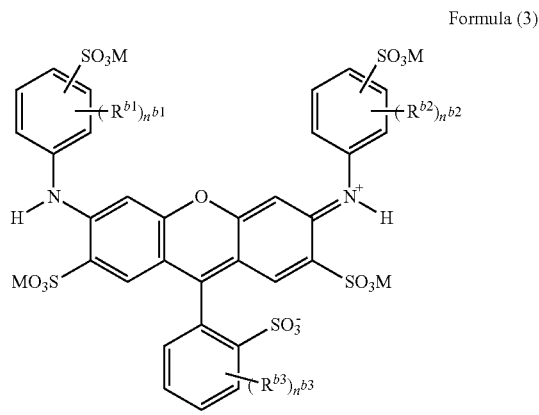

Formula (3)

wherein in Formula (3), $R^{b1}$, $R^{b2}$ and $R^{b3}$ each independently represent a monovalent $R^{b3}$ substituent; $n^{b1}$ and $n^{b2}$ each independently represent the number of 0 to 4, and $n^{b3}$ represents the number of 0 to 4; when $n^{b1}$, $n^{b2}$ and $n^{b3}$ each represent the number of 2 or more, each of pluralities of $R^{b1}$, $R^{b2}$ and $R^{b3}$ may be the same or different, and M represents a hydrogen atom or a counteraction, and a plurality of M may be the same or different.

(3) The coloring composition according to (1) or (2), wherein $R^{a1}$, $R^{a2}$, $R^{a3}$, $R^{b1}$, $R^{b2}$ and $R^{b3}$ each independently represent an alkyl group or an acylamino group.

(4) The coloring composition according to any one of (1) to (3), wherein $R^{a1}$, $R^{a2}$, $R^{a1}$, $R^{b1}$, $R^{b2}$ and $R^{b3}$ each independently represent an alkyl group having 1 to 6 carbon atoms.

(5) The coloring composition according to any one of (1) to (4), wherein $n^{a1}$, $n^{a2}$, $n^{b1}$ and $N^{b2}$ each independently represent the number of 2 to 4.

(6) The coloring composition according to any one of (1) to (5), wherein $n^{a3}$ and $n^{b3}$ represent 0.

(7) The coloring composition according to any one of (1) to (6), wherein M is one selected from the group consisting of lithium ion, a sodium ion, and a potassium ion.

(8) The coloring composition according to (1), wherein $R^4$, $R^8$, $R^9$ and $R^{13}$ in Formula (5) each independently represent a hydrogen atom or an alkyl group.

(9) The coloring composition according to (1) or (8), wherein $R^5$ to $R^7$, $R^{10}$ to $R^{12}$ and $R^{14}$ to $R^{23}$ in Formula (5) represent a hydrogen atom.

(10) The coloring composition according to (9), wherein D' represents a residue structure in which one hydrogen atom is removed or two, three, four, or five hydrogen atoms are removed, from the hydrogen atoms as $R^5$ to $R^7$, $R^{10}$ to $R^{12}$, $R^{19}$, $R^{22}$ or $R^{24}$ in the compound represented by Formula (5).

(11) The coloring composition according to any one of (1) to (10), wherein the copper compound is at least one kind selected from the group consisting of copper (II) chlorate, copper (II) chloride, copper (II) salicylate, copper (II) gluconate, copper (II) formate, copper (II) disodium ethylenediaminetetraacetate, and copper (II) acetate.

(12) The coloring composition according to any one of (1) to (11), wherein the compound represented by Formula (1) or Formula (4) is contained in an amount of 1% by mass to 20% by mass.

(13) The coloring composition according to any one of (1) to (12), wherein a mass ratio of a content of the compound represented by Formula (1) or Formula (4) to a content of the copper compound that is soluble in water is 350/1 to 7/3.

(14) An ink for inkjet recording containing the coloring composition according to any one of (1) to (13).

(15) An inkjet recording method containing forming an image by using the coloring composition according to any one of (1) to (13) or the ink for inkjet recording according to (14).

According to the present invention, it is possible to provide a coloring composition capable of improving light fastness without deteriorating hue and ozone fastness, and having excellent stability over time, an ink for inkjet recording and an inkjet recording method.

DETAILED DESCRIPTION OF INVENTION

Hereinafter, the present invention will be described in detail.

First, in the present invention, Group A of substituents will be defined.

(Group A of Substituents)

Examples may include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or arylsulfonylamino group, a mercapto group, an alkylthio group, an arylthio group, a heterocyclic thio group, a sulfamoyl group, an alkyl- or arylsulfinyl group, an alkyl- or arylsulfonyl group, an acyl group, an aryloxycarbonyl group, an alkoxycarbonyl group, a carbamoyl group, an aryl- or heterocyclic azo group, an imide group, a phosphino group, a phosphinyl group, a phosphinyloxy group, a phosphinylamino group, a silyl group and an ionic hydrophilic group. These substituents may be further substituted, and the further substituent may be exemplified by Group A of substituents as described above.

Examples of the halogen atom may include a fluorine atom, a chlorine atom, a bromine atom or an iodine atom.

Examples of the alkyl group may include a straight, branched or cyclic, substituted or unsubstituted alkyl group, including a cycloalkyl group, a bicycloalkyl group and a tricycle structure which has more cyclic structures. The alkyl group (for example, an alkyl group in an alkoxy group or an alkylthio group) in substituents as described below also represents an alkyl group of such a concept.

Examples of the alkyl group may include preferably an alkyl group having 1 to 30 carbon atoms, such as a methyl group, an ethyl group, an n-propyl group, an i-propyl group, a t-butyl group, a n-octyl group, an eicosyl group, a 2-chloroethyl group, 2-cyanoethyl group and a 2-ethylhexyl group.

Examples of the cycloalkyl group may include preferably a substituted or unsubstituted cycloalkyl group having 3 to 30 carbon atoms, such as a cyclohexyl group, a cyclopentyl group and a 4-n-dodecylcyclohexyl group. Examples of the bicycloalkyl group may include preferably a substituted or unsubstituted bicycloalkyl group having 5 to 30 carbon atoms, that is, a monovalent group in which one hydrogen atom is removed from a bicyloalkane having 5 to 30 carbon atoms, such as a bicyclo[1,2,2]heptan-2-yl group and a bicyclo[2,2,2]octan-3-yl group.

Examples of the aralkyl group may include a substituted or unsubstituted aralkyl group, and examples of the substituted or unsubstituted aralkyl group may include preferably an aralkyl group having 7 to 30 carbon atoms. Examples thereof may include a benzyl group and a 2-phenethyl group.

Examples of the alkenyl group may include a straight, branched or cyclic, substituted or unsubstituted alkenyl group, including a cycloalkenyl group and a bicycloalkenyl group.

Examples of the alkenyl group may include a substituted or unsubstituted alkenyl group having 2 to 30 carbon atoms, such as a vinyl group, an allyl group, a prenyl group, a geranyl group and an oleyl group. Examples of the cycloalkenyl group may include preferably a substituted or unsubstituted cycloalkenyl group having 3 to 30 carbon atoms, that is, a monovalent group in which one hydrogen atom is removed from a cycloalkene having 3 to 30 carbon atoms, such as a 2-cyclopenten-1-yl group and a 2-cyclohexen-1-yl group. Examples of the bicycloalkenyl group may include a substituted or unsubstituted bicycloalkenyl group, preferably a substituted or unsubstituted bicycloalkenyl group having 5 to 30 carbon atoms, that is, a monovalent group in which one hydrogen atom is removed from a bicycloakene having one double bond, such as a bicyclo[2,2,1]hept-2-en-1-yl group and a bicyclo[2,2,2]oct-2-en-4-yl group.

Examples of the alkynyl group may include preferably a substituted or unsubstituted alkynyl group having 2 to 30 carbon atoms, such as an ethynyl group, a propargyl group and a trimethylsilylethynyl group.

Examples of the aryl group may include preferably a substituted or unsubstituted aryl group having 6 to 30 carbon atoms, such as a phenyl group, a p-tolyl group, a naphthyl group, a m-chlorophenyl group and an o-hexadecanoylaminophenyl group.

Examples of the heterocyclic group may include preferably a monovalent group in which one hydrogen atom is removed from a 5- or 6-membered substituted or unsubstituted aromatic or non-aromatic hetrocyclic compound, more preferably a 5- or 6-membered aromatic heterocyclic group having 3 to 30 carbon atoms, such as a 2-furyl group, a 2-thienyl group, a 2-pyrimidinyl group and a 2-benzothiazolyl group.

Examples of the alkoxy group may include a substituted or unsubstituted alkoxy group having 1 to 30 carbon atoms, such as a methoxy group, an ethoxy group, an isopropoxy group, a t-butoxy group, a n-octyloxy group and a 2-methoxyethoxy group.

Examples of the aryloxy group may include preferably a substituted or unsubstituted aryloxy group having 6 to 30 carbon atoms, such as a phenoxy group, a 2-methylphenoxy group, a 4-t-butylphenoxy group, a 3-nitrophenoxy group and a 2-tetradecanoylaminophenoxy group.

Examples of the silyloxy group may include preferably a substituted or unsubstituted silyloxy group having 0 to 20 carbon atoms, such as a trimethylsilyloxy group and a diphenylmethylsilyloxy group.

Examples of the heterocyclic oxy group may include preferably a substituted or unsubstituted heterocyclic oxy group having 2 to 30 carbon atoms, such as a 1-phenyltetrazol-5-oxy group and a 2-tetrahydropyranyloxy group.

Examples of the acyloxy group may include preferably a formyloxy group, a substituted or unsubstituted alkylcarbonyloxy group having 2 to 30 carbon atoms and a substituted or unsubstituted arylcarbonyloxy group having 6 to 30 carbon atoms, such as an acetyloxy group, a pivaloyloxy group, a stearoyloxy group, a benzoyloxy group and a p-methoxyphenylcarbonyloxy group.

Examples of the carbamoyloxy group may include preferably a substituted or unsubstituted carbamoyloxy group having 1 to 30 carbon atoms, such as an N,N-dimethylcarbamoyloxy group, an N,N-diethylcarbamoyloxy group, a morpholinocarbonyloxy group, an N,N-di-n-octylaminocarbonyloxy group and an N-n-octylcarbamoyloxy group.

Examples of the alkoxycarbonyloxy group may include preferably a substituted or unsubstituted alkoxycarbonyloxy group having 2 to 30 carbon atoms, such as a methoxycarbonyloxy group, an ethoxycarbonyloxy group, a t-butoxycarbonyloxy group and a n-octylcarbonyloxy group.

Examples of the aryloxycarbonyloxy group may include preferably a substituted or unsubstituted aryloxycarbonyloxy group having 7 to 30 carbon atoms, such as a phenoxycarbonyloxy group, a p-methoxyphenoxycarbonyloxy group and a p-n-hexadecyloxyphenoxycarbonyloxy group.

Examples of the amino group may include an alkylamino group, an arylamino group and a heterocyclic amino group, preferably an amino group, a substituted or unsubstituted alkylamino group having 1 to 30 carbon atoms and a substituted or unsubstituted anilino group having 6 to 30 carbon atoms, such as a methylamino group, a dimethylamino group, an anilino group, an N-methyl-anilino group, a diphenylamino group and a triazinylamino group.

Examples of the acylamino group may include preferably a formylamino group, a substituted or unsubstituted alkylcarbonylamino group having 1 to 30 carbon atoms and a substituted or unsubstituted arylcarbonylamino group having 6 to 30 carbon atoms, such as an acetylamino group, a pivaloylamino group, a lauroylamino group, a benzoylamino group and a 3,4,5-tri-n-octyloxyphenyl carbonylamino group.

Examples of the aminocarbonylamino group may include preferably a substituted or unsubstituted aminocarbonylamino group having 1 to 30 carbon atoms, such as a carbamoyl amino group, an N,N-dimethylaminocarbonylamino group, an N,N-diethylaminocarbonylamino group and a morpholinocarbonylamino group.

Examples of the alkoxycarbonylamino group may include preferably a substituted or unsubstituted alkoxycarbonylamino group having 2 to 30 carbon atoms, such as a methoxycarbonylamino group, an ethoxycarbonylamino group, a t-butoxycarbonylamino group, a n-octadecyloxycarbonylamino group and an N-methyl-methoxycarbonylamino group.

Examples of the aryloxycarbonylamino group may include preferably a substituted or unsubstituted aryloxycarbonylamino group having 7 to 30 carbon atoms, such as a phenoxycarbonylamino group, a p-chlorophenoxycarbonylamino group and a m-n-octyloxyphenoxycarbonylamino group.

Examples of the sulfamoylamino group may include preferably a substituted or unsubstituted sulfamoylamino group having 0 to 30 carbon atoms, such as a sulfamoylamino group, an N,N-dimethylaminosulfonylamino group and an N-n-octylaminosulfonylamino group.

Examples of the alkyl- or arylsulfonylamino group may include a substituted or unsubstituted alkylsulfonylamino group having 1 to 30 carbon atoms and a substituted or unsubstituted arylsulfonylamino group having 6 to 30 carbon atoms, such as a methylsulfonylamino group, a butylsulfonylamino group, a phenylsulfonylamino group, a 2,3,5-trichlorophenylsulfonylamino group and a p-methylphenylsulfonylamino group.

Examples of the alkylthio group may include preferably a substituted or unsubstituted alkylthio group having 1 to 30 carbon atoms, such as a methylthio group, an ethylthio group and a n-hexadecylthio group.

Examples of the arylthio group may include preferably a substituted or unsubstituted arylthio group having 6 to 30 carbon atoms, such as a phenylthio group, a p-chlorophenylthio group and a m-methoxyphenylthio group.

Examples of the heterocyclic thio group may include preferably a substituted or unsubstituted heterocyclic thio group having 2 to 30 carbon atoms, such as a 2-benzothiazolylthio group and a 1-phenyltetrazol-5-ylthio group.

Examples of the sulfamoyl group may include preferably a substituted or unsubstituted sulfamoyl group having 0 to 30 carbon atoms, such as an N-ethylsulfamoyl group, an N-(3-dodecyloxypropyl)sulfamoyl group, an N,N-dimethylsulfamoyl group, an N-acetylsulfamoyl group, an N-benzoylsulfamoyl group and an N—(N'-phenylcarbamoyl)sulfamoyl group.

Examples of the alkyl- or arylsulfinyl group may include preferably a substituted or unsubstituted alkylsulfinyl group having 1 to 30 carbon atoms and a substituted or unsubstituted arylsulfinyl group having 6 to 30 carbon atoms, such as a methylsulfinyl group, an ethylsulfinyl group, a phenylsulfinyl group and a p-methylphenylsulfinyl group.

Examples of the alkyl- or arylsulfonyl group may include preferably a substituted or unsubstituted alkylsulfonyl group having 1 to 30 carbon atoms and a substituted or unsubstituted arylsulfonyl group having 6 to 30 carbon atoms, such as a methylsulfonyl group, an ethylsulfonyl group, a phenylsulfonyl group and a p-methylphenylsulfonyl group.

Examples of the acyl group may include preferably a formyl group, a substituted or unsubstituted alkylcarbonyl group having 2 to 30 carbon atoms, a substituted or unsubstituted arylcarbonyl group having 7 to 30 carbon atoms, a substituted or unsubstituted heterocyclic carbonyl group having 2 to 30 carbon atoms which is bound via a carbon atom to a carbonyl group, such as an acetyl group, a pivaloyl group, a 2-chloroacetyl group, a stearoyl group, a benzoyl group, a p-n-octyloxyphenylcarbonyl group, a 2-pyridylcarbonyl group and a 2-furylcarbonyl group.

Examples of the aryloxycarbonyl group may include preferably a substituted or unsubstituted aryloxycarbonyl group having 7 to 30 carbon atoms, such as a phenoxycarbonyl group, an o-chlorophenoxycarbonyl group, a m-nitrophenoxycarbonyl group and a p-t-butylphenoxycarbonyl group.

Examples of the alkoxycarbonyl group may include preferably a substituted or unsubstituted alkoxycarbonyl group having 2 to 30 carbon atoms, such as a methoxycarbonyl group, an ethoxycarbonyl group, a t-butoxycarbonyl group and a n-octadecyloxycarbonyl group.

Examples of the carbamoyl group may include preferably a substituted or unsubstituted carbamoyl group having 1 to 30 carbon atoms, such as a carbamoyl group, an N-methylcarbamoyl group, an N,N-dimethylcarbamoyl group, an N,N-di-n-octylcarbamoyl group and an N-(methylsulfonyl)carbamoyl group.

Examples of the aryl- or heterocyclic azo group may include preferably a substituted or unsubstituted arylazo group having 6 to 30 carbon atoms and a substituted or unsubstituted heterocyclic azo group having 3 to 30 carbon atoms, such as phenylazo, p-chlorophenylazo and 5-ethylthio-1,3,4-thiadiazol-2-ylazo.

Examples of the imide group may include preferably an N-succinimide group and an N-phthalimide group.

Examples of the phosphino group may include preferably a substituted or unsubstituted phosphino group having 0 to 30 carbon atoms, such as a dimethylphosphino group, a diphenylphosphino group and a methylphenoxyphosphino group.

Examples of the phosphinyl group may include preferably a substituted or unsubstituted phosphinyl group having 0 to 30 carbon atoms, such as a phosphinyl group, a dioctyloxyphosphinyl group and a diethoxyphosphinyl group.

Examples of the phosphinyloxy group may include preferably a substituted or unsubstituted phosphinyloxy group having 0 to 30 carbon atoms, such as a diphenoxyphosphinyloxy group and a dioctyloxyphosphinyloxy group.

Examples of the phosphinylamino group may include preferably a substituted or unsubstituted phosphinylamino group having 0 to 30 carbon atoms, such as a dimethoxyphosphinylamino group and a dimethylaminophosphinylamino group.

Examples of the silyl group may include preferably a substituted or unsubstituted silyl group having 0 to 30 carbon atoms, such as a trimethylsilyl group, a t-butyldimethylsilyl group and a phenyldimethylsilyl group.

Examples of the ionic hydrophilic group may include a sulfo group, a carboxyl group, a thiocarboxyl group, a sulfino group, a phosphono group, a dihydroxyphosphino group, a quaternary ammonium group and the like. The ionic hydrophilic group is particularly preferably a sulfo group or a carboxyl group. Further, the carboxyl group, the phosphono group and the sulfo group may be in a form of a salt, and the paired cation which forms a salt includes an ammonium ion, an alkali metal ion (for example, a lithium ion, a sodium ion and a potassium ion) and an organic cation (for example, a tetramethylammonium ion, a tetramethylguanidium ion and tetramethylphosphonium), and is preferably a lithium salt, a sodium salt, a potassium salt or an ammonium salt.

Further, in the present invention, when the compound is a salt, the salt is dissociated in a water soluble ink, and is present as ions.

The present invention relates to a coloring composition containing a compound represented by the following Formula (1) or the following Formula (4), and a copper composition that is soluble in water.

$$D\text{—}(SO_3M)_4 \qquad \text{Formula (1)}$$

Formula (2)

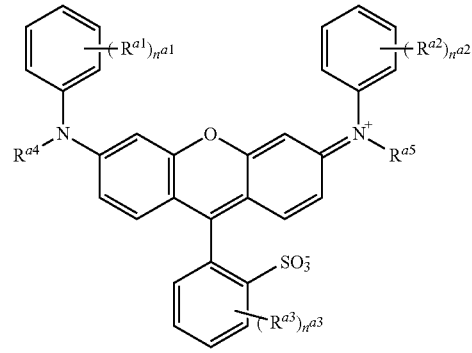

In Formula (1), D represents a residue structure in which four hydrogen atoms are removed from the compound represented by Formula (2).

M represents a hydrogen atom or a countercation. A plurality of M may be the same or different.

In Formula (2), $R^{a1}$, $R^{a2}$ and $R^{a3}$ each independently represent a monovalent substituent, $R^{a4}$ and $R^{a5}$ each independently represent a hydrogen atom or a monovalent substituent, $n^{a1}$ and $n^{a2}$ each independently represent the number of 0 to 5, and $n^{a3}$ represents the number of 0 to 4. When $n^{a1}$, $n^{a2}$ and $n^{a3}$ each represents the number of 2 or more, each of pluralities of $R^{a1}$, $R^{a2}$ and $R^{a3}$ may be the same or different.

$$(L)_m\text{-}(D')_n \quad \text{Formula (4)}$$

$$\text{Formula (5)}$$

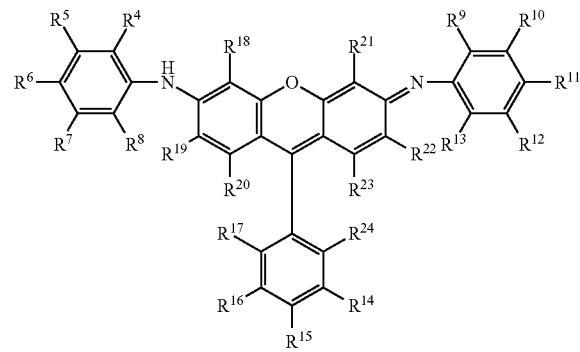

In Formula (4), L represents a di- to tetravalent linking group.

D' represents a residue structure in which one to five hydrogen atoms are removed from the compound represented by Formula (5).

m represents an integer of 1 to 10, provided that a plurality of L may be the same or different when m represents an integer of 2 to 10.

n represents an integer of 2 to 10, provided that a plurality of D' may be the same or different.

In Formula (5), $R^4$ to $R^{24}$ each independently represent a hydrogen atom or a substituent. Formula (5) has at least one ionic hydrophilic group.

[Compound Represented by Formula (1)]

Hereinafter, the compound represented by Formula (1) will be described.

$$D\text{-}(SO_3M)_4 \quad \text{Formula (1)}$$

In Formula (1), D represents a residue structure in which four hydrogen atoms are removed from the compound represented by the following Formula (2).

M represents a hydrogen atom or a countercation. A plurality of M may be the same or different.

$$\text{Formula (2)}$$

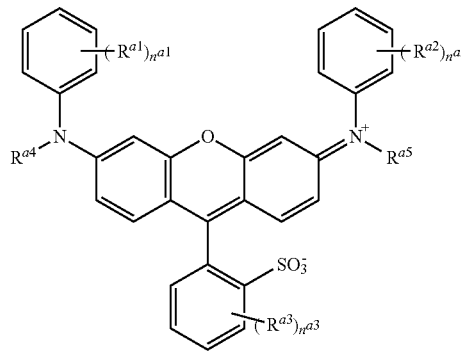

In Formula (2), $R^{a1}$, $R^{a2}$ and $R^{a3}$ each independently represent a monovalent substituent, $R^{a4}$ and $R^{a5}$ each independently represent a hydrogen atom or a monovalent substituent, $n^{a1}$ and $n^{a2}$ each independently represent the number of 0 to 5, and $n^{a3}$ represents the number of 0 to 4. When $n^{a1}$, $n^{a2}$ and $n^{a3}$ each represents the number of 2 or more, each of pluralities of $R^{a1}$, $R^{a2}$ and $R^{a3}$ may be the same or different.

The compound represented by Formula (1) is a xanthene dye in which four hydrogen atoms are substituted by sulfo groups in the compound represented by Formula (2), and it is considered that the compound is excellent in hue, and further, becomes a dye having particularly excellent ozone fastness and light fastness due to the electron-withdrawing property possessed by the sulfo groups.

In Formula (2), $R^{a1}$, $R^{a2}$ and $R^{a3}$ each independently represent a monovalent substituent.

The monovalent substituent represented by $R^{a1}$, $R^{a2}$ and $R^{a3}$ may be exemplified by Group A of substituents, and is preferably a halogen atom, an aryl group, an alkoxy group, an alkyl group or an acylamino group, more preferably an alkyl group or an acylamino group, and still more preferably an alkyl group, from the viewpoint of the availability of raw materials and the ease of synthesis.

When $R^{a1}$, $R^{a2}$ and $R^{a3}$ represent an alkyl group, the alkyl group is preferably an alkyl group having 1 to 6 carbon atoms, and more preferably an alkyl group having 1 to 3 carbon atoms from the viewpoint of the availability of raw materials. Further, a straight or branched alkyl group is preferred. Particular examples of the alkyl group may include a methyl group, an ethyl group, a n-propyl group, an i-propyl group, a t-butyl group and the like, preferably a methyl group, an ethyl group or an i-propyl group, more preferably a methyl group or an ethyl group, and still more preferably a methyl group.

The alkyl group may have a substituent, and examples of the substituent may include a halogen atom, a hydroxyl group and the like.

The alkyl group is preferably an unsubstituted alkyl group.

When $R^{a1}$, $R^{a2}$ and $R^{a3}$ represent an acylamino group, the acyl group in the acylamino group is preferably an aliphatic acyl group, and more preferably an aliphatic acyl group having 2 to 6 carbon atoms from the viewpoint of the availability of raw materials and the color strength. Particular examples thereof may include an acetylamino group, a propionylamino group, a butyrylamino group and the like, and particularly preferably an acetylamino group.

The acylamino group is preferably a monoacylamino group.

In Formula (2), $R^{a4}$ and $R^{a5}$ each independently represent a hydrogen atom or a monovalent substituent.

When $R^{a4}$ and $R^{a5}$ represents a monovalent substituent, the monovalent substituent may be exemplified by Group A of substituents, and is preferably a substituted or unsubstituted alkyl group, and more preferably unsubstituted alkyl group.

From the viewpoint of the ozone fastness, $R^{a4}$ and $R^{a5}$ is preferably a hydrogen atom.

In Formula (2), $n^{a1}$ and $n^{a2}$ each independently represent the number of 0 to 5. From the viewpoint of the availability of raw materials and the ease of synthesis, $n^{a1}$ and $n^{a2}$ are preferably the number of 1 to 5, more preferably the number of 2 to 5, still more preferably the number of 2 to 4, and particularly preferably 2 or 3.

When $n^{a1}$ and $n^{a2}$ each represents the number of 2 or more, each of pluralities of $R^{a1}$ and $R^{a2}$ may be the same or different.

In Formula (2), $n^{a3}$ represents the number of 0 to 4. From the availability of raw materials, $n^{a3}$ is preferably the number of 0 to 3, more preferably the number of 0 to 2, still more preferably 0 or 1, and particularly preferably 0.

When $n^{a3}$ represents the number of 2 or more, a plurality of $R^{a3}$ may be the same or different.

In Formula (1), M represents a hydrogen atom or a countercation. A plurality of M may be the same or different.

In Formula (1), when M is a hydrogen atom, it is in a form of free acid, and when M is a countercation, it is in a form of a salt.

Examples of the countercation that forms a salt may include a monovalent countercation, and preferably an alkali metal ion, an ammonium ion, an organic cation and the like.

Examples of the organic cation may include a tetramethylammonium ion, a tetramethylguanidium ion, tetramethylphosphonium and the like.

From the viewpoint of the availability of raw materials, the water solubility of the dye, and the suppression of gloss generation when forming a secondary color with other dyes in a case of using as an inkjet ink, the countercation is preferably an alkali metal ion, and more preferably a lithium ion, a sodium ion or a potassium ion. Particularly, a sodium ion is preferred because it is inexpensive.

In the present invention, the compound represented by Formula (1) is preferably in a form of a salt, more preferably a lithium salt, a sodium salt or a potassium salt, and still more preferably a sodium salt from the viewpoint of the ease of synthesis (ease of handling as dye powder).

In Formula (1), a plurality of M may be the same or different. That is, the compound represented by Formula (1) in a form of a salt includes a case where all sulfo groups are salts, and a case where some sulfo groups are in a form of free acid and some sulfo groups are salts. Further, the countercation forming a salt may be present either alone or in plurality.

In the present invention, the compound represented by Formula (1) is preferably in a form of a salt, and more preferably a case where all sulfo groups are salts from the viewpoint of the ease of synthesis (ease of handling as dye powder).

The compound represented by Formula (1) is preferably a compound represented by Formula (3).

It is considered that the compound represented by Formula (3) is particularly excellent from the viewpoint of the ozone fastness because it is possible to suppress oxidative gas (oxygen or ozone) from attacking a nitrogen atom by the steric hindrance of a sulfo group introduced in the vicinity of the nitrogen atom.

Formula (3)

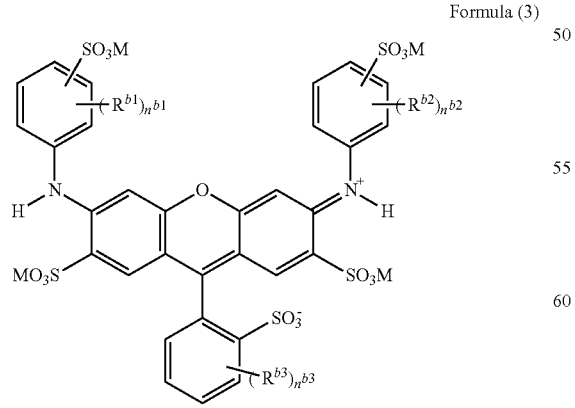

In Formula (3), $R^{b1}$, $R^{b2}$ and $R^{b3}$ each independently represent a monovalent substituent, $n^{b1}$ and $n^{b2}$ each independently represent the number of 0 to 4, and $n^{b3}$ represents the number of 0 to 4. When $n^{b1}$, $n^{b2}$ and $n^{b3}$ each represents the number of 2 or more, each of pluralities of $R^{b1}$, $R^{b2}$ and $R^{b3}$ may be the same or different. M represents a hydrogen atom or a countercation. A plurality of M may be the same or different.

Specific examples and preferred ranges of $R^{b1}$, $R^{b2}$, $R^{b3}$, $n^{b3}$ and M in formula (3) are the same as the specific examples and preferred ranges of $R^{a1}$, $R^{a2}$, $R^{a3}$, $n^{a3}$ and M in Formula (2).

$n^{b1}$ and $n^{b2}$ each independently represent the number of 0 to 4, and from the viewpoint of the availability of raw materials and the ease of synthesis, is preferably the number of 1 to 4, more preferably the number of 2 to 4, and still more preferably 2 or 3.

Specific examples of the compound represented by Formula (1) are shown below, but the compound is not limited thereto. Further, in the following specific examples, Me denotes a methyl group, Et denotes an ethyl group, i-Pr denotes an isopropyl group, t-Bu denotes a tertiary butyl(tert-butyl) group, and Ac denotes an acetyl group.

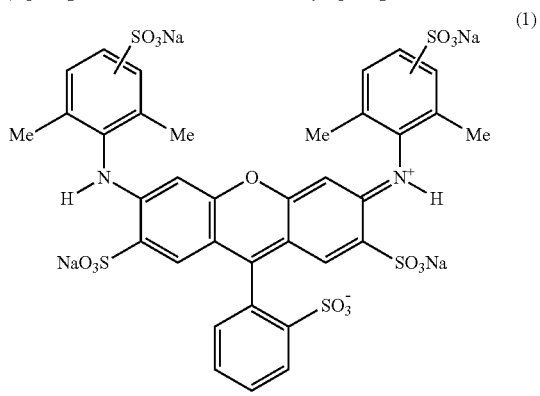

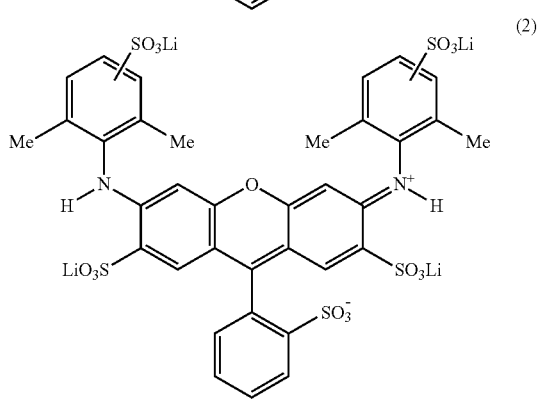

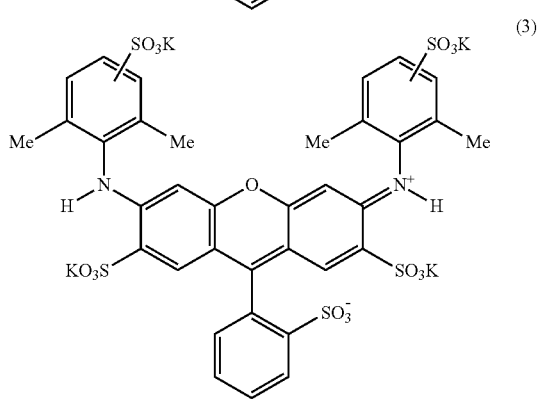

(4)
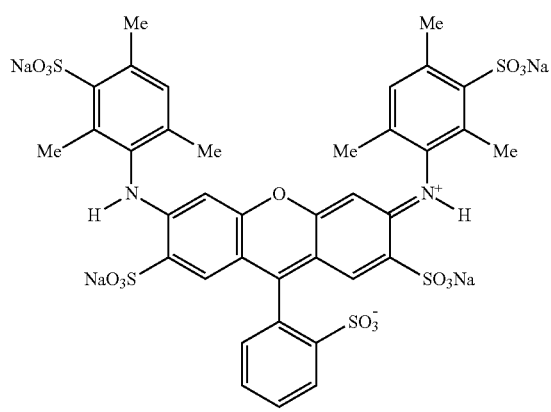
(5)
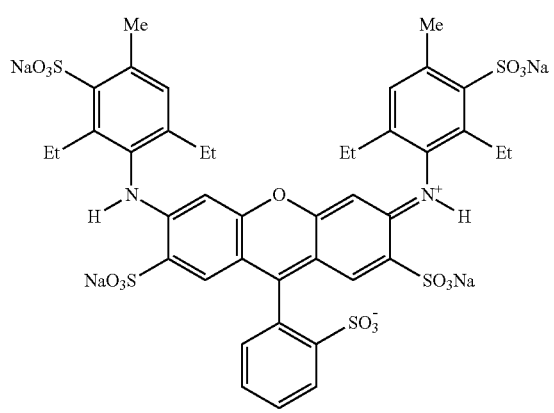
(6)
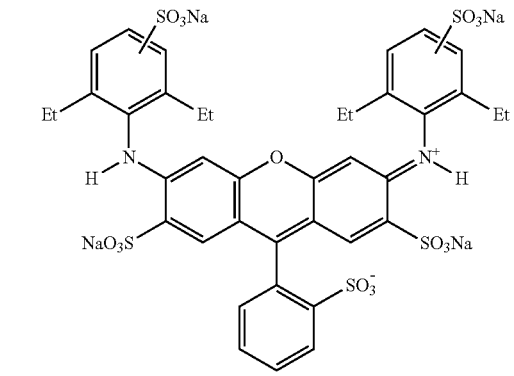
(7)
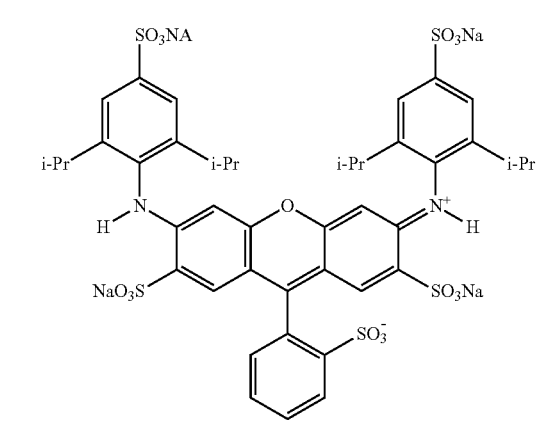
(8)
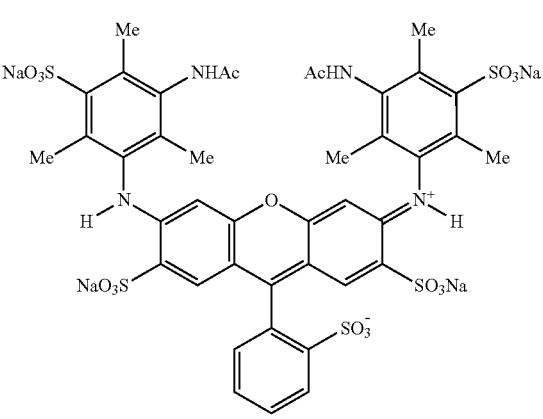
(9)
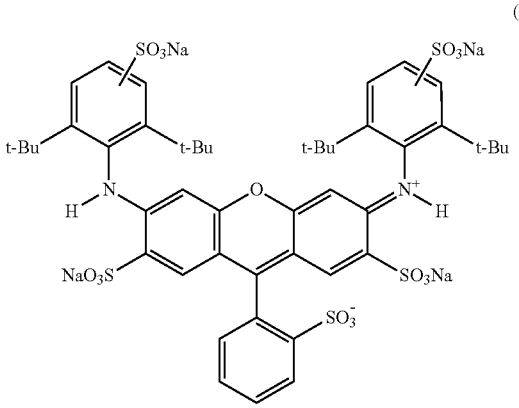
(10)
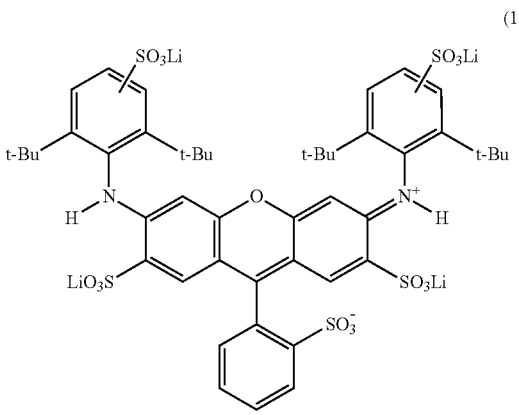
(11)
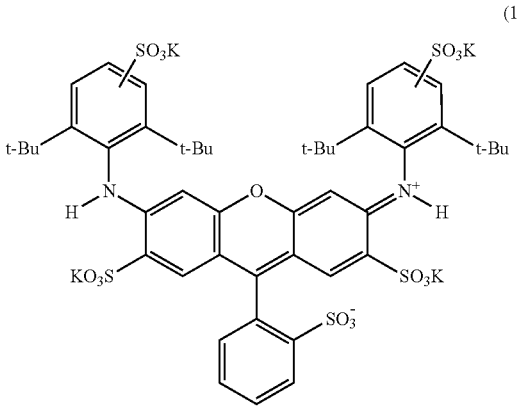

(12)
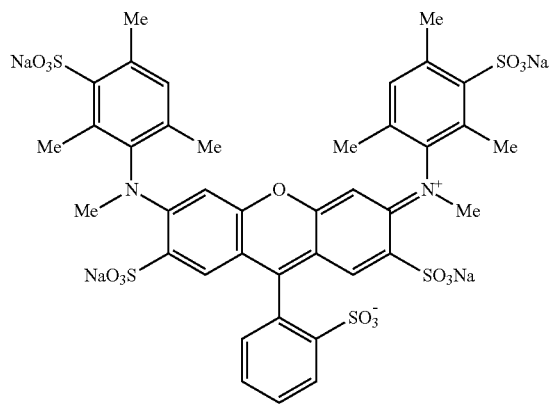
(15)
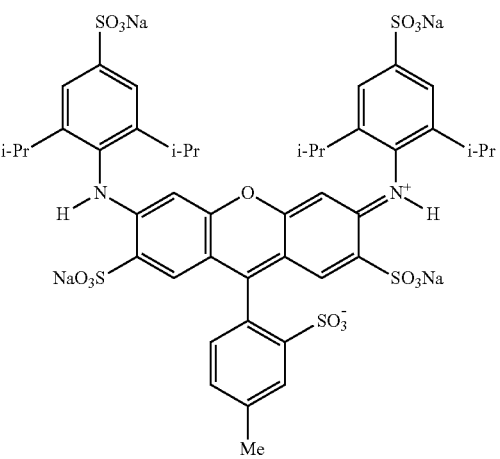
(13)
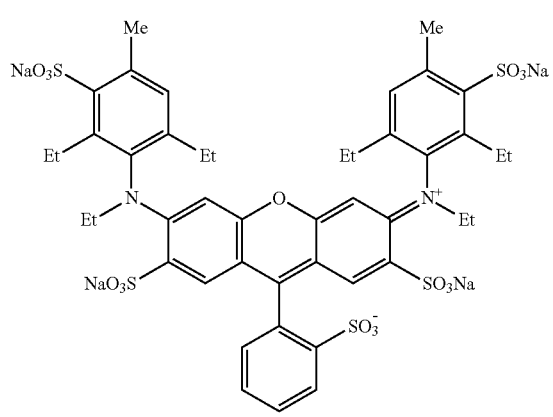
(16)
(14)
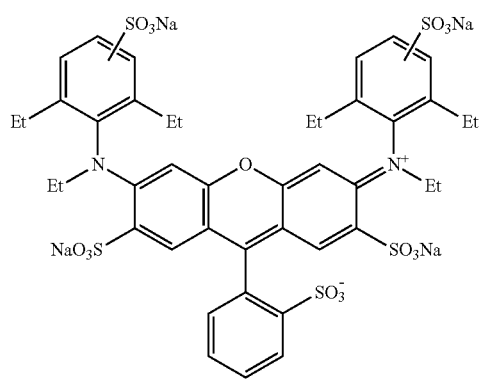
(17)
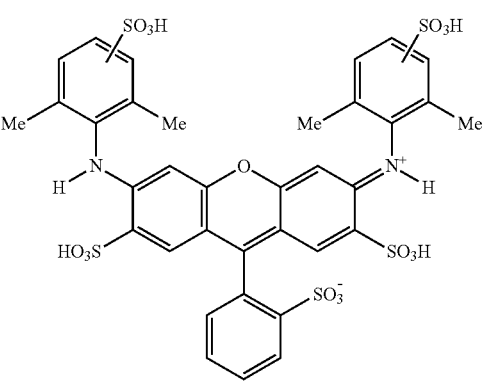

(18)
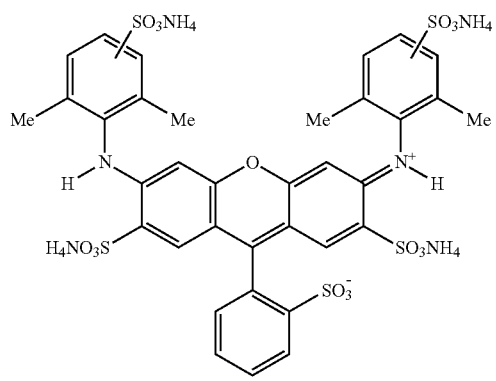

(19)
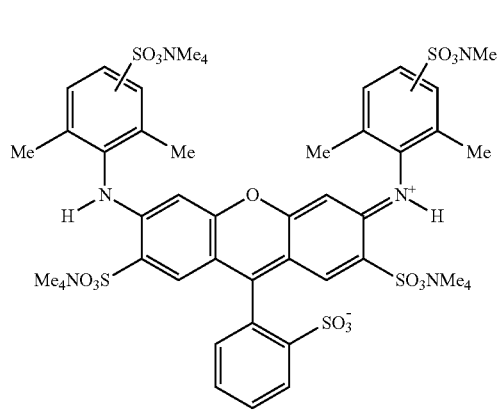

(20)
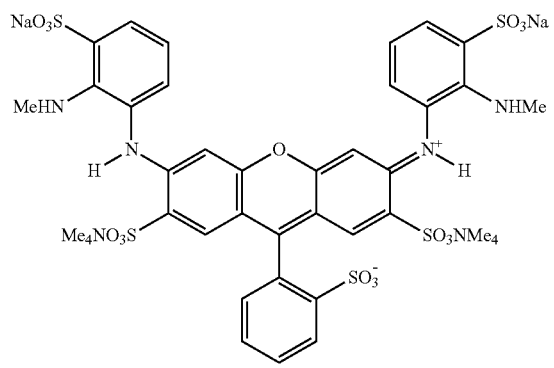

(21)
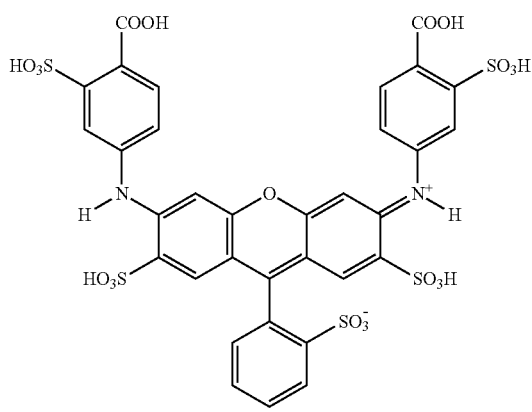

(22)
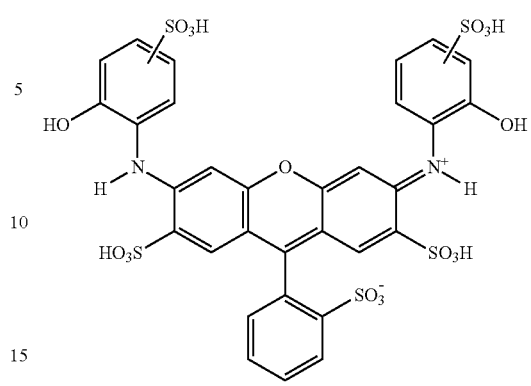

(23)
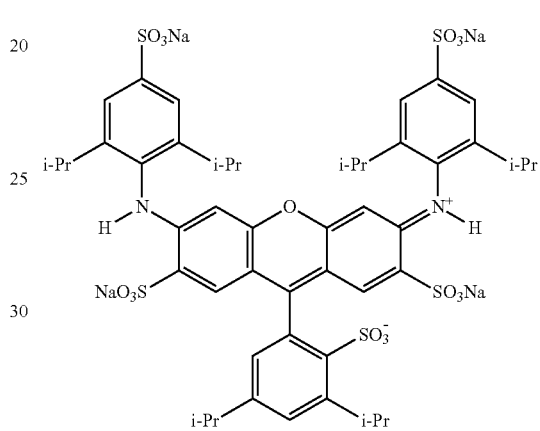

(24)
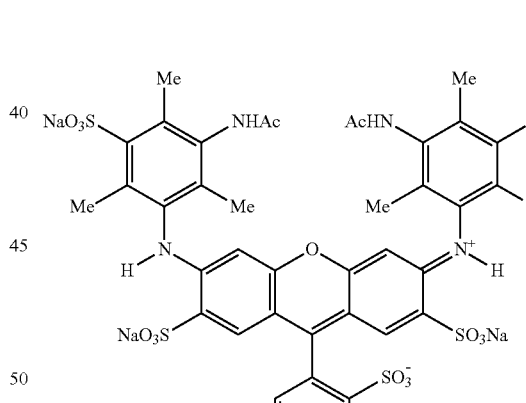

The synthesis of the compound represented by Formula (1) will be described.

The compound can be synthesized by synthesizing a xanthene dye in accordance to the synthesis of a xanthene dye known in the related art or using a commercially available xanthene dye, and chlorosulfonating by combination of chlorosulfonic acid/phosphorous oxychloride, and then alkaline hydrolyzing (see the scheme below).

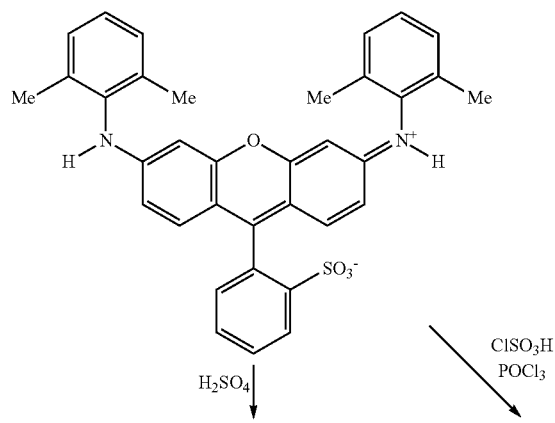

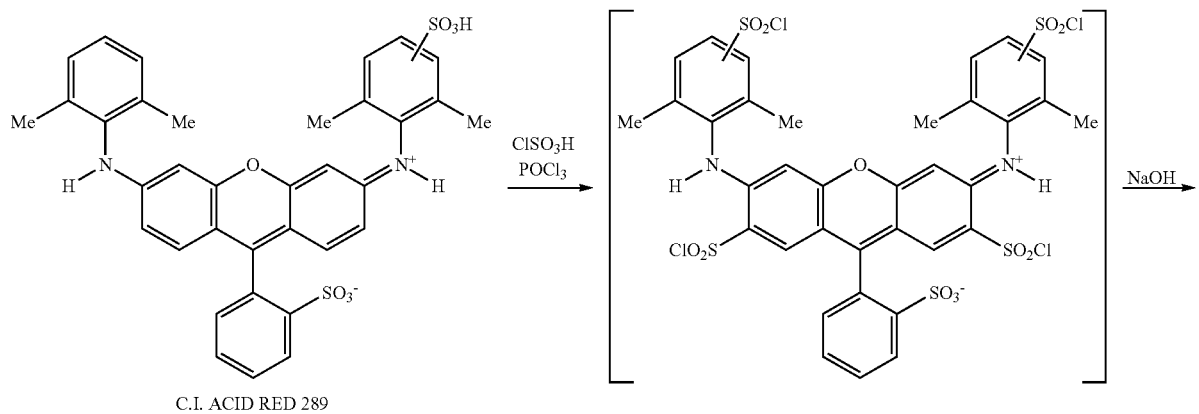

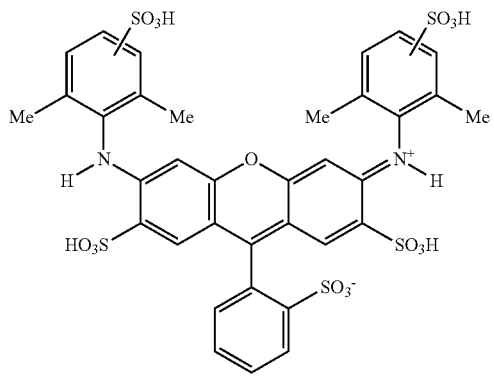

[Compound Represented by Formula (4)]

Next, the compound represented by Formula (4) will be described.

The compound represented by Formula (4) includes the compound, and a salt and a hydrate thereof.

Since the compound represented by Formula (4) contains a plurality of specific xanthene derivative structures, its mechanism is not clear, but the image fastness, such as light fastness and ozone gas fastness, is excellent. Further, multimerization via a linking group L exhibits effects that the molecular weight is increased so as to suppress molecular migration under high humidity condition, thereby resulting in excellent moisture fastness as well.

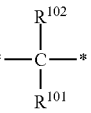

Formula (4)

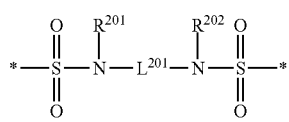

Formula (5)

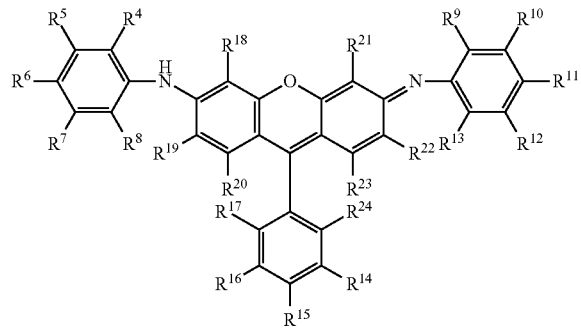

In Formula (4), L represents a di- to tetravalent linking group.

D' represents a residue structure in which one to five hydrogen atoms are removed from the compound represented by Formula (5).

m represents an integer of 1 to 10, provided that a plurality of L may be the same or different when m represents an integer of 2 to 10.

n represents an integer of 2 to 10, provided that a plurality of D' may be the same or different.

In Formula (5), $R^4$ to $R^{24}$ each independently represent a hydrogen atom or a substituent. Formula (5) has at least one ionic hydrophilic group.

m represents an integer of 1 to 10, preferably an integer of 1 to 8, more preferably an integer of 1 to 6, still more preferably an integer of 1 to 4, and particularly preferably an integer of 1 to 3. By setting m within this range, it is possible to improve the moisture fastness while maintaining the solubility and suppressing the head clogging in inkjet printing.

n represents an integer of 2 to 10, preferably an integer of 2 to 8, more preferably an integer of 2 to 6, and still more preferably an integer of 2 to 4. By setting n within this range, it is possible to improve the moisture fastness while maintaining the solubility and suppressing the head clogging in inkjet printing.

In Formula (4), L represents a di- to tetravalent linking group. Examples of the di- to teteravalent linking group may include an oxy group (—O—), a thio group (—S—), a carbonyl group (—CO—), a sulfonyl group (—SO$_2$—), an imino group (—NH—), a methylene group (—CH$_2$—), an arylene group, a cycloalkylene group, a heteroarylene group, ethylen-1,2-diyl group (—CH═CH—) and a group formed by combining these groups, and more preferably a group including a sulfonyl group (—SO$_2$—), an imino group (—NH—), a methylene group (—CH$_2$—), an ethylen-1,2-diyl group (—CH═CH—), an arylene group and a heteroarylene group.

L is still more preferably a divalent linking group.

L may have a substituent, and when having a substituent, examples of the substituent may be exemplified by Group A of substituents, preferably an alkyl group, an aryl group, a heterocyclic group, an alkylamino group, an arylamino group or an ionic hydrophilic group, and more preferably an arylamino group or an ionic hydrophilic group. These groups may be further substituted with Group A of substituents, and preferably substituted with an ionic hydrophilic group.

L is preferably a linking group represented by the following Formula (V1), (V2), (V3) or (V4).

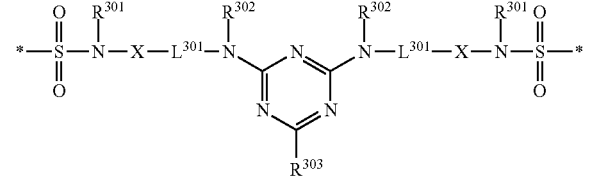

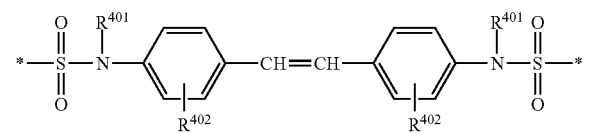

In Formula (V1), $R^{101}$ and $R^{102}$ each independently represent a hydrogen atom or a substituent.

In Formula (V2), $R^{201}$ and $R^{202}$ each independently represent a hydrogen atom or a substituent, and $L^{201}$ represents a divalent linking group.

In Formula (V3), $R^{301}$, $R^{302}$ and $R^{303}$ each independently represent a hydrogen atom or a substituent, X represents an alkylene group having 2 to 20 carbon atoms which may have a substituent, and $L^{301}$ represents a single bond or a divalent linking group.

In Formula (V4), $R^{401}$ and $R^{402}$ each independently represent a hydrogen atom or a substituent.

In Formula (V1), $R^{101}$ and $R^{102}$ each independently represent a hydrogen atom or a substituent, preferably a hydrogen atom or Group A of substituents, more preferably a hydrogen atom, an alkyl group or an aryl group, and particularly preferably a hydrogen atom or an alkyl group. $R^{101}$ and $R^{102}$ may be bound with each other to form a ring.

In Formula (V2), $R^{201}$ and $R^{202}$ each independently represent a hydrogen atom or a substituent, preferably a hydrogen atom or Group A of substituents, more preferably a hydrogen atom, an alkyl group or an aryl group, and particularly preferably a hydrogen atom or an alkyl group. $R^{201}$ and $R^{202}$ may be bound with each other to form a ring.

$L^{201}$ represents a divalent linking group. Examples of the divalent linking group may include an oxy group (—O—), a thio group (—S—), a carbonyl group (—CO—), a sulfonyl group (—SO$_2$—), an imino group (—NH—), a methylene group (—CH$_2$—), an arylene group, a cycloalkylene group and a group formed by combining these groups. The divalent linking group is preferably an alkylene group having 1 to 20 carbon atoms, a cyclohexylene group, a phenylene group or a xylylene group, more preferably an alkylene group having 1 to 16 carbon atoms, a cyclohexylene group, a phenylene group or a xylylene group, and particularly preferably an alkylene group having 1 to 8 carbon atoms, a cyclohexylene group, a m-phenylene group or a xylylene group.

In Formula (V3), $R^{301}$ and $^{302}$ each independently represent a hydrogen atom or a substituent, preferably a hydrogen atom or Group A of substituents, more preferably a hydrogen atom, an alkyl group, an aryl group, a heterocyclic group, an alkylamino group or an arylamino group, and still more preferably a hydrogen atom or an alkyl group. $R^{301}$ and $R^{302}$ may be bound with each other to form a ring.

$R^{303}$ represents a hydrogen atom or a substituent, preferably a hydrogen atom or Group A of substituents, and more preferably an amino group, a mono- or dialkylamino group, an arylamino group or an alkylthio group. These groups may be further substituted with Group A of substituents, and more preferably substituted with an ionic hydrophilic group.

X represents an alkylene group having 2 to 20 carbon atoms which may have a substituent, or an arylene group having 6 to 10 carbon atoms which may have a substituent. The alkylene group having 2 to 20 carbon atoms is preferred from the viewpoint of the ease of synthesis.

The alkylene group having 2 to 20 carbon atoms is preferably an ethylene group or a n-propylene group, and more preferably an ethylene group. When having a substituent, examples of the substituent may include a methyl group.

$L^{301}$ represents a single bond or a divalent linking group. Examples of the divalent linking group may include an oxy group (—O—), a thio group (—S—), a carbonyl group (—CO—), a sulfonyl group (—SO₂—), an imino group (—NH—), a methylene group (—CH₂—), an arylene group, a cycloalkylene group and a group formed by combining these groups, preferably a phenylene group, a cyclohexylene group or a methylene group. $L^{301}$ is more preferably a single bond.

In Formula (V4), $R^{401}$ each independently represent a hydrogen atom or a substituent, preferably a hydrogen atom or Group A of substituents, more preferably a hydrogen atom or an alkyl group having 1 to 6 carbon atoms, and particularly preferably a hydrogen atom.

$R^{402}$ each independently represent a hydrogen atom or a substituent, preferably a hydrogen atom or Group A of substituents, more preferably an ionic hydrophilic group, and particularly preferably a sulfo group.

Specific examples of L in Formula (4) are shown below, but the present invention is not limited to the specific examples.

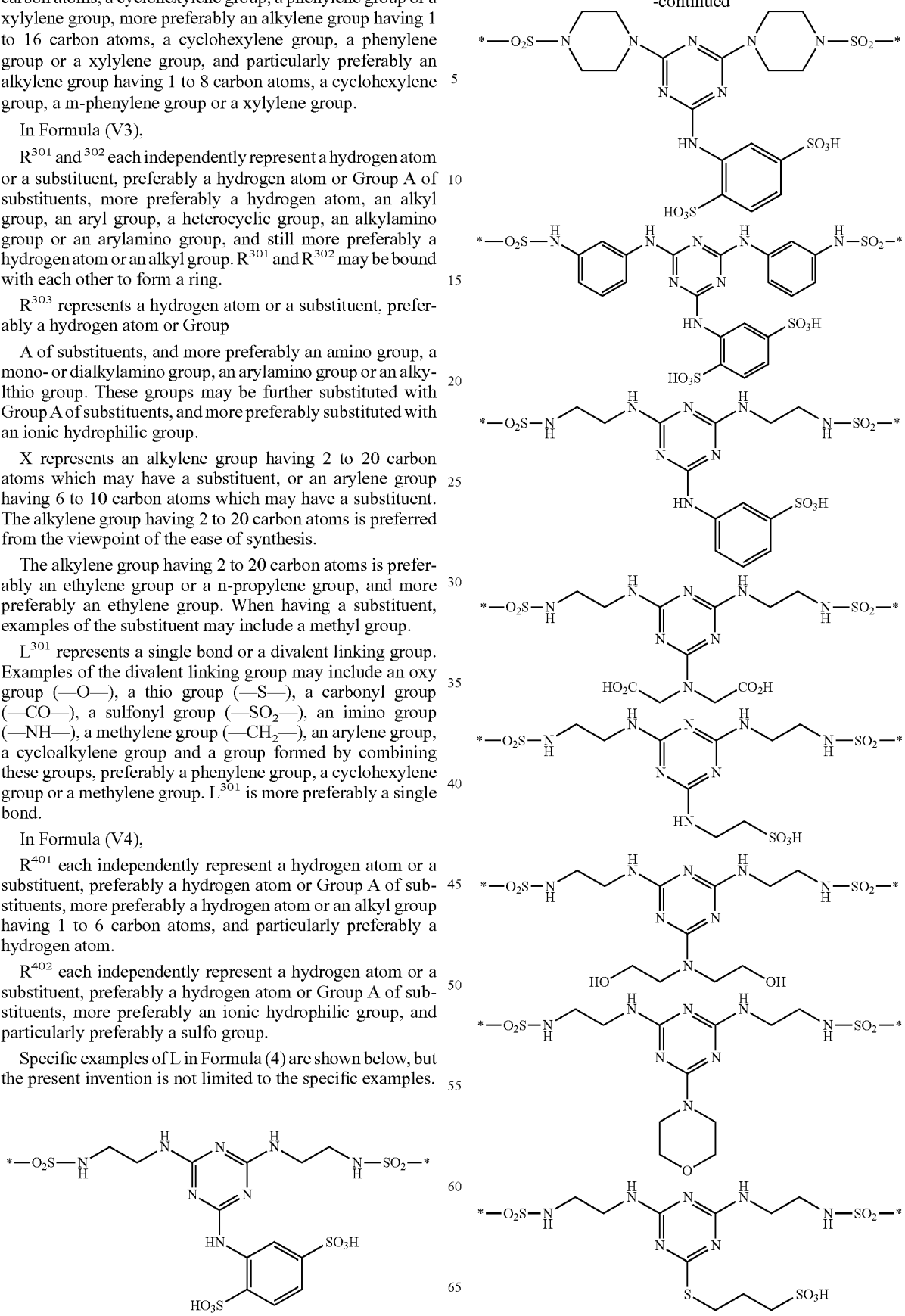

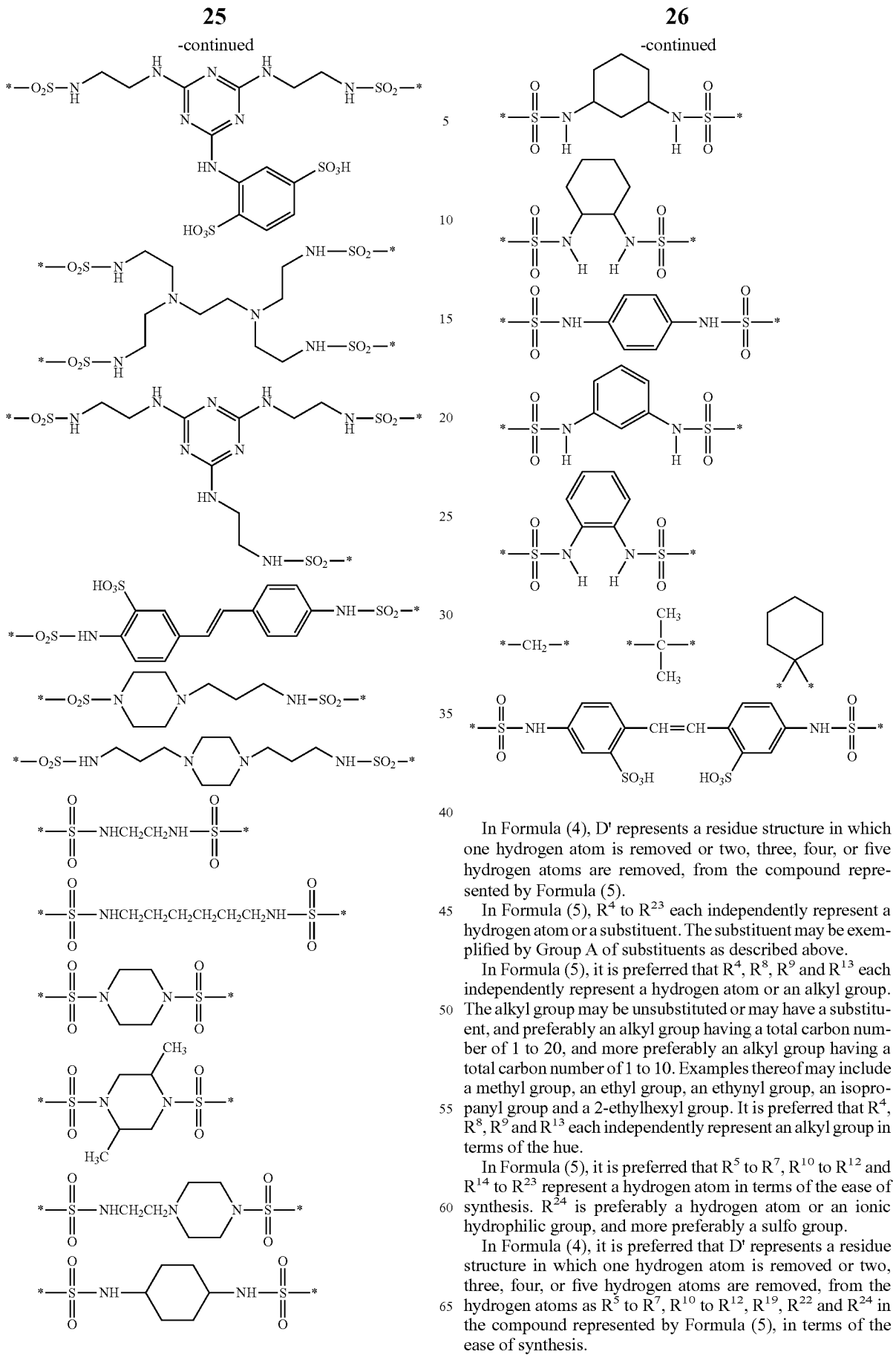

In Formula (4), D' represents a residue structure in which one hydrogen atom is removed or two, three, four, or five hydrogen atoms are removed, from the compound represented by Formula (5).

In Formula (5), $R^4$ to $R^{23}$ each independently represent a hydrogen atom or a substituent. The substituent may be exemplified by Group A of substituents as described above.

In Formula (5), it is preferred that $R^4$, $R^8$, $R^9$ and $R^{13}$ each independently represent a hydrogen atom or an alkyl group. The alkyl group may be unsubstituted or may have a substituent, and preferably an alkyl group having a total carbon number of 1 to 20, and more preferably an alkyl group having a total carbon number of 1 to 10. Examples thereof may include a methyl group, an ethyl group, an ethynyl group, an isopropanyl group and a 2-ethylhexyl group. It is preferred that $R^4$, $R^8$, $R^9$ and $R^{13}$ each independently represent an alkyl group in terms of the hue.

In Formula (5), it is preferred that $R^5$ to $R^7$, $R^{10}$ to $R^{12}$ and $R^{14}$ to $R^{23}$ represent a hydrogen atom in terms of the ease of synthesis. $R^{24}$ is preferably a hydrogen atom or an ionic hydrophilic group, and more preferably a sulfo group.

In Formula (4), it is preferred that D' represents a residue structure in which one hydrogen atom is removed or two, three, four, or five hydrogen atoms are removed, from the hydrogen atoms as $R^5$ to $R^7$, $R^{10}$ to $R^{12}$, $R^{19}$, $R^{22}$ and $R^{24}$ in the compound represented by Formula (5), in terms of the ease of synthesis.

It is preferred from the viewpoint of the availability of raw materials and the low cost production that the compound represented by Formula (4) is synthesized by a synthesis including:

subjecting the compound represented by Formula (6) to chlorosulfonylation, reacting with the diamine compound represented by Formula (7), and hydrolyzing the remaining chlorosulfonyl group.

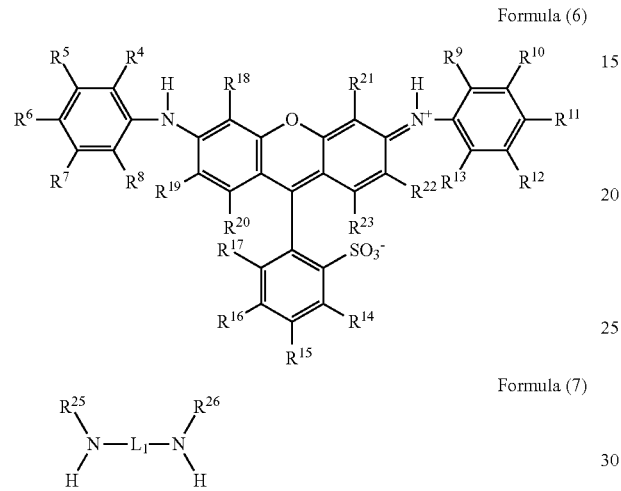

Formula (6)

Formula (7)

In Formula (6), $R^4$ to $R^{23}$ each independently represent a hydrogen atom or a substituent.

In Formula (7), $R^{25}$ and $R^{26}$ each independently represent a hydrogen atom or a substituent. $L_1$ represents a divalent linking group.

In Formula (6), $R^4$ to $R^{23}$ have the same meaning as $R^4$ to $R^{23}$ in Formula (5), and the preferred examples are also the same.

In Formula (7), $R^{25}$ and $R^{26}$ each independently represent preferably a hydrogen atom, a substituted or unsubstituted alkyl group having 1 to 6 carbon atoms, a substituted or unsubstituted aryl group having 6 to 10 carbon atoms, more preferably a hydrogen atom, a substituted or unsubstituted alkyl group having 1 to 6 carbon atoms, and particularly preferably a hydrogen atom.

$L_1$ is preferably a substituted or unsubstituted alkylene group having 1 to 20 carbon atoms, a substituted or unsubstituted cyclohexylene group, a substituted or unsubstituted phenylene group, a substituted or unsubstituted xylylene group, a substituted or unsubstituted stilben-4,4'-diyl group, more preferably a substituted or unsubstituted alkylene group having 1 to 10 carbon atoms, an unsubstituted cyclohexylene group, an unsubstituted phenylene group, an unsubstituted xylylene group, a substituted or unsubstituted stilben-4,4'-diyl group, and particularly preferably a stilben-4,4'-diyl group which is substituted with a sulfo group.

Specific examples of the compound represented by Formula (6) are shown below, but the present invention is not limited to the specific examples.

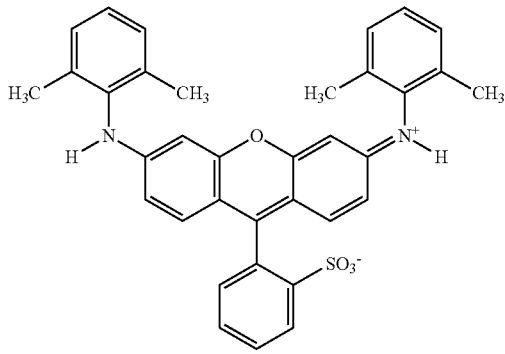

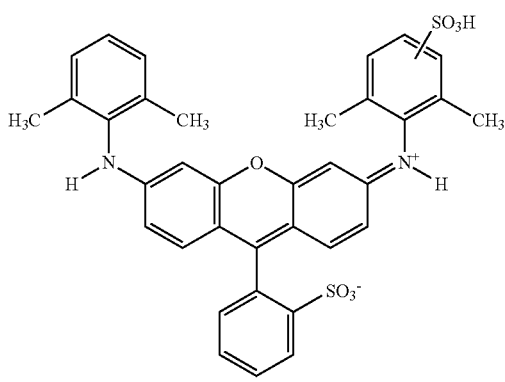

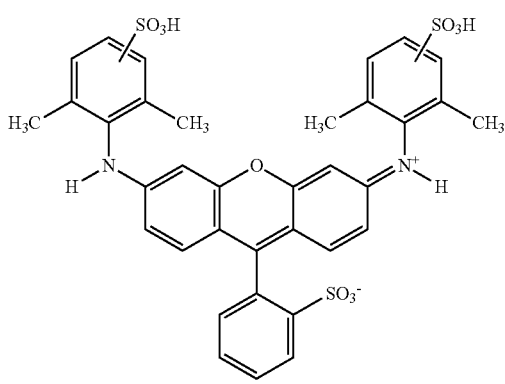

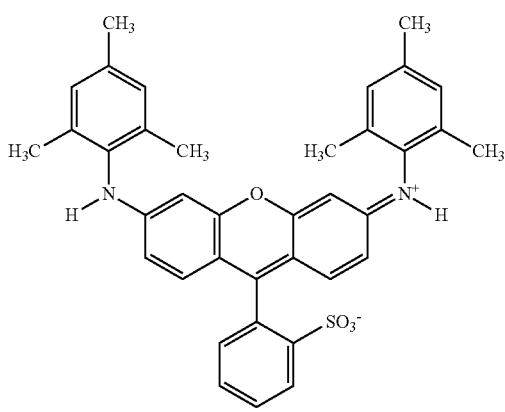

-continued

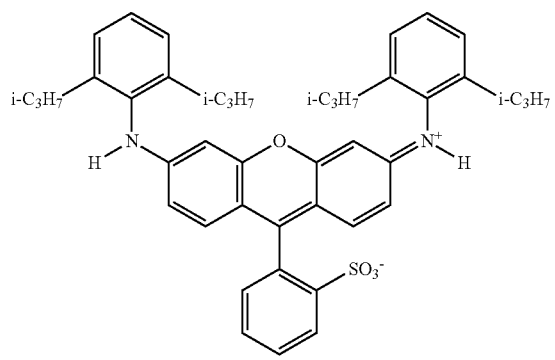

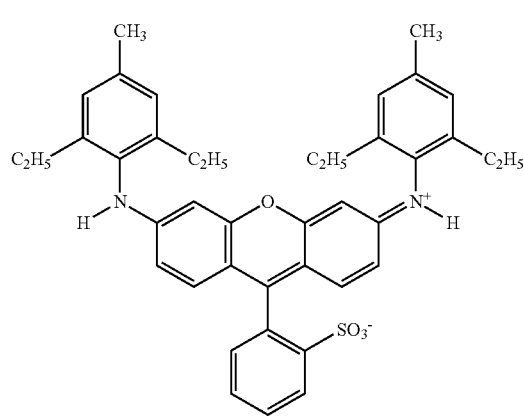

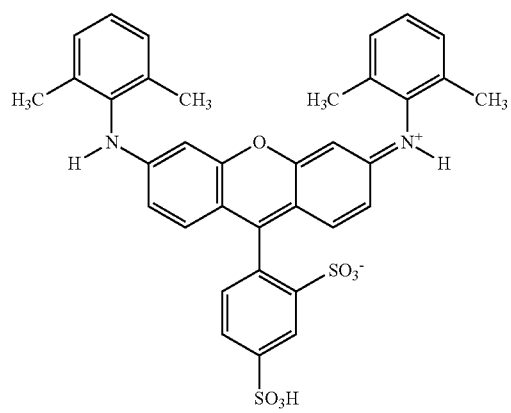

-continued

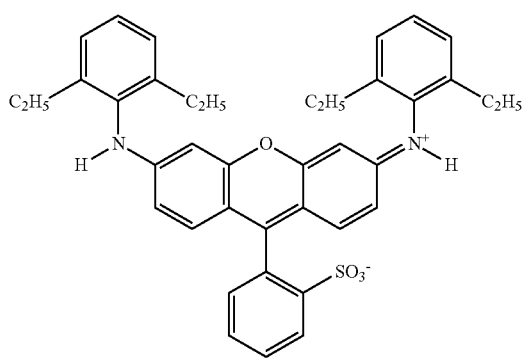

Specific examples of the compound represented by Formula (7) are shown below, but the present invention is not limited to the specific examples.

NH₂—CH₂CH₂—NH₂

NH₂—CH₂CH₂CH₂CHCH₂—NH₂
                    |
                    CH₃

NH₂—CH₂CH₂CH₂—NH₂

NH₂—CH₂CH₂CH₂CH₂CH₂CH₂—NH₂

NH₂—CH₂CH—NH₂
         |
         CH₃

NH₂—CH₂CH₂CH₂CH₂CH₂CH₂CH₂—NH₂

NH₂—CH₂CH₂CH₂CH₂—NH₂

NH₂—CH₂CH₂CH₂CH₂CH₂CH₂CH₂CH₂CH₂CH₂—NH₂

CH₃
         |
NH₂—C—CH₂—NH₂
         |
         CH₃

NH₂—CH₂CH₂CH₂CH₂CH₂CH₂CH₂CH₂CH₂CH₂CH₂CH₂—NH₂

NH₂—CH₂CH₂—NH—CH₃

NH₂—CH—CH₂—NH₂
     |
     CH₂CH₃

NH₂—CH₂CH₂—NH—CH₂CH₃

NH₂—CH₂CH₂CH₂CH₂—NH₂

NH₂—CH₂CH₂—NH—CH₂CH₂CH₃

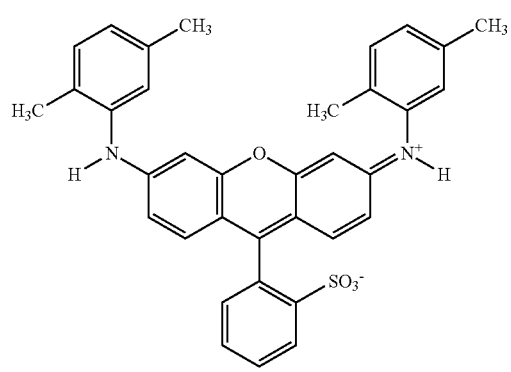

31
-continued
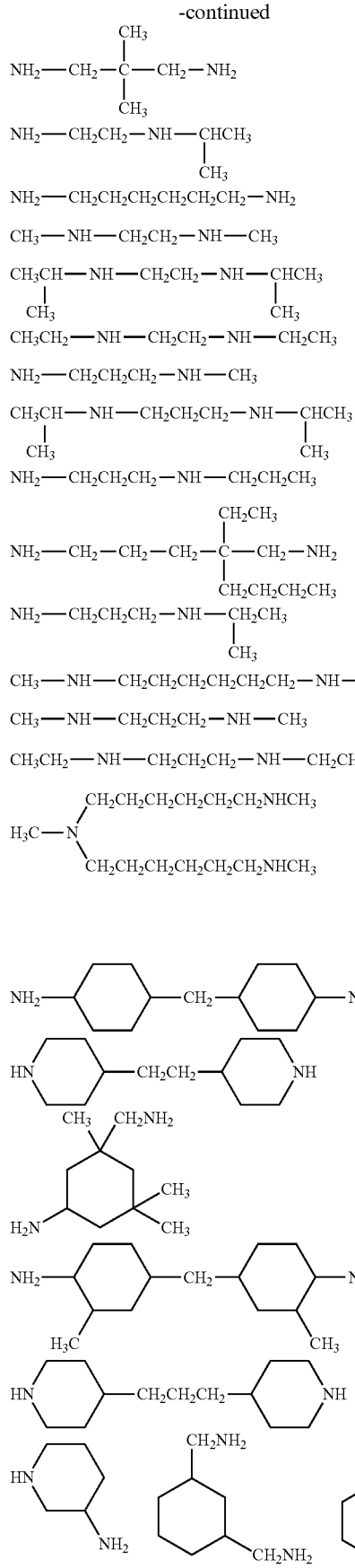
32
-continued
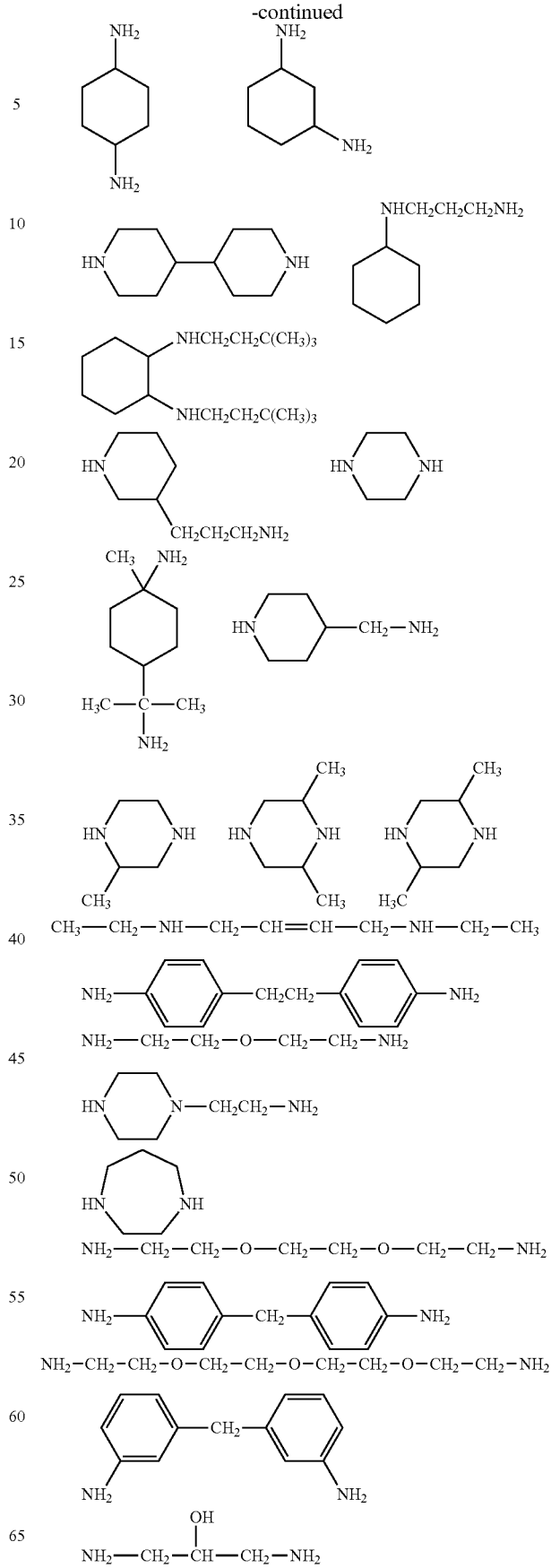

-continued
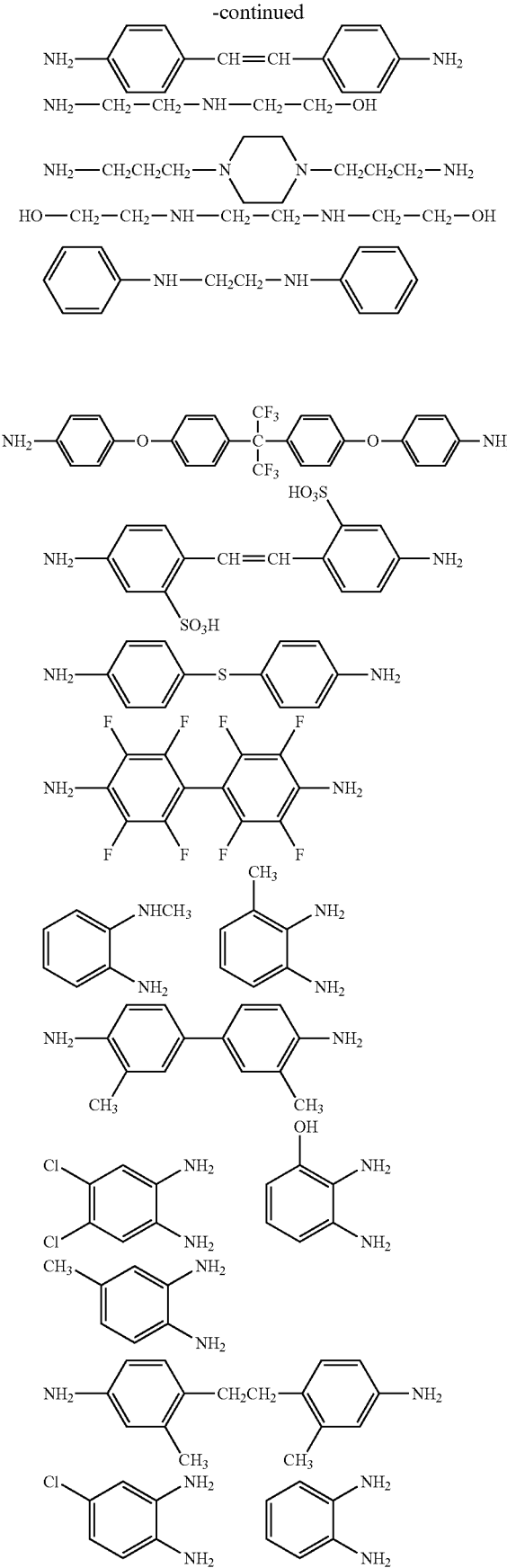
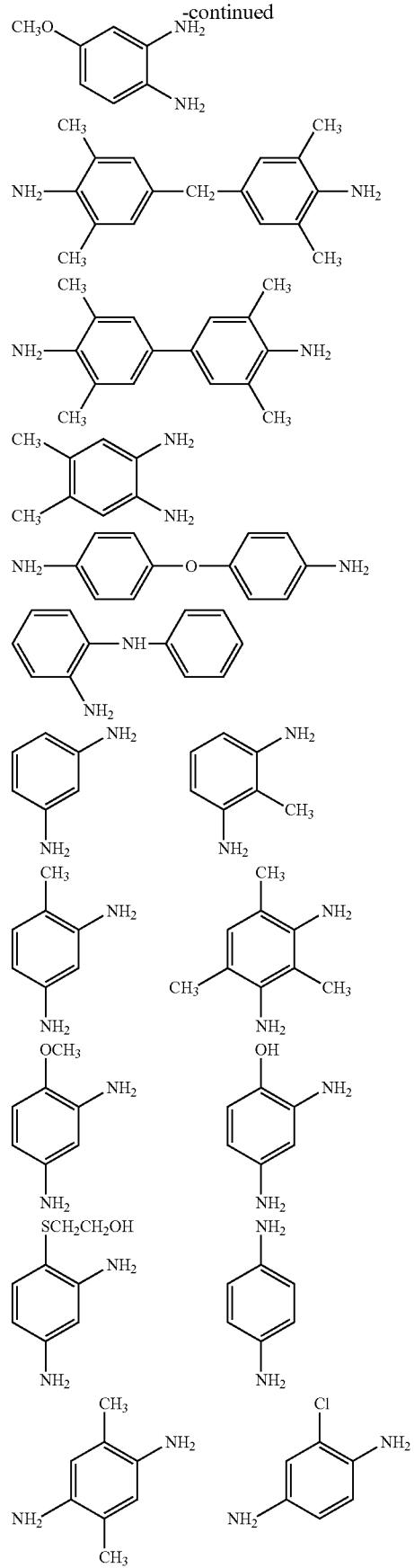

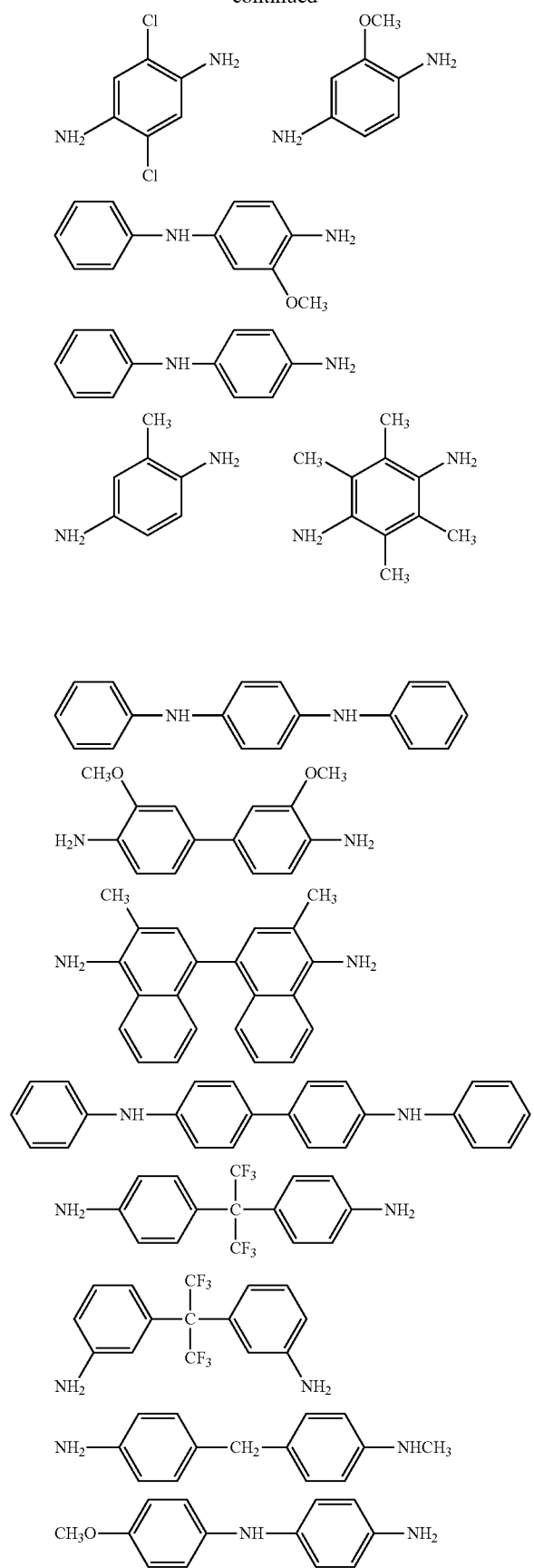
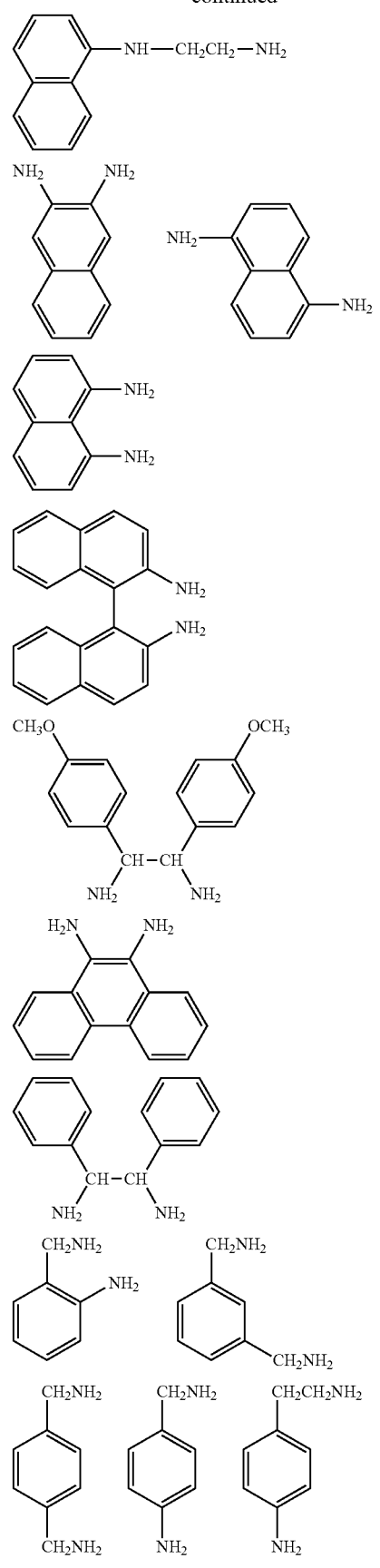

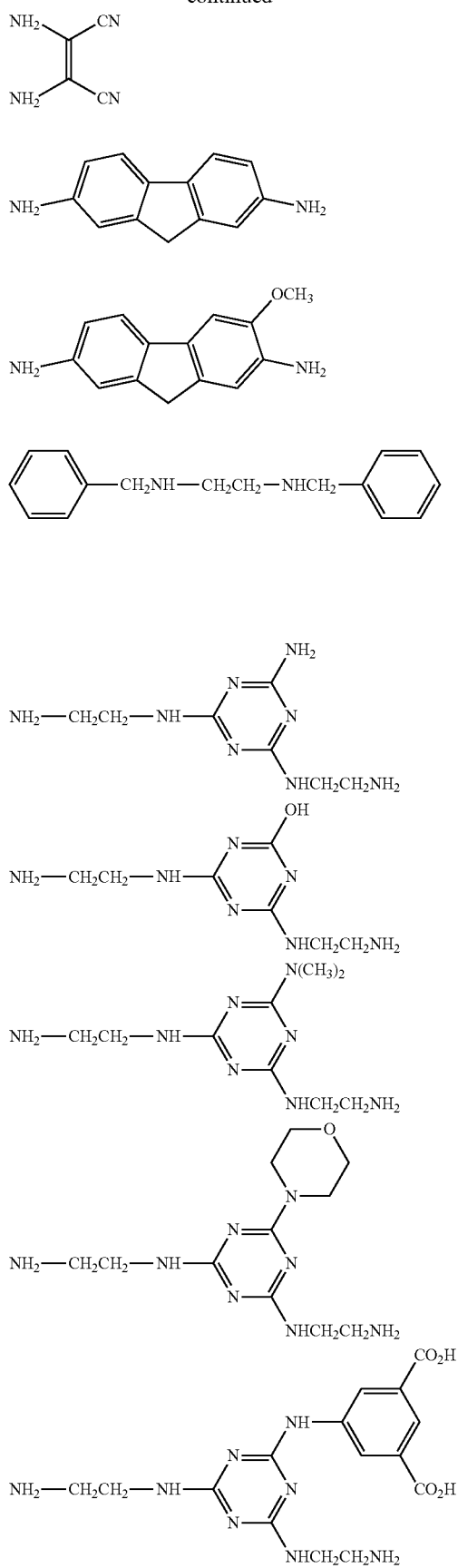
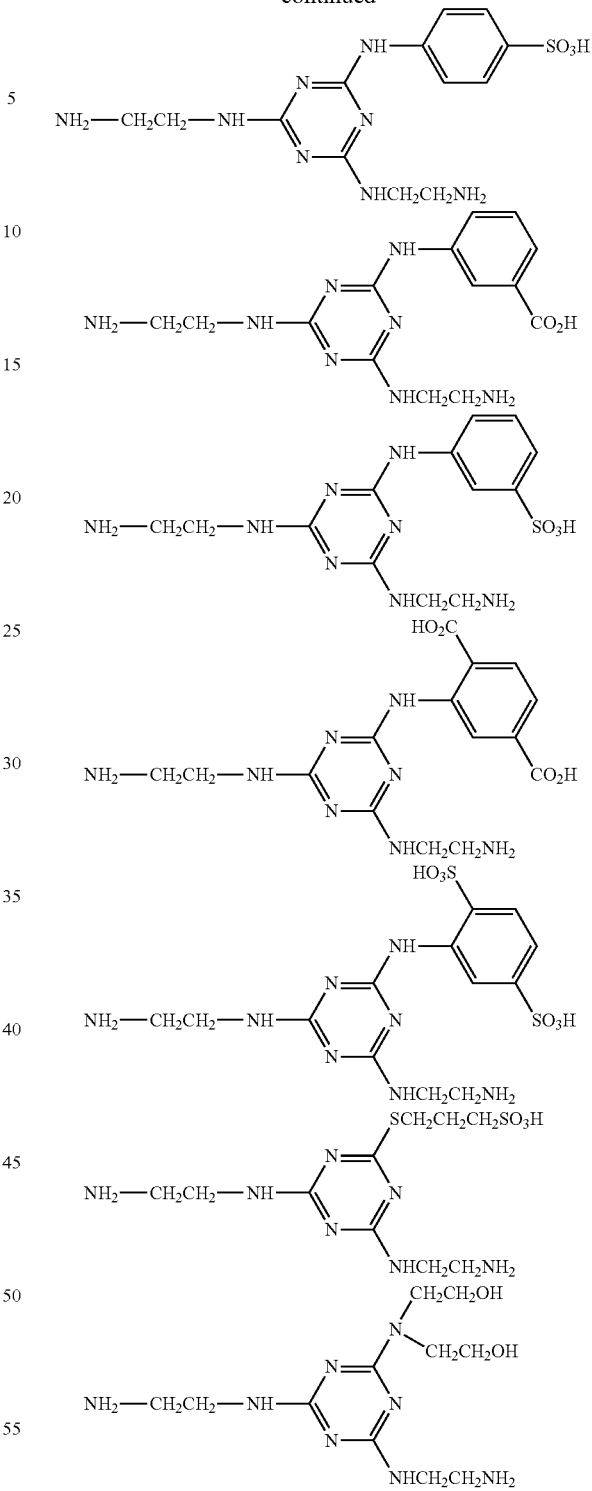

Hereinafter, a preparation method of the compound represented by Formula (4) will be described, but the concept of the preparation method is not limited to the preparation method as described below all, because the compound is obtained by multimerizing the xanthene-based compound represented by Formula (5) via a linking group.

(1) Method of linking from the aniline group moiety of the xanthene compound via methylene

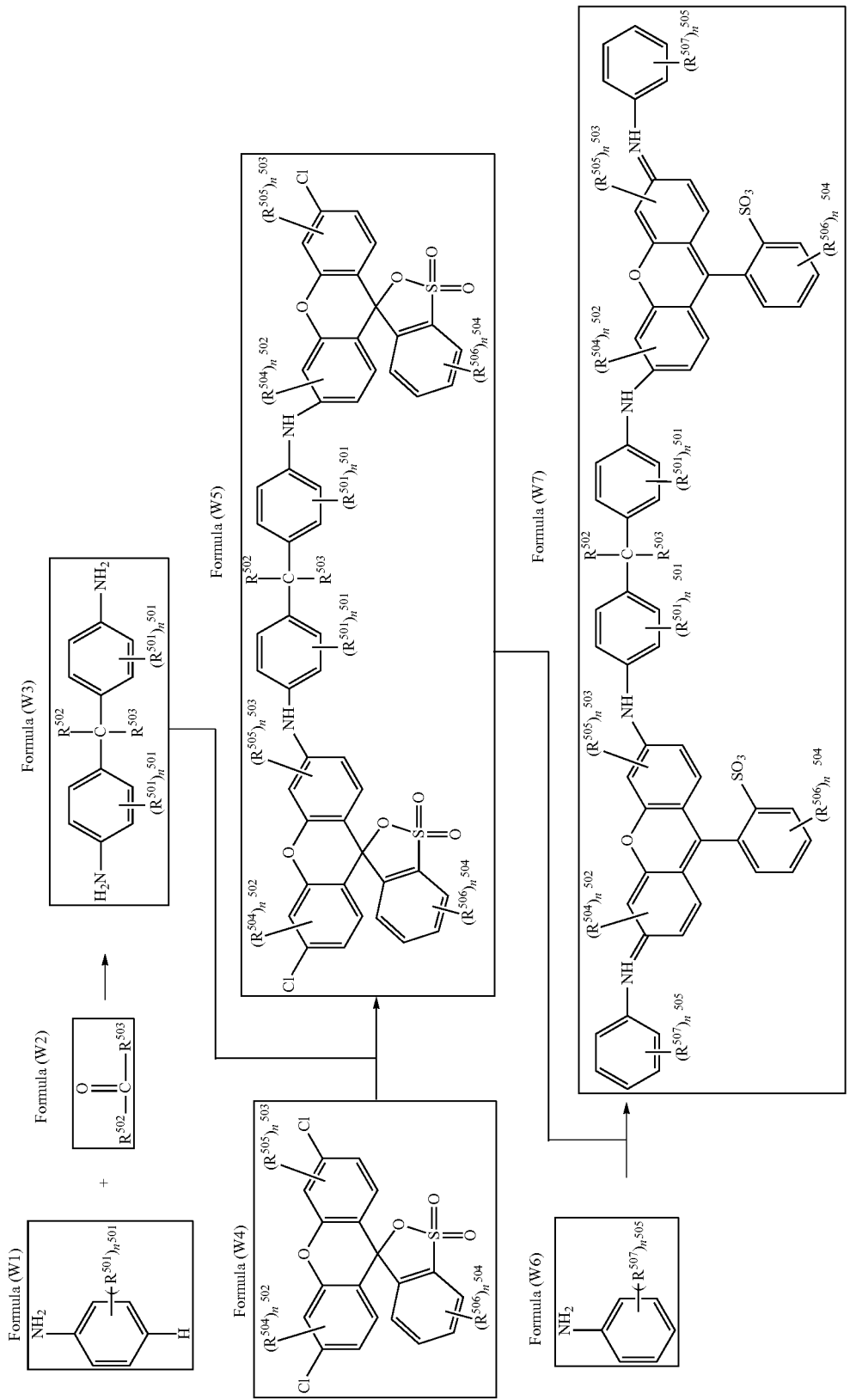

In Formula (W1), $R^{501}$ represents a substituent, and $n^{501}$ represents an integer of 0 to 4. When $n^{501}$ is 2 or more, each $R^{501}$ may be the same or different.

In Formula (W2), $R^{502}$ and $R^{503}$ represent a hydrogen atom, a substituted or unsubstituted alkyl group, a substituted or unsubstituted aryl group, a substituted or unsubstituted heterocyclic group, provided that each of $R^{502}$ and $R^{503}$ is not a hydrogen atom at the same time.

In Formula (W3), $R^{501}$, $R^{502}$, $R^{503}$ and $n^{501}$ have the same meaning as $R^{501}$, $R^{502}$, $R^{503}$ and $n^{501}$ in Formulas (W1) and (W2).

In Formula (W4), $R^{504}$, $R^{505}$ and $R^{506}$ represent a substituent, $n^{502}$ and $n^{503}$ represent an integer of 0 to 3, and $n^{504}$ represents an integer of 0 to 4. When $n^{502}$, $n^{503}$ and/or $n^{504}$ each independently represent 2 or more, each of a plurality of $R^{504}$, $R^{505}$ and/or $R^{506}$ may be the same or different.

In Formula (W5), $R^{501}$, $R^{502}$, $R^{503}$, $R^{504}$, $R^{505}$, $R^{506}$, $n^{501}$, $n^{501}$, $n^{502}$, $n^{503}$ and $n^{504}$ have the same meaning as $R^{501}$, $R^{502}$, $R^{503}$, $R^{504}$, $R^{505}$, $R^{506}$, $n^{501}$, $n^{502}$, $n^{503}$, and $n^{504}$ in Formulas (W1), (W2) and (W4).

In Formula (W6), $R^{507}$ represents a substituent, and $n^{505}$ represents an integer of 0 to 5. When $n^{505}$ is 2 or more, each $R^{507}$ may be the same or different.

In Formula (W7), $R^{501}$, $R^{502}$, $R^{503}$, $R^{504}$, $R^{505}$, $R^{506}$, $R^{507}$, $n_{501}$, $n_{502}$, $n_{503}$, $n_{504}$ and $n_{505}$ have the same meaning as $R^{501}$, $R^{502}$, $R^{503}$, $R^{504}$, $R^{505}$, $R^{506}$, $R^{507}$, $n^{501}$, $n^{502}$, $n^{503}$, $n^{504}$ and $n^{505}$ in Formulas (W1), (W2), (W4) and (W6).

The compound represented by Formula (W3) can be obtained by heating 2 moles of the compound represented by Formula (W1) and 1 mole of the compound represented by Formula (W2) with stirring in the presence of strong acid.

The compound represented by Formula (W5) can be obtained by heating 1 mole of the compound represented by Formula (W3) and 1 mole of the compound represented by Formula (W4) with stirring in the presence of aluminum chloride. The compound represented by Formula (W7), which is corresponding to the compound represented by Formula (1) of the present invention, can be obtained by heating 1 mole of the compound represented by Formula (W5) and 2 moles or more of the compound represented by Formula (W6) with stirring together with zinc chloride.

The compound represented by (W1) is available as a reagent (for example, Catalog No. D146005 and the like, manufactured by Aldrich Co.).

The compound represented by (W2) is available as a reagent (for example, Catalog No. 227048 and the like, manufactured by Sigma-Aldrich Co.).

The compound represented by (W4) can be synthesized by the method described in Journal of the American Chemical Society, Vol. 46, p 1899 (1924).

The compound represented by (W5) is available as a reagent (for example, Catalog No. D146005 and the like, manufactured by Aldrich Co.).

Further, in order to impart water solubility required to use the compound represented by Formula (4) as a water-based ink for use in inkjet, it is preferred to further subject the compound represented by Formula (W7) to post reaction such as sulfonation. The detail of the preparation method will be illustrated by Examples.

(2) For a xanthene compound having a sulfo group, a method of converting the sulfo group into a chlorosulfonyl group, and then reacting with polyamine and the like

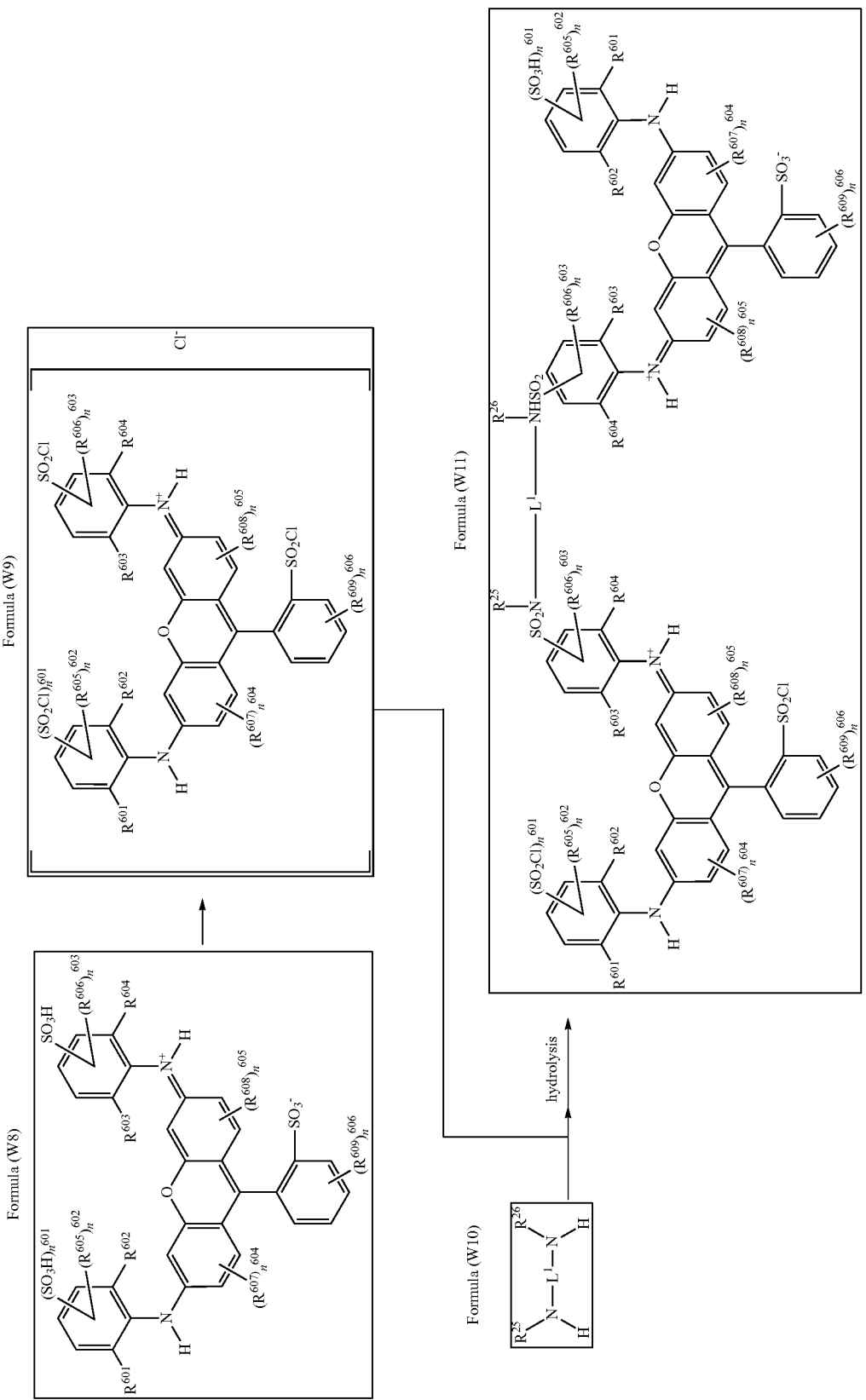

In Formula (W8), $R^{601}$, $R^{602}$, $R^{603}$ and $R^{604}$ represent a hydrogen atom or a substituent, $R^{605}$, $R^{606}$, $R^{607}$, $R^{608}$ and $R^{609}$ represent a substituent, $n^{601}$ represents an integer of 0 to 1, $n^{602}$ and $n^{603}$ represent an integer of 0 to 3, $n^{604}$ and $n^{605}$ represent an integer of 0 to 3, and $n^{606}$ represents an integer of 0 to 4. When $n^{602}$, $n^{603}$, $n^{604}$ and/or $n^{605}$ are 2 or more, each of a plurality of $R^{605}$, $R^{606}$, $R^{607}$, $R^{608}$ and/or $R^{609}$ may be the same or different.

In Formula (W9) $R^{601}$, $R^{602}$, $R^{603}$, $R^{604}$, $R^{605}$, $R^{606}$, $R^{607}$, $R^{608}$, $R^{609}$, $n^{601}$, $n^{602}$, $n^{603}$, $n^{604}$, $n^{605}$ and $n^{606}$ have the same meaning as $R^{601}$, $R^{602}$, $R^{603}$, $R^{604}$, $R^{605}$, $R^{606}$, $R^{607}$, $R^{608}$, $R^{609}$, $n^{601}$, $n^{602}$, $n^{603}$, $n^{604}$, $n^{605}$ and $n^{606}$ in Formula (W8).

In Formula (W10), $R^{25}$, $R^{26}$ and $L^1$ have the same meaning as $R^{25}$, $R^{26}$ and $L_1$ in Formula (7).

In Formula (W11), $R^{601}$, $R^{602}$, $R^{603}$, $R^{604}$, $R^{605}$, $R^{606}$, $R^{607}$, $R^{608}$, $R^{609}$, $n^{601}$, $n^{602}$, $n^{603}$, $n^{604}$, $n^{605}$, $n^{606}$, $R^{25}$, $R^{26}$ and $L^1$ have the same meaning as $R^{601}$, $R^{602}$, $R^{603}$, $R^{604}$, $R^{605}$, $R^{606}$, $R^{607}$, $R^{608}$, $R^{609}$, $n^{601}$, $n^{602}$, $n^{603}$, $n^{604}$, $n^{605}$, $n^{606}$, $R^{25}$, $R^{26}$ and $L^1$ in Formula (W8) and Formula (7).

The compound represented by Formula (W8) is available as a reagent (for example, trade name CHUGAI AMINOL FAST PINKR and the like, manufactured by Chugai Kasei Co., Ltd.).

The compound represented by Formula (W10) is available as a reagent (for example, Catalog No. D25206, manufactured by Aldrich Co.).

The compound represented by Formula (W9) can be obtained by converting the compound represented by Formula (W8) into an acid chloride using a chlorinating agent such as phosphorous oxychloride or thionyl chloride.

The compound represented by Formula (1) of the present invention can be obtained as a mixture such as a representative structure represented by Formula (W11) by reacting the compound represented by Formula (W9) and the compound represented by Formula (W10) in an arbitrary ratio (preferably a molar ratio of 2:1), and hydrolyzing unreacted sulfonyl chloride with alkali.

The representative structure represented by Formula (W11) will be described. The bonding moiety of the xanthene structure and the linking group is a sulfonic acid or sulfonate moiety of the xanthene compound used as Formula (W8), and does not have reaction selectivity.

A form which can be included in a mixture obtained by hydrolysis of the compound obtained by reacting the compound represented by Formula (W9) and the compound represented by Formula (W10), includes a dimer, as well as an oligomer such as a trimer and a tetramer. Such a multimer (oligomer) may be in a straight form, a branched form, a cyclic form and a combination thereof.

Further, although these are represented by using a representative structure represented by Formula (W11) in the present specification, such a mixture is included therein.

(3) For a xanthene compound, a method of reacting with polyamine after performing chlorosulfonylation directly

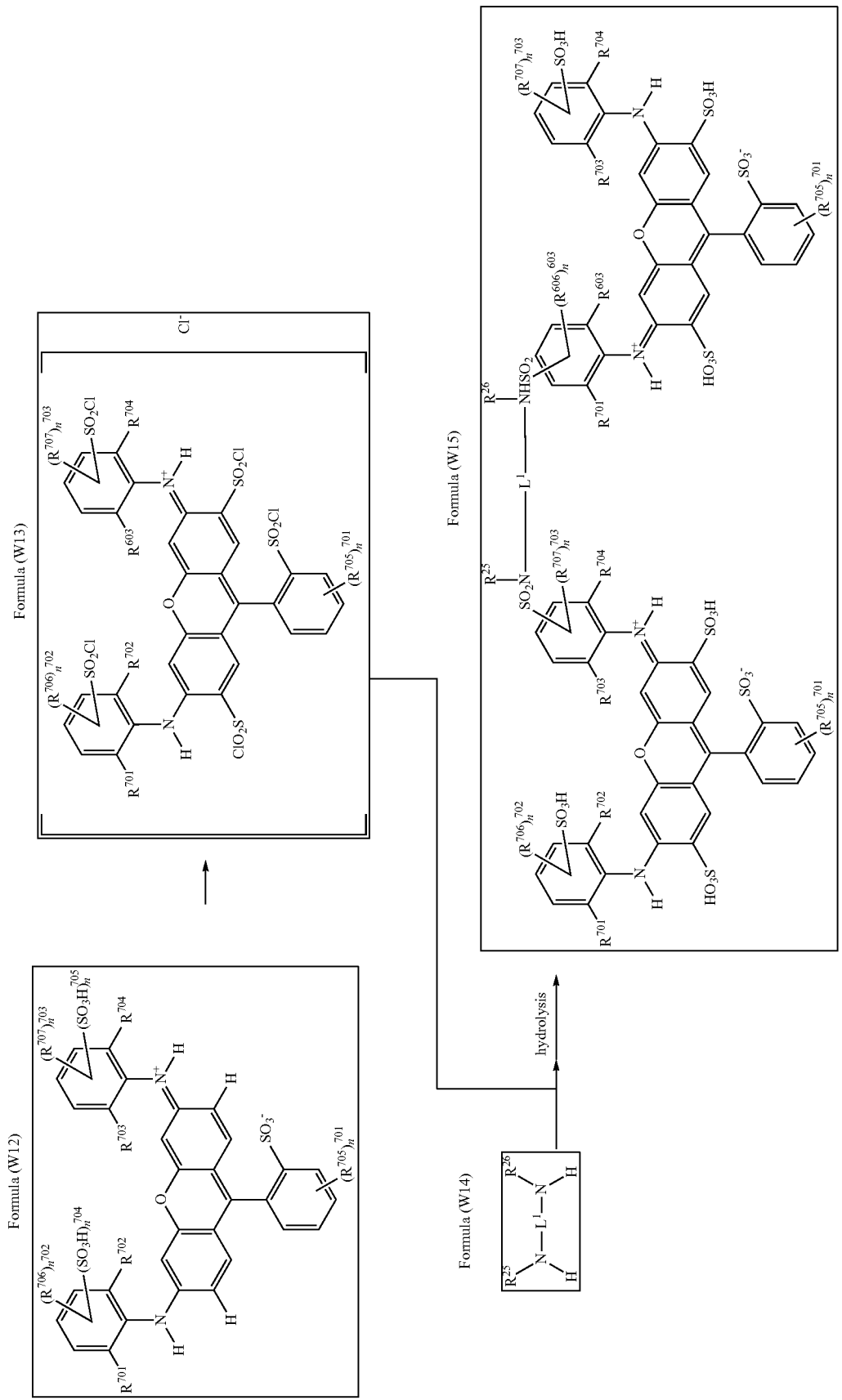

In Formula (W12), $R^{701}$, $R^{702}$, $R^{703}$ and $R^{704}$ each independently represents a hydrogen atom or a substituent, $R^{705}$, $R^{706}$ and $R^{707}$ represent a substituent, $n^{701}$ represents an integer of 0 to 4, $n^{702}$ and $n^{703}$ each independently represents an integer of 0 to 2, and $n^{704}$ and $n^{705}$ each independently represents an integer of 0 to 1. When $n^{701}$, $n^{702}$ and/or $n^{703}$ each independently is 2 or more, each of a plurality of $R^{705}$, $R^{706}$ and/or $R^{707}$ may be the same or different.

In Formula (W13), $R^{701}$, $R^{702}$, $R^{703}$, $R^{704}$, $R^{705}$, $R^{706}$, $R^{707}$ and $n^{701}$, $n^{702}$ and $n^{703}$ have the same meaning as $R^{701}$, $R^{702}$, $R^{703}$, $R^{704}$, $R^{705}$, $R^{706}$, $R^{707}$, $n^{701}$, $n^{702}$ and $n^{703}$ in Formula (W12).

In Formula (W14), $R^{25}$, $R^{26}$ and $L^1$ have the same meaning as $R^{25}$, $R^{26}$ and $L^1$ in Formula (7).

In Formula (W15), $R^{701}$, $R^{702}$, $R^{703}$, $R^{704}$, $R^{705}$, $R^{706}$, $R^{707}$ and $n^{701}$, $n^{702}$, $n^{703}$, $R^{25}$, $R^{26}$ and $L^1$ have the same meaning as $R^{701}$, $R^{702}$, $R^{703}$, $R^{704}$, $R^{705}$, $R^{706}$, $R^{707}$, $n^{701}$, $n^{702}$, $n^{703}$, $R^{25}$, $R^{26}$ and $L_1$ in Formula (W12) and Formula (7).

The compound represented by Formula (W12) is available as a reagent (for example, trand name CHUGAI AMINOL FAST PINKR and the like, manufactured by Chugai Kasei Co., Ltd.).

The compound represented by Formula (W14) is available as a reagent (for example, Catalog No. D25206, manufactured by Aldrich Co.).

The compound represented by Formula (W13) can be obtained by subjecting the compound represented by Formula (W12) to chlorosulfonylation by using chlorosulfonic acid.

The compound represented by Formula (4) of the present invention can be obtained as a mixture such as a representative structure represented by Formula (W15) by reacting the compound represented by Formula (W13) and the compound represented by Formula (W14) in an arbitrary ratio (preferably a molar ratio of 2:1), and hydrolyzing unreacted sulfonyl chloride with alkali.

The representative structure represented by Formula (W15) will be described. The bonding moiety of the xanthene structure and the linking group is a sulfonyl chloride moiety of the xanthene compound of Formula (W13), and does not have reaction selectivity.

A form which can be included in a mixture obtained by hydrolysis of the compound obtained by reacting the compound represented by Formula (W13) and the compound represented by Formula (W14), includes a dimer, as well as an oligomer such as a trimer and a tetramer. Such a multimer (oligomer) may be in a straight form, a branched form, a cyclic form and a combination thereof.

Further, although these are represented by using a representative structure represented by Formula (W15) in the present specification, such a mixture is included therein.

Hereinafter, specific examples of the compound represented by Formula (4) of the present invention (representative structure) will be illustrated, but the present invention is not limited to the specific examples. Further, in the following specific examples, Me represents a methyl group.

Structural Formula

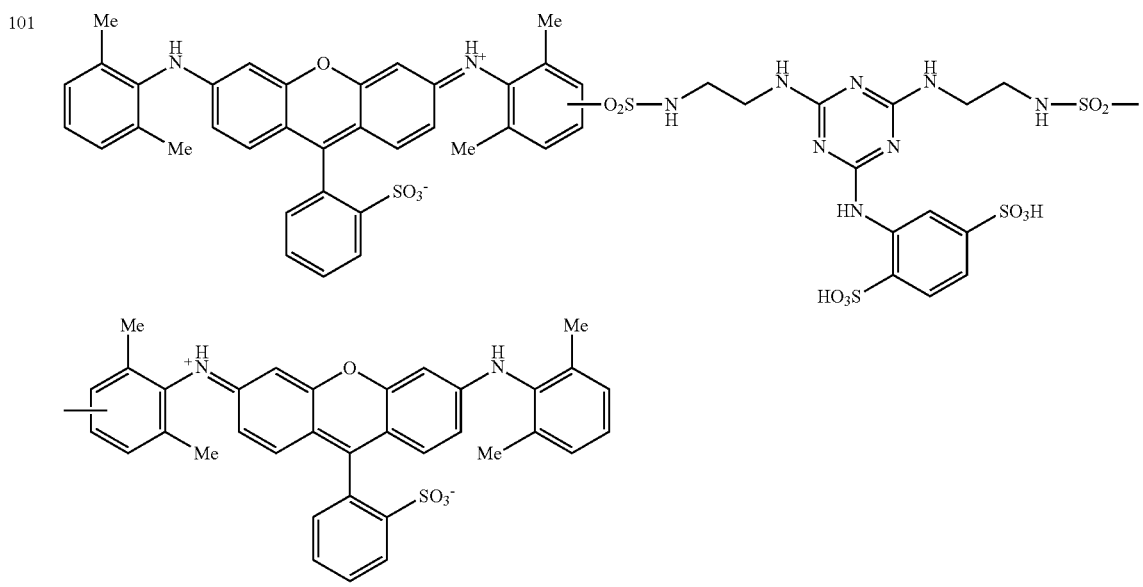

| Structural Formula |
|---|
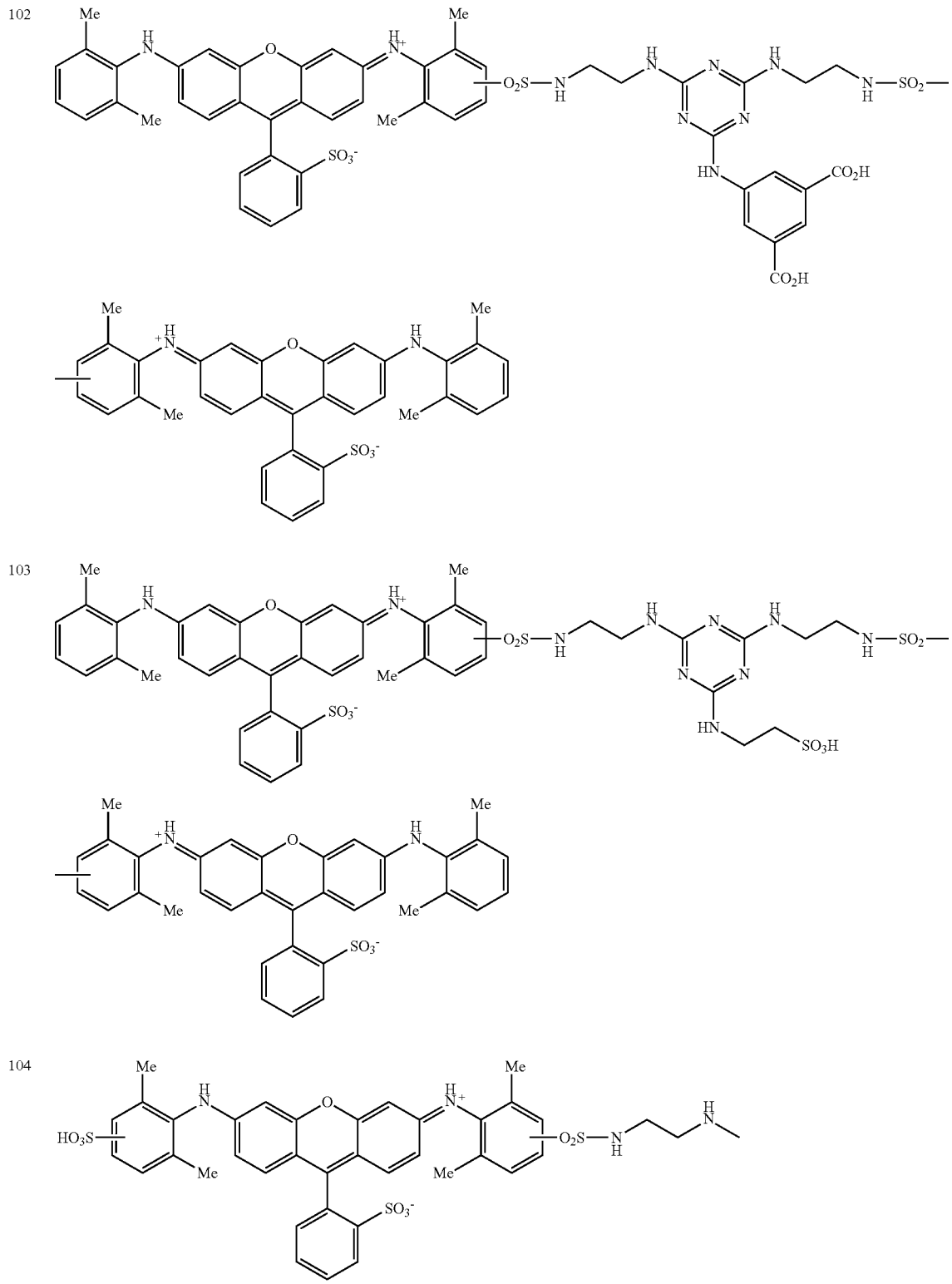

| Structural Formula |
|---|
| 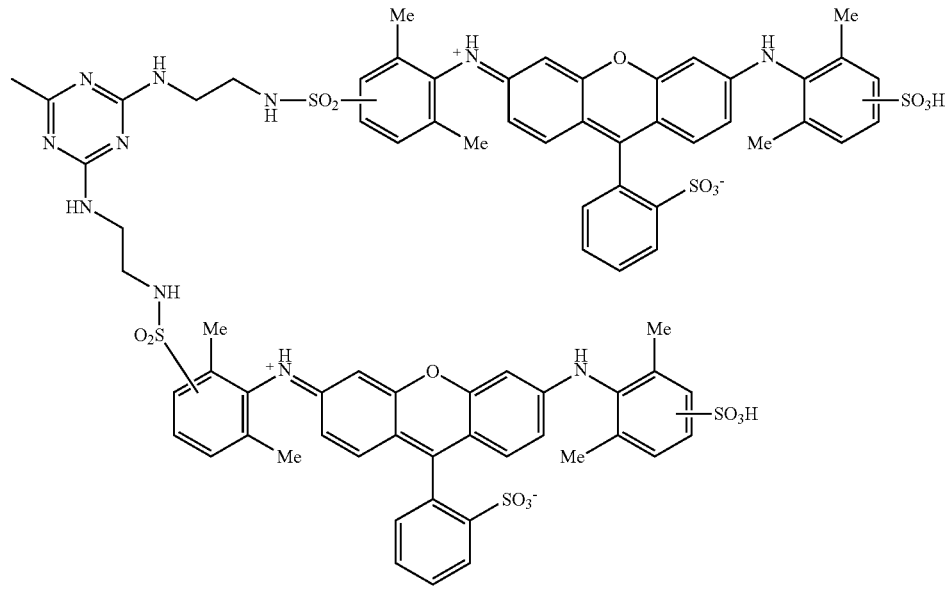 |
| 105 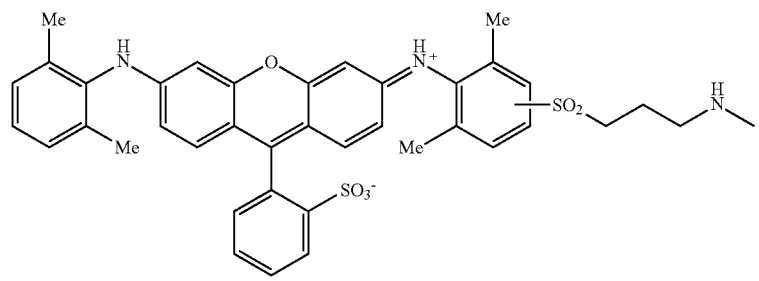 |
| 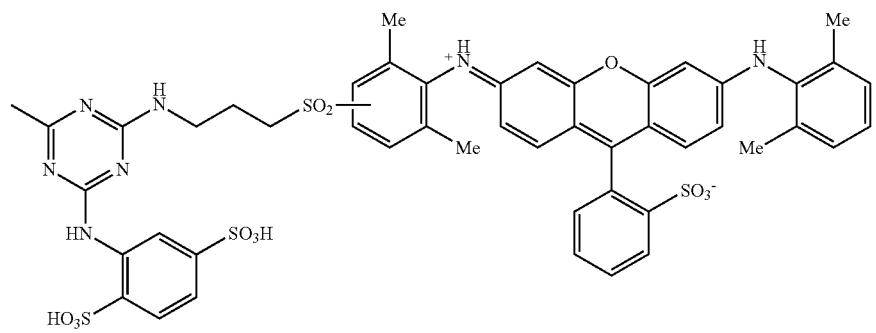 |
| 106 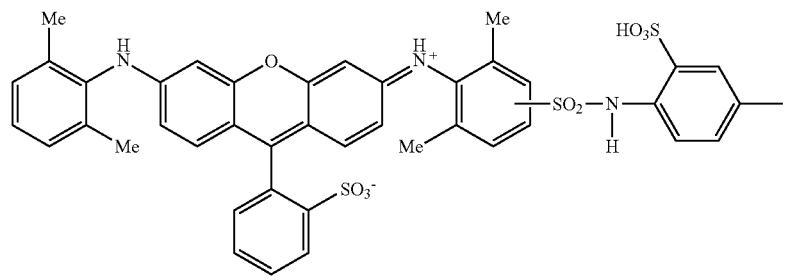 |

| Structural Formula |
|---|
| 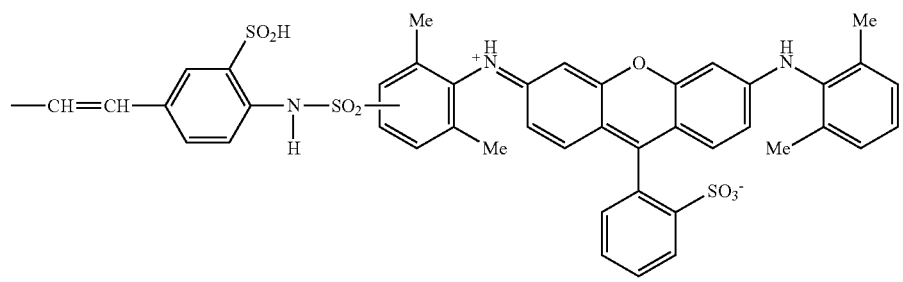 |
| 107 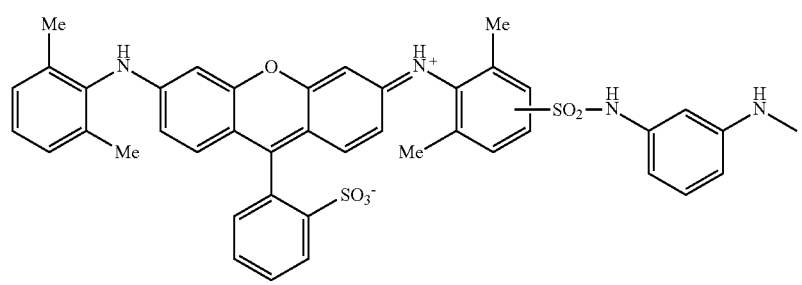 |
| 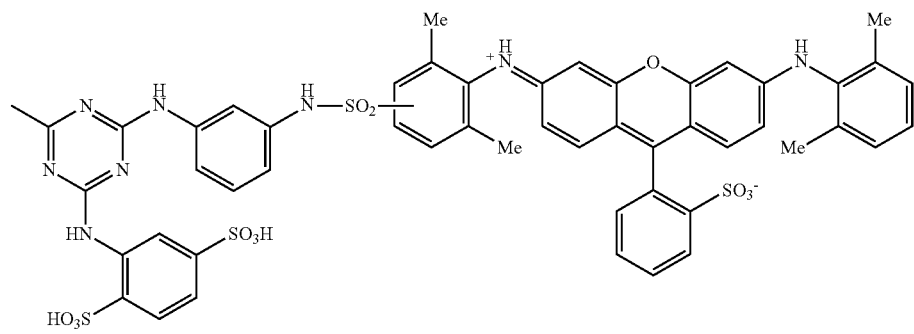 |
| 108 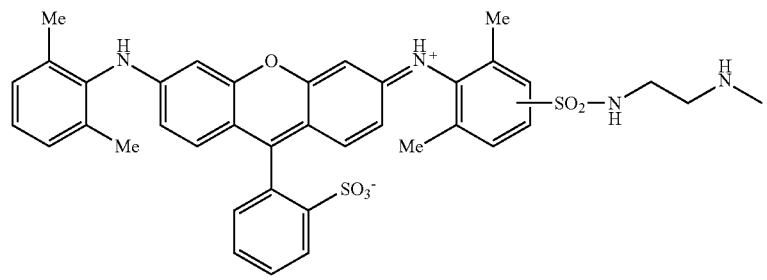 |
| 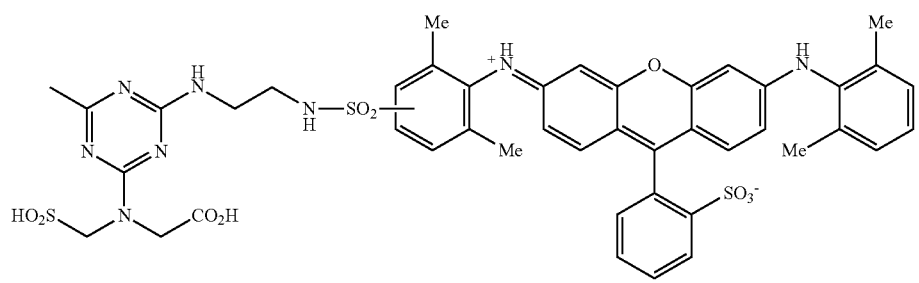 |

| Structural Formula |
|---|
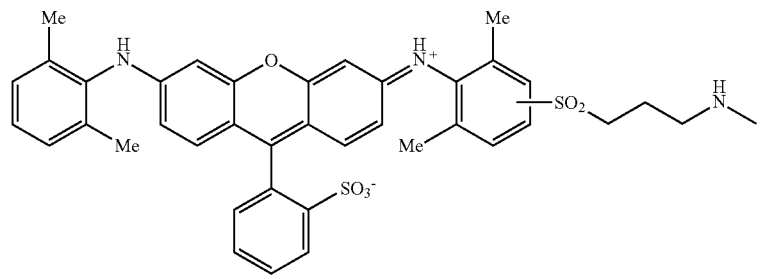
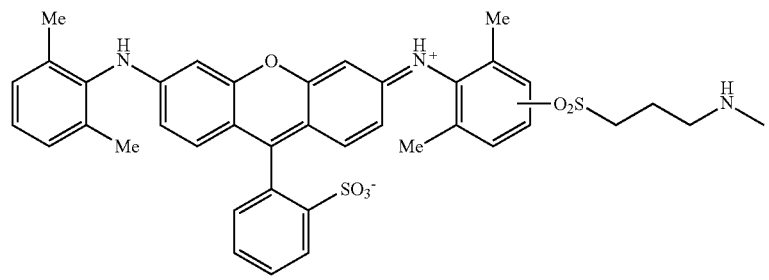
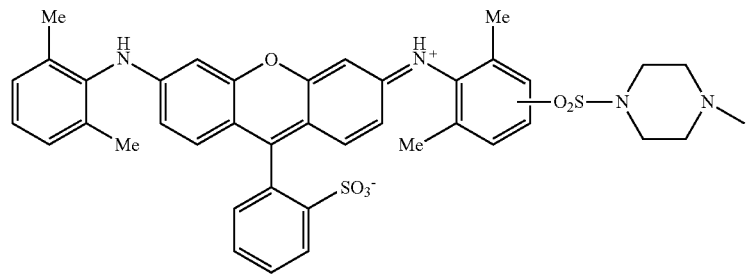

| Structural Formula |
|---|
| 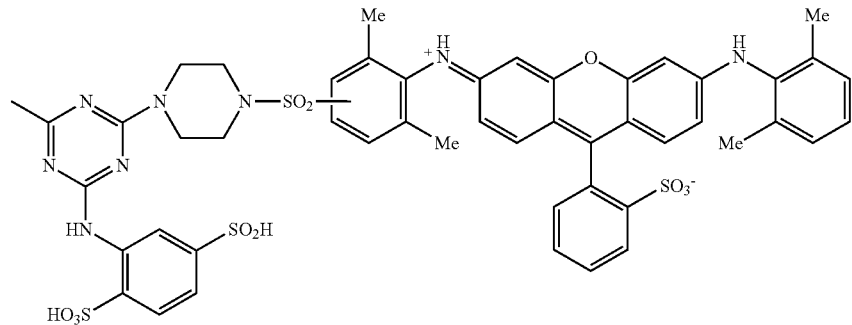 |
| 112 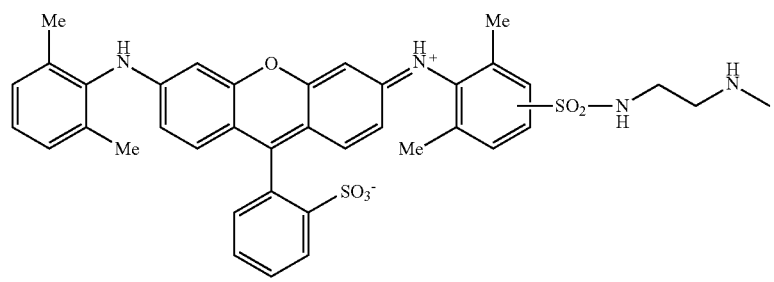 |
| 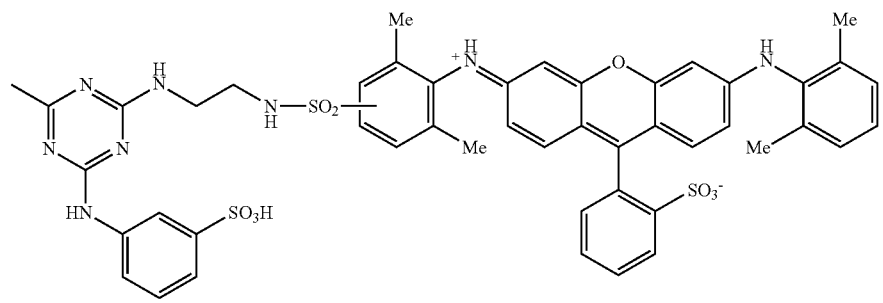 |
| 113 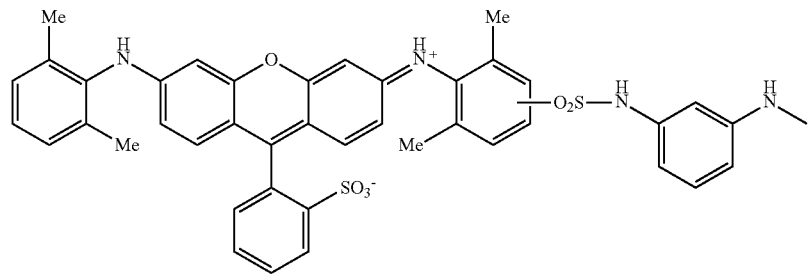 |
| 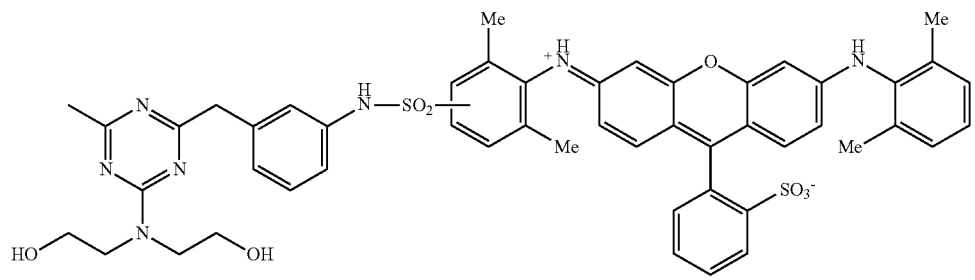 |

| Structural Formula |
|---|
| 114 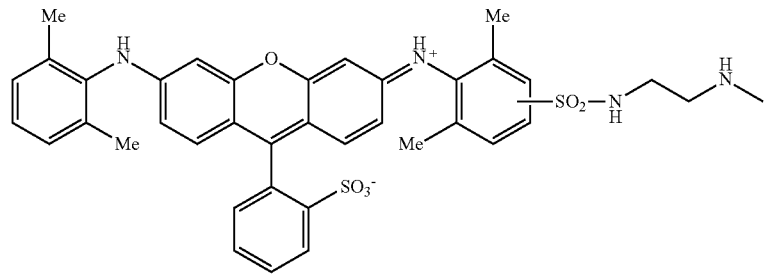 |
| 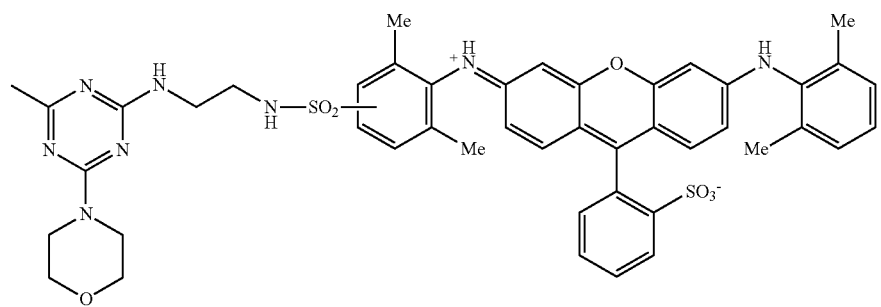 |
| 115 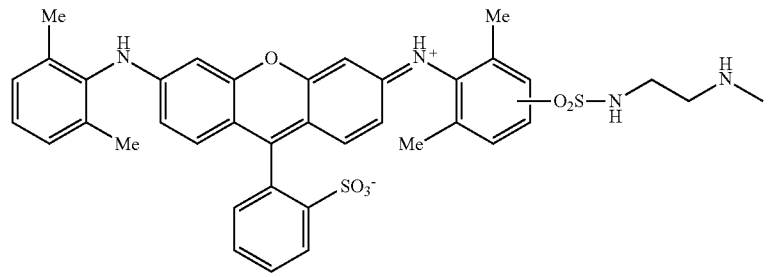 |
| 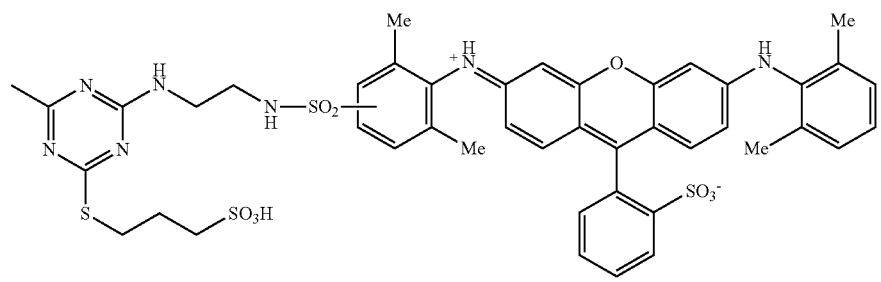 |
| 116 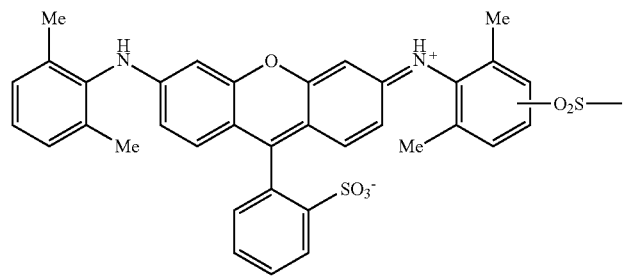 |

| Structural Formula |
|---|
| 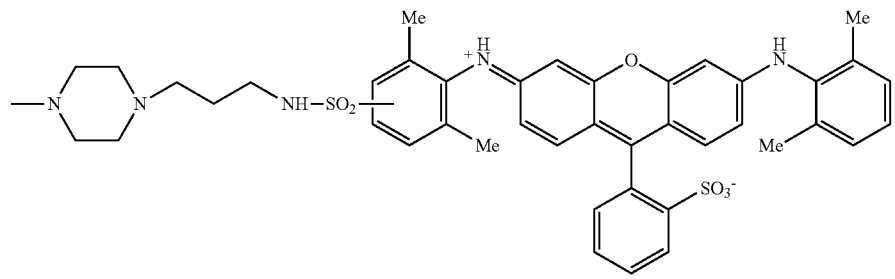 |
| 117 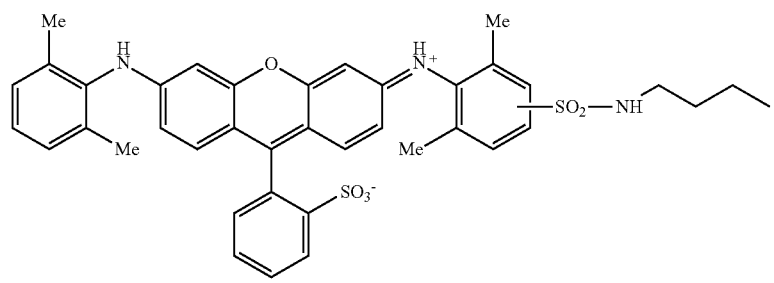 |
| 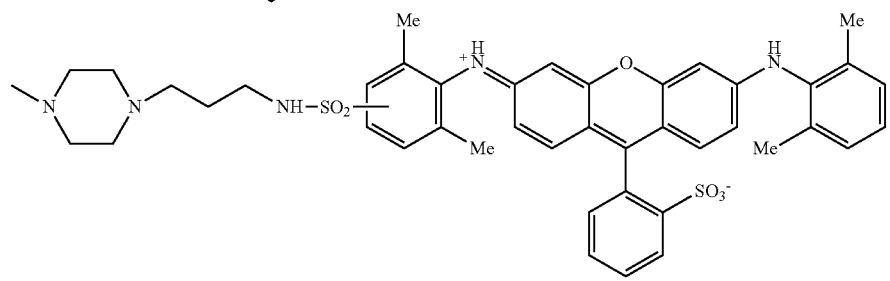 |
| 118 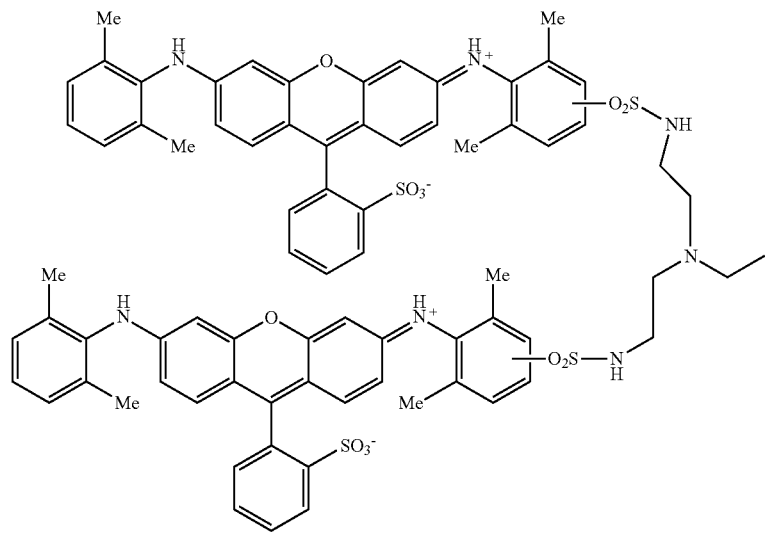 |

| Structural Formula |
|---|
| 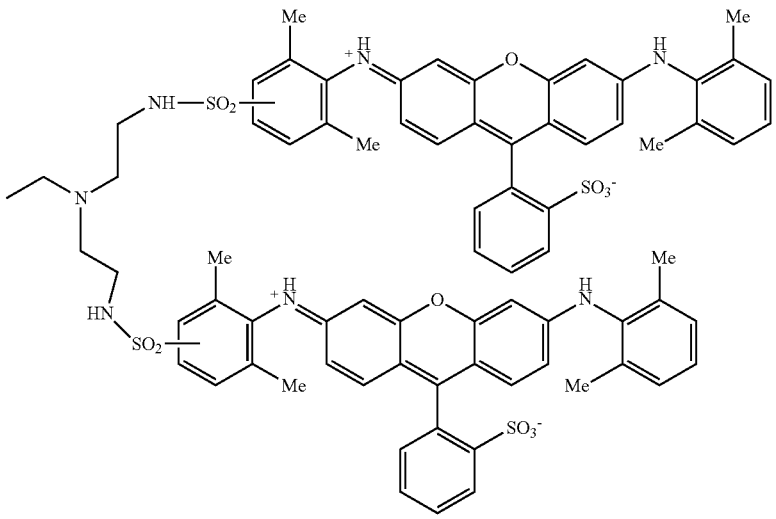 |
Exemplary Compound 1-1: Reaction mixture containing the following structure, and obtained by: reacting Compound A (2 mol) and 4,4'-diaminostilben-2,2'-disulfonic acid (1 mol); and then hydrolyzing unreacted sulfonyl=chloride d with sodium hydroxide
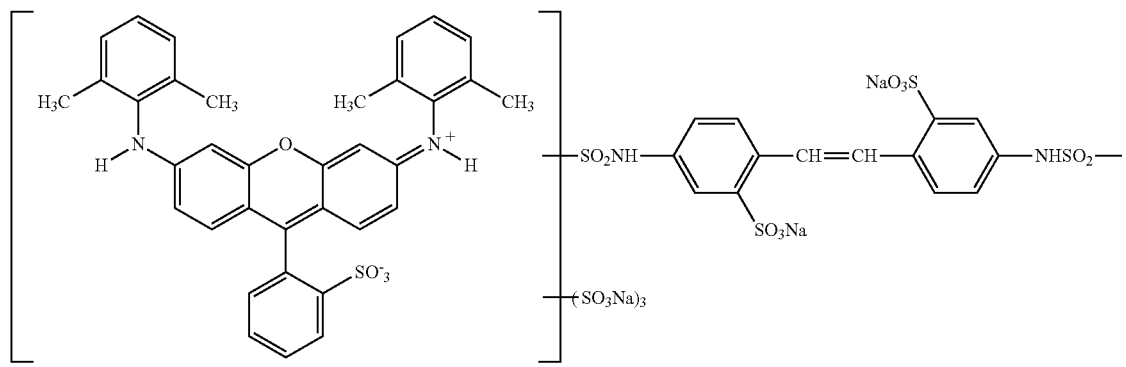
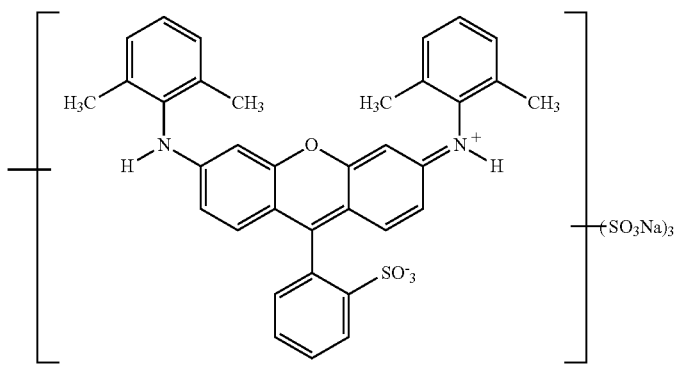

Compound A:

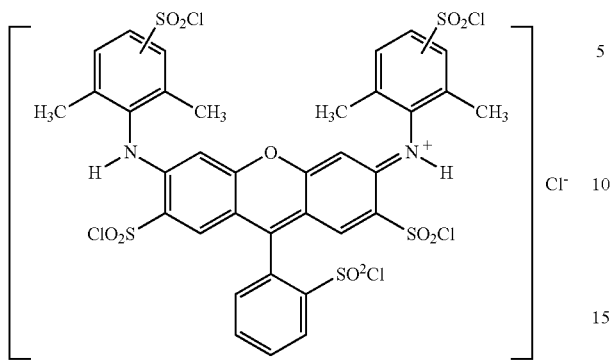

Exemplary Compound 1-2: Reaction mixture containing the following structure, and obtained by: reacting Compound A (2 mol) and ethylenediamine (1 mol); and then hydrolyzing unreacted sulfonyl=chloride with sodium hydroxide

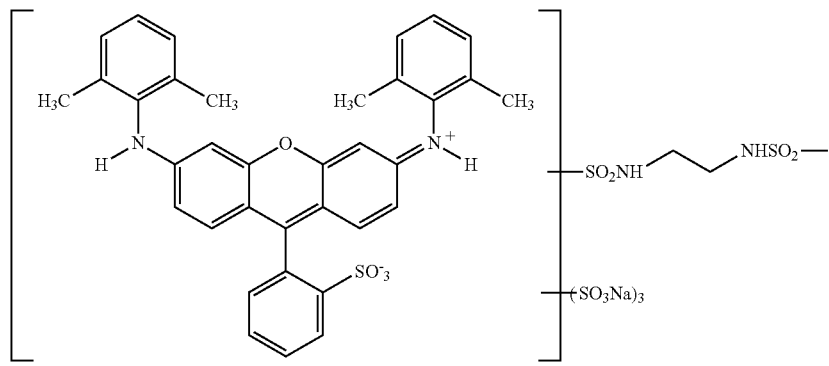

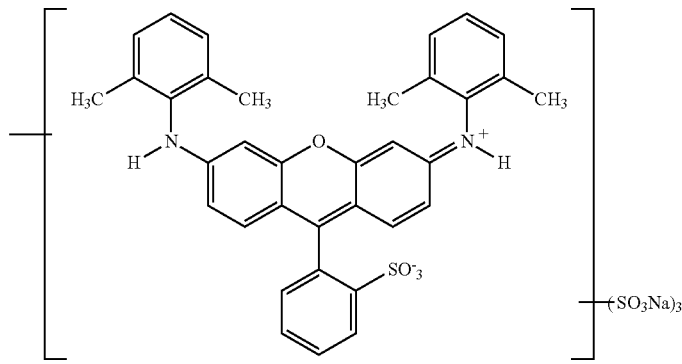

Exemplary Compound 1-3: Reaction mixture containing the following structure, and obtained by: reacting Compound A (2 mol) and piperazine (1 mol); and then hydrolyzing unreacted sulfonyl=chloride with sodium hydroxide

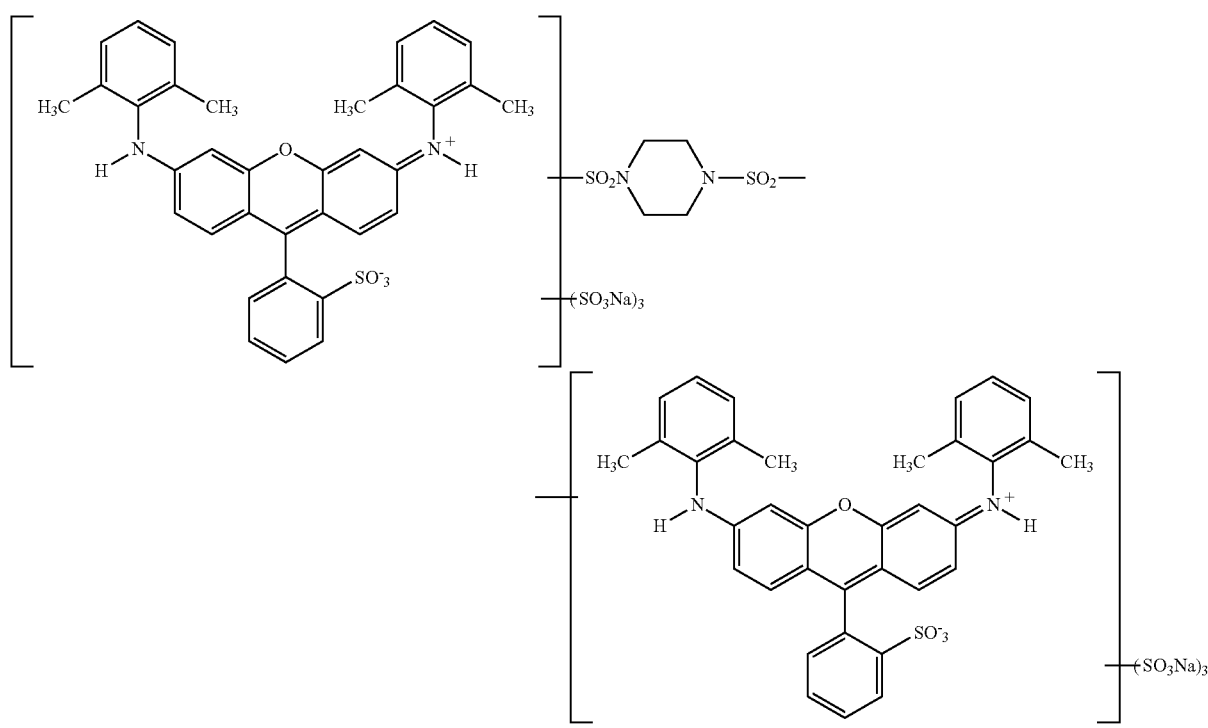

Exemplary Compound 1-4: Reaction mixture containing the following structure, and obtained by: reacting Compound A (2 mol) and 2,5-dimethylpiperazine (1 mol); and then hydrolyzing unreacted sulfonyl=chloride with sodium hydroxide Exemplary Compound 1-5: Reaction mixture containing the following structure, and obtained by: reacting Compound A (2 mol) and 1-(2-aminoethyl)piperazine (1 mol); and then hydrolyzing unreacted sulfonyl=chlorid with sodium hydroxide

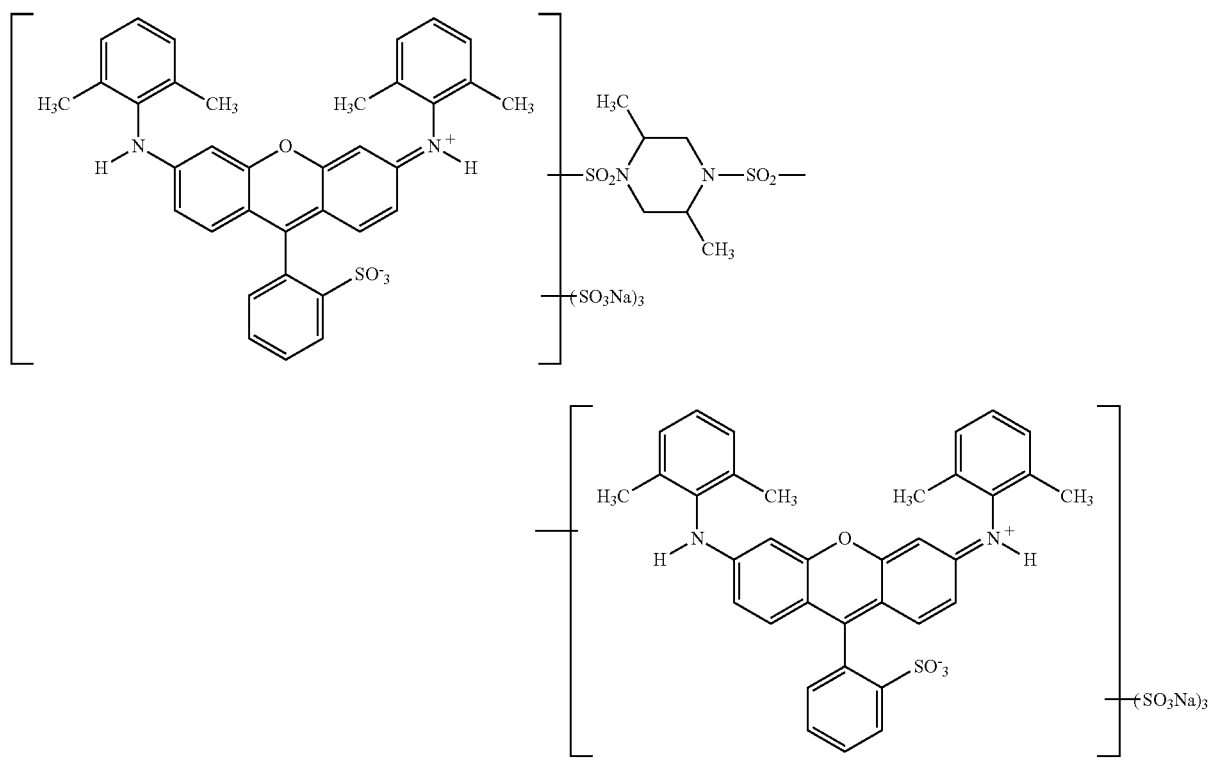

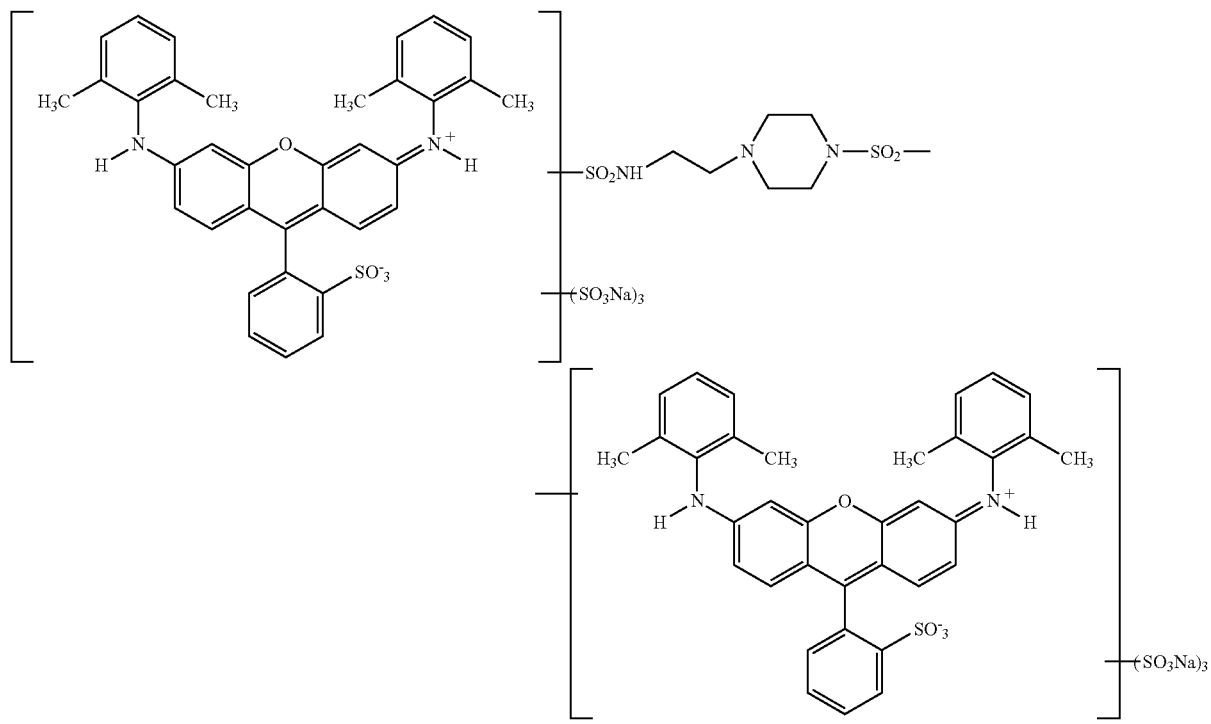

Exemplary Compound 1-6: Reaction mixture containing the following structure, and obtained by: reacting Compound A (2 mol) and 1,4-bis(3-aminopropyl)piperazine (1 mol); and then hydrolyzing unreacted sulfonyl=chloride with sodium hydroxide Exemplary Compound 1-7: Reaction mixture containing the following structure, and obtained by reacting Compound A (2 mol) and 1,2-cyclohexanediamine (1 mol); and then hydrolyzing unreacted sulfonyl=chloride with sodium hydroxide

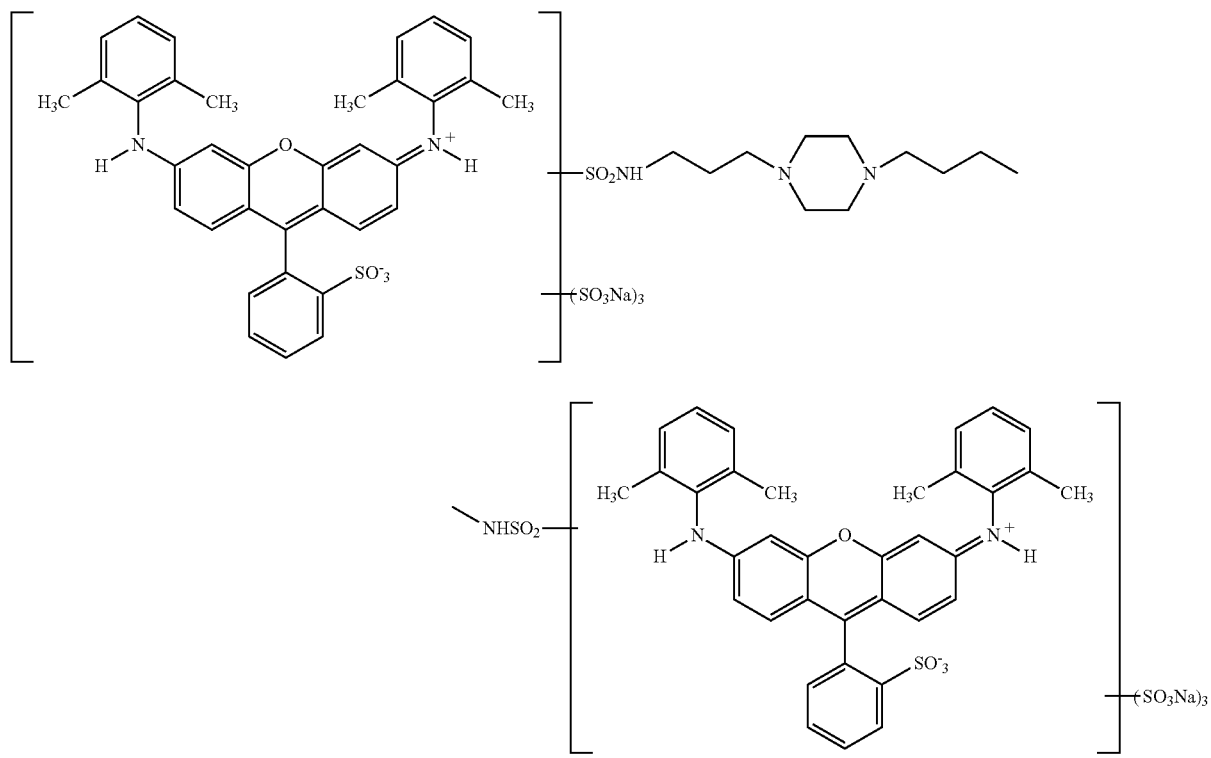

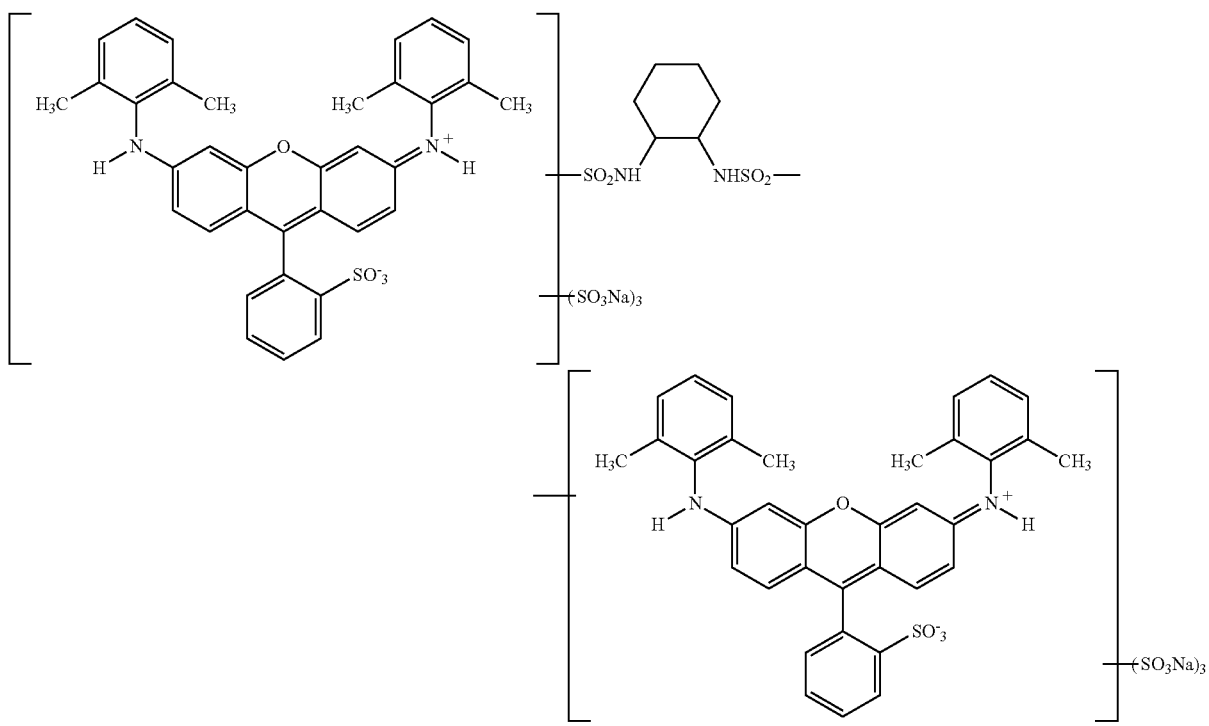

Exemplary Compound 1-8: Reaction mixture containing the following structure, obtained by: reacting Compound A (2 mol) and 1,3-cyclohexanediamine (1 mol); and then hydrolyzing unreacted sulfonyl=chloride with sodium hydroxide Exemplary Compound 1-9: Reaction mixture containing the following structure, and obtained by reacting: Compound A (2 mol) and 1,4-cyclohexanediamine (1 mol); and then hydrolyzing unreacted sulfonyl=chloride with sodium hydroxide

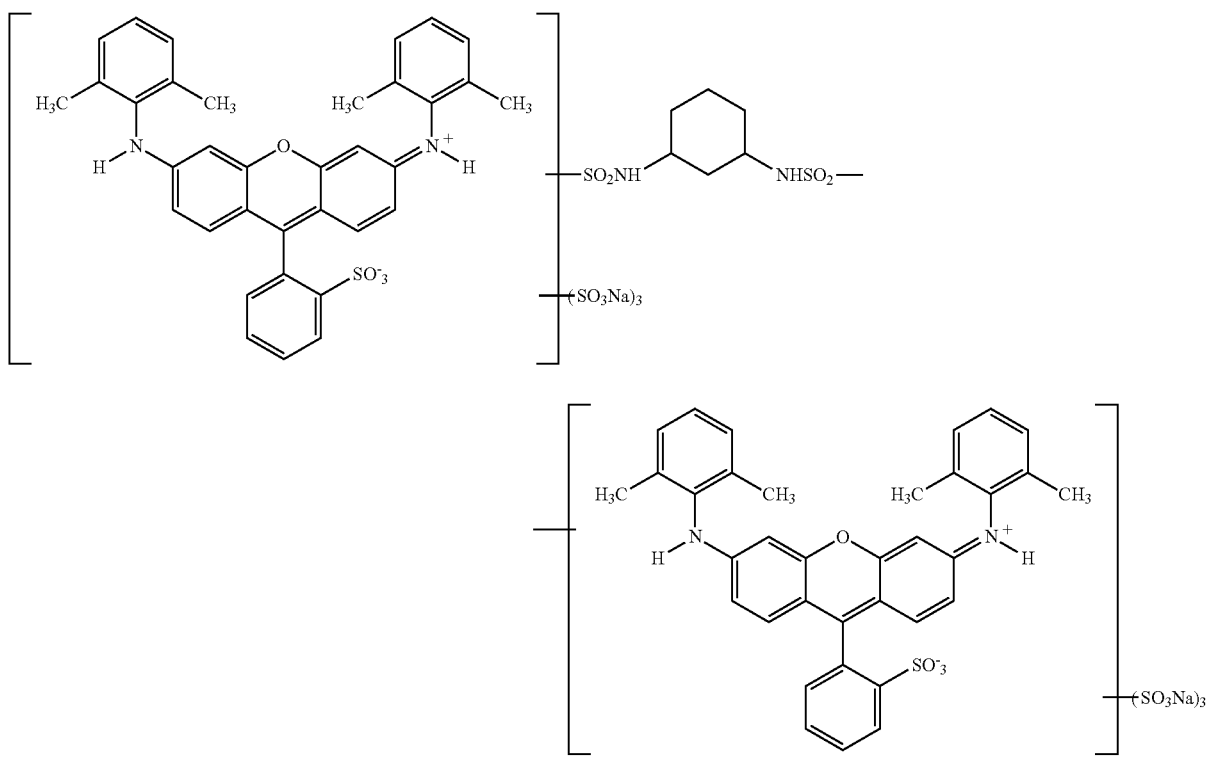

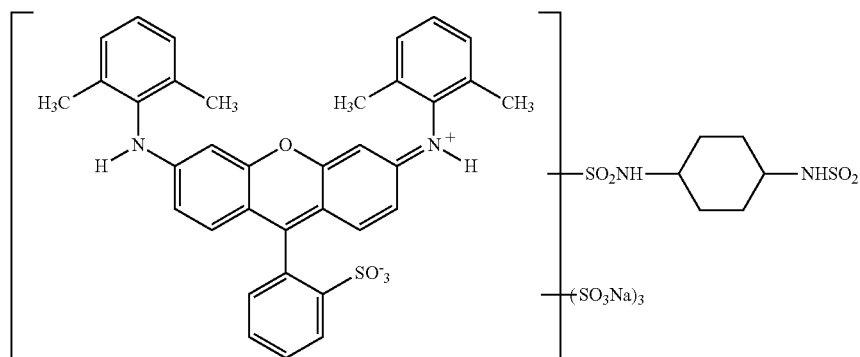

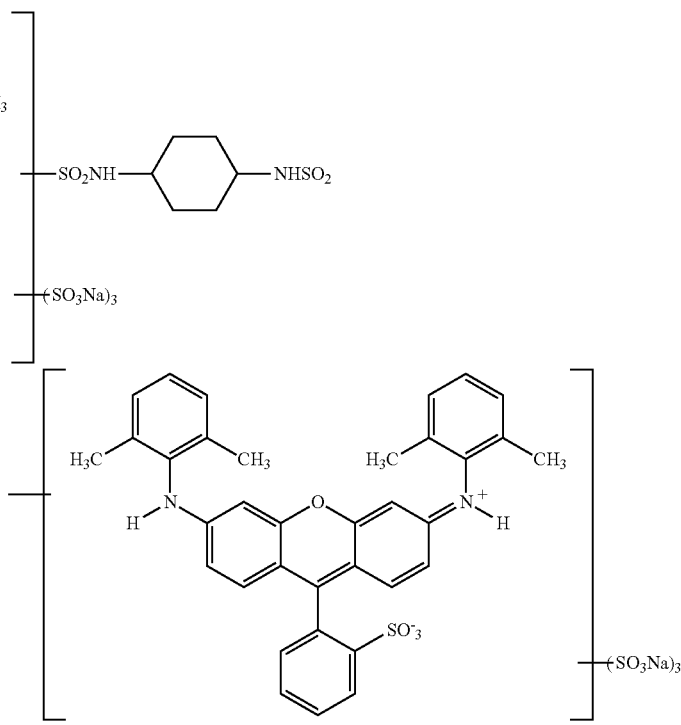

Exemplary Compound 1-10: Reaction mixture containing the following structure, and obtained by: reacting Compound A (2 mol) and m-phenylenediamine (1 mol); and then hydrolyzing unreacted sulfonyl=chloride with sodium hydroxide Exemplary Compound 1-11: Reaction mixture containing the following structure, and obtained by reacting Compound A (2 mol) and p-xylylenediamine (1 mol); and then hydrolyzing unreacted sulfonyl=chloride with sodium hydroxide

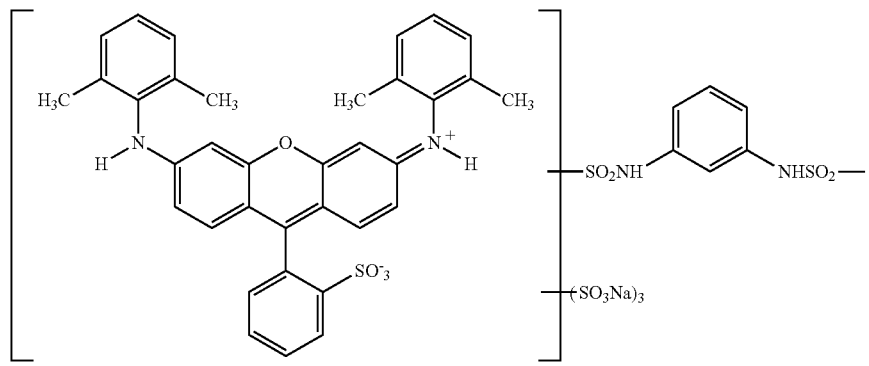

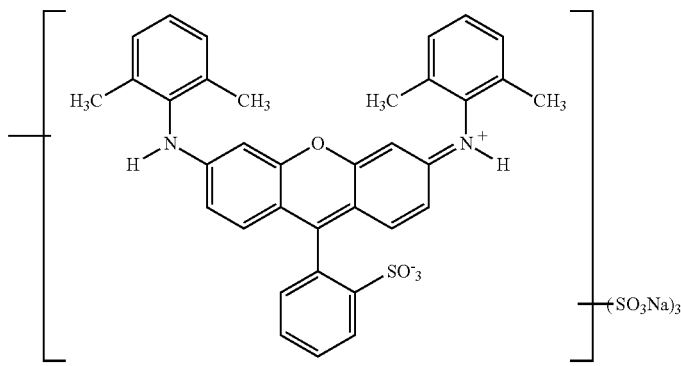

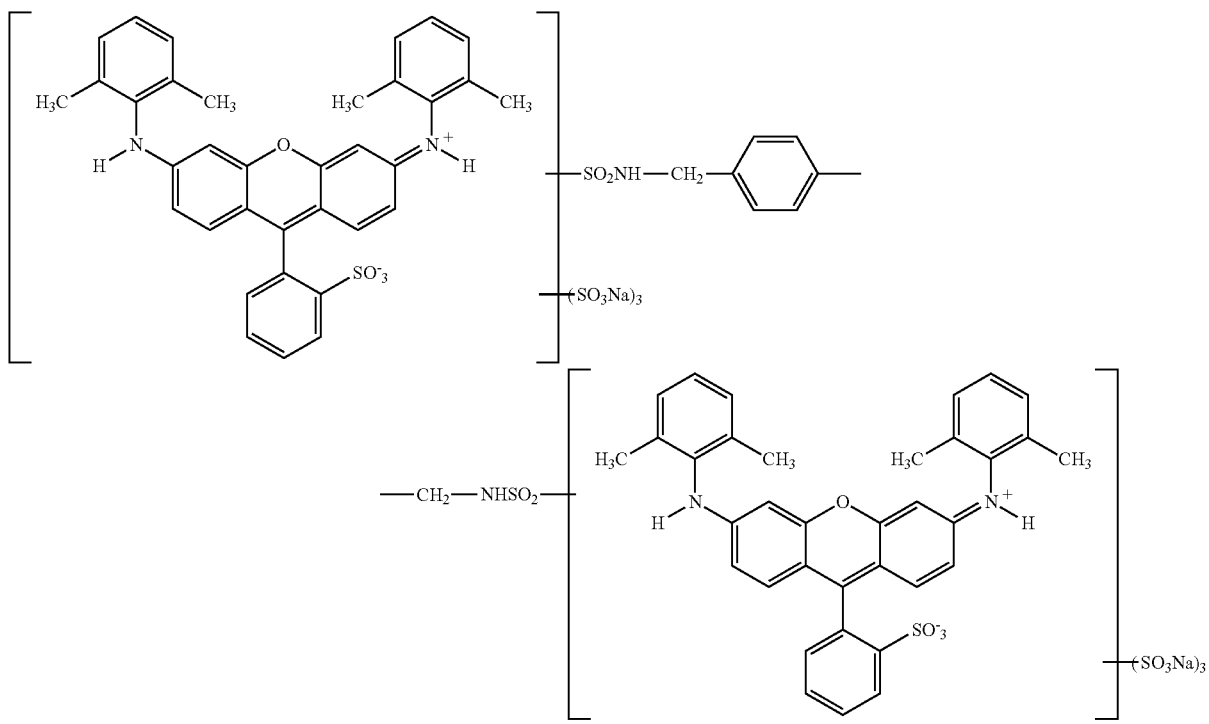

Exemplary Compound 1-12: Reaction mixture containing the following structure, and obtained by: reacting Compound A (2 mol) and disodium 4,6-di(2-aminoethylamino)-1,3,5-triazin-2-ylaminobenzene-2,5-disulfonate (1 mol); and then hydrolyzing unreacted sulfonyl=chloride with sodium hydroxide Exemplary Compound 1-13: Reaction mixture containing the following structure, and obtained by: reacting Compound A (2 mol) and disodium 4,6-di(2-aminoethylamino)-1,3,5-triazin-2-ylaminoisophthalate (1 mol); and then hydrolyzing unreacted sulfonyl=chloride with sodium hydroxide

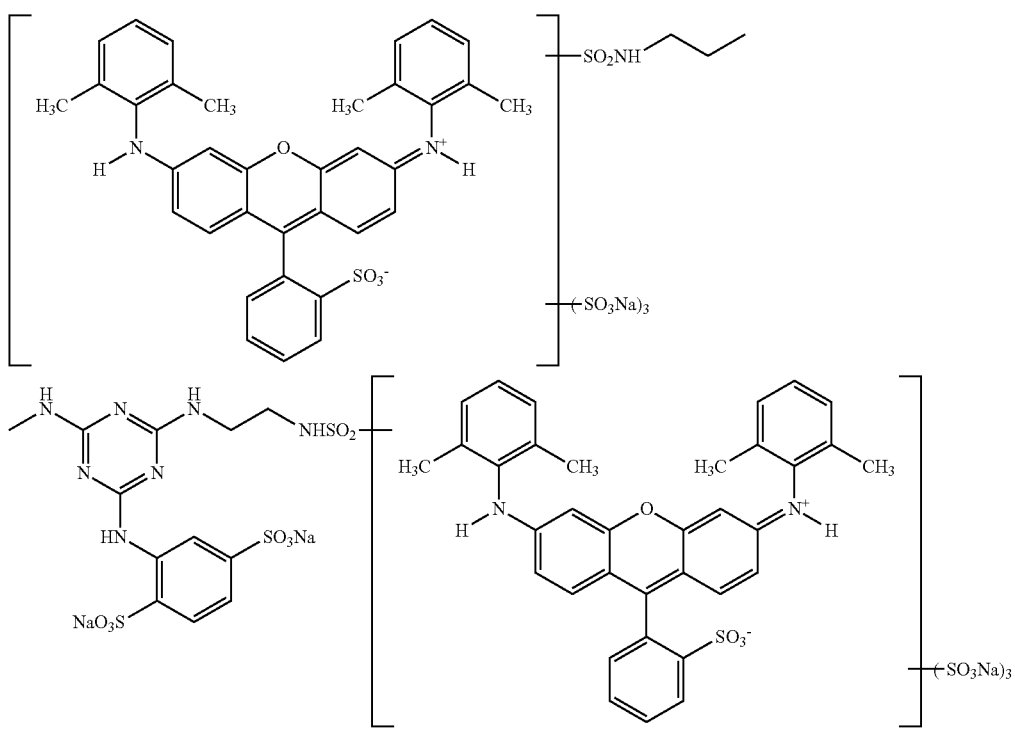

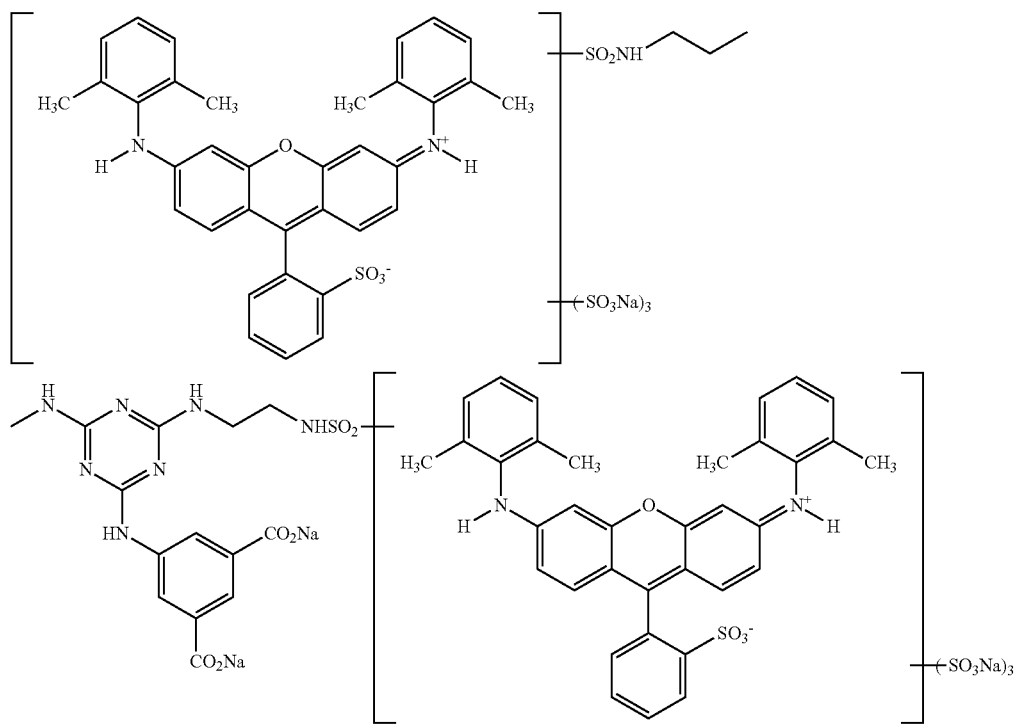
Exemplary Compound 1-14: Reaction mixture containing the following structure, and obtained by: reacting Compound A (2 mol) and disodium 4,6-di(2-aminoethylamino)-2-hydroxy-1,3,5-triazine (1 mol); and then hydrolyzing unreacted sulfonyl=chloride with sodium hydroxide
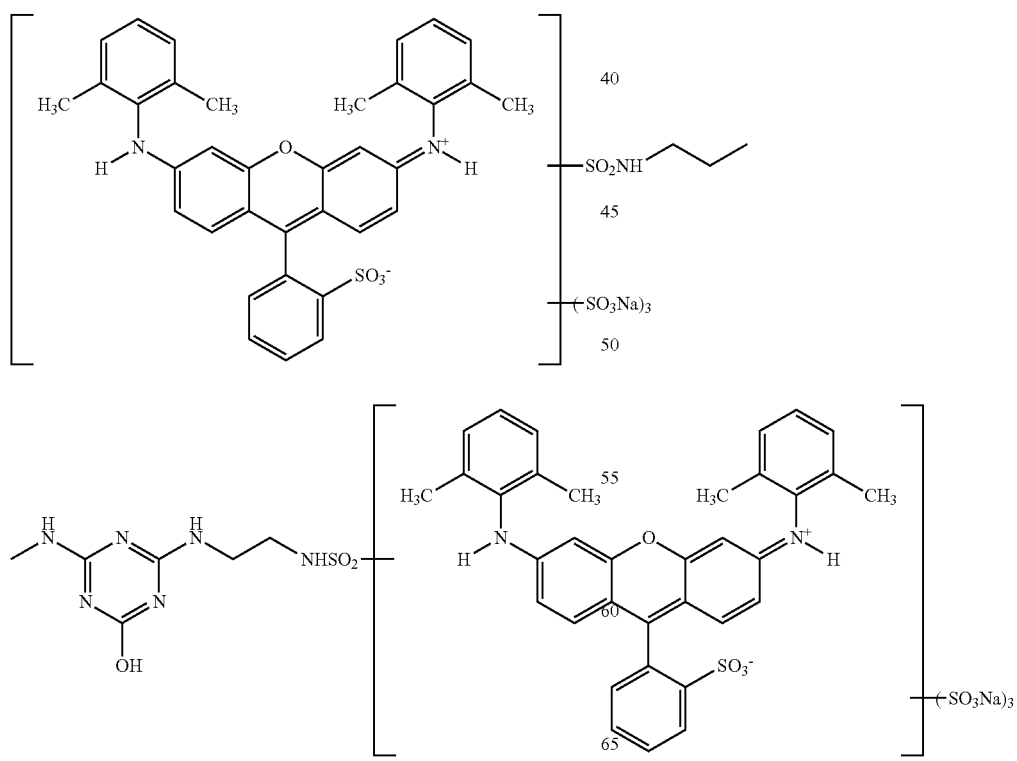

Exemplary Compound 1-15:
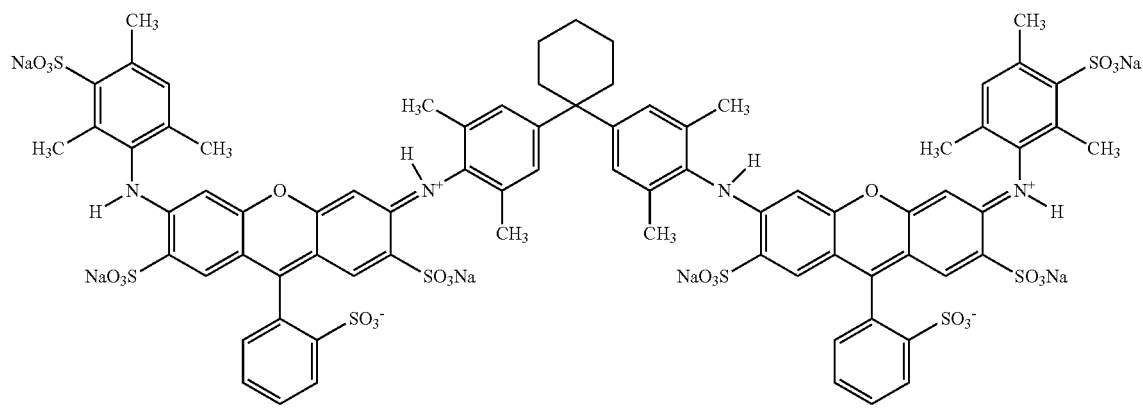
Exemplary Compound 1-16:
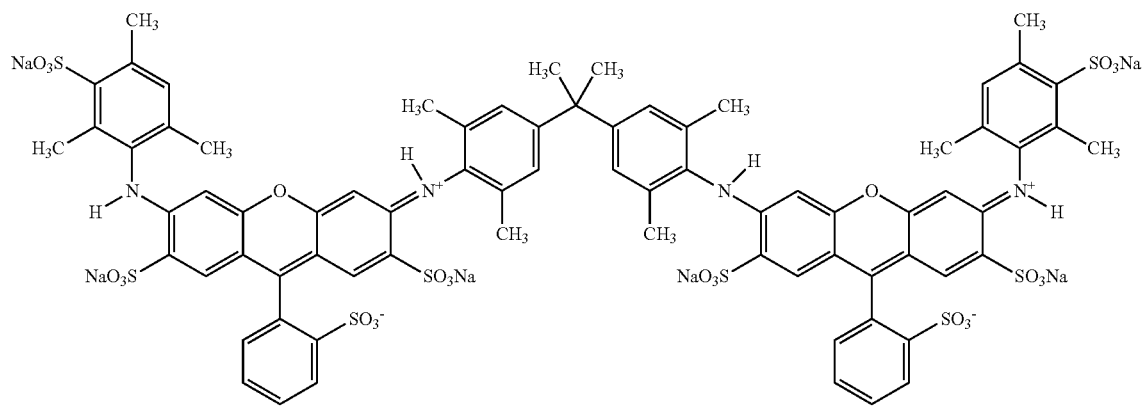
Exemplary Compound 1-17: Reaction mixture containing the following structure, and obtained by: reacting Compound B (2 mol) and 4,4'-diaminostilbene-2,2'-disulfonic acid (1 mol); and then hydrolyzing unreacted sulfonyl=chloride with sodium hydroxide
Compound B
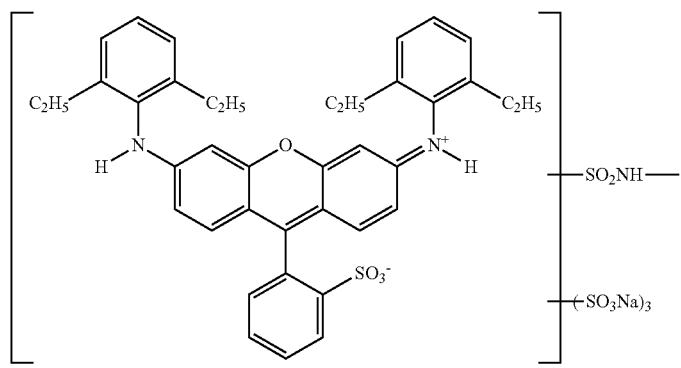

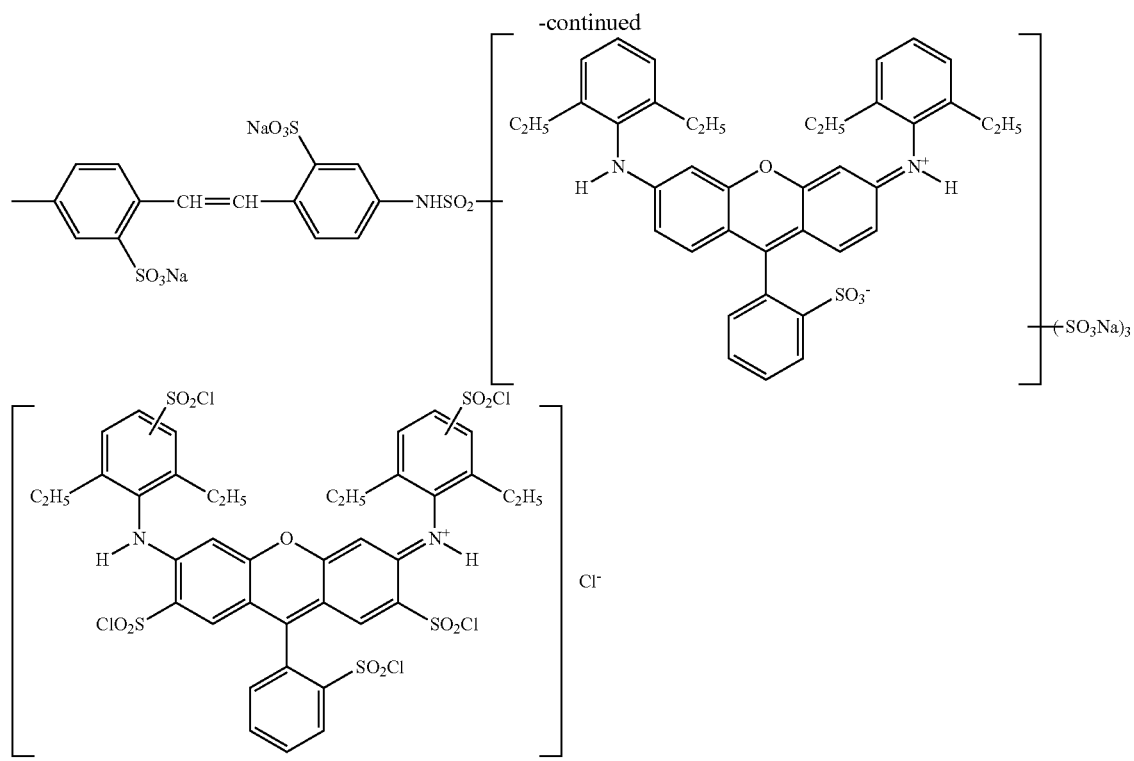
Exemplary Compound 1-18: Reaction mixture containing the following structure, and obtained by: reacting Compound C (2 mol) and 4,4'-diaminostilbene-2,2'-disulfonic acid (1 mol); and then hydrolyzing unreacted sulfonyl=chloride with sodium hydroxide
Compound C
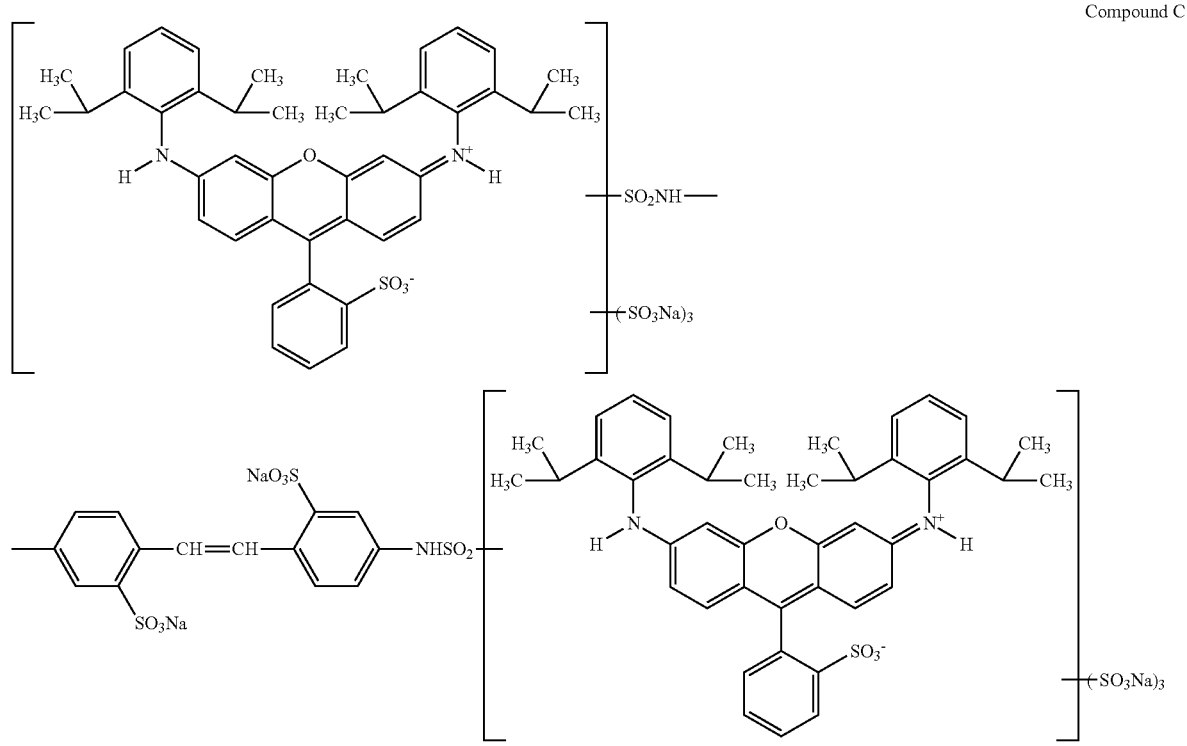

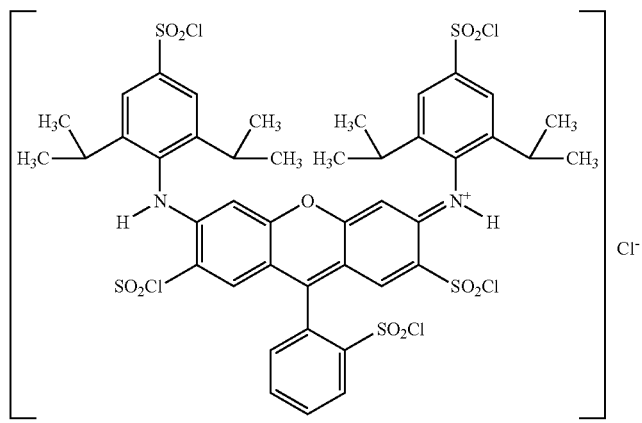
Exemplary Compound 1-19: Reaction mixture containing the following structure, and obtained by: reacting Compound D (2 mol) and 4,4'-diaminostilbene-2,2'-disulfonic acid (1 mol); and then hydrolyzing unreacted sulfonyl=chloride with sodium hydroxide
Compound D
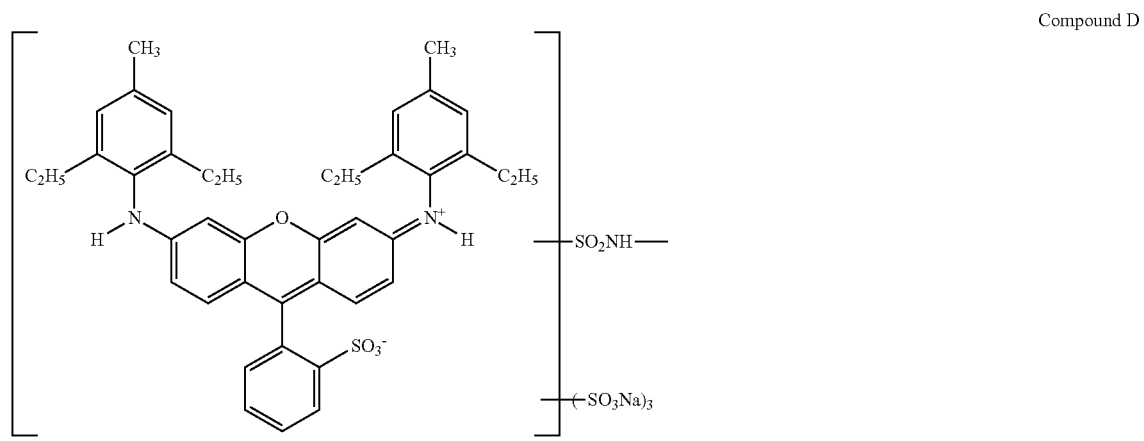
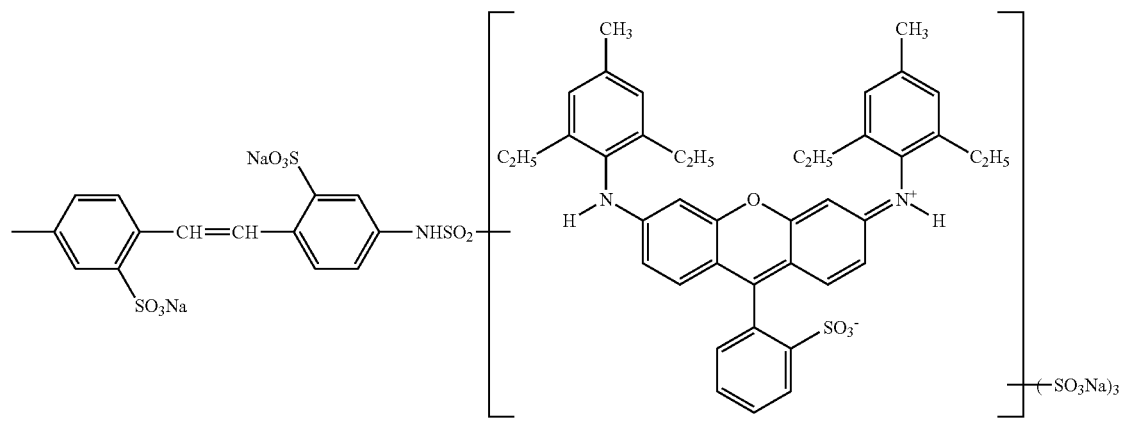

-continued

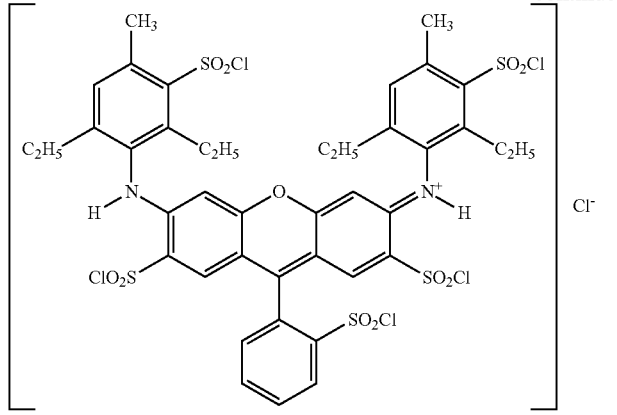

Exemplary Compound 1-20: Reaction mixture containing the following structure, and obtained by: reacting Compound A (1 mol), Compound B (1 mol) and 4,4'-diaminostilbene-2,2'-disulfonic acid (1 mol); and then hydrolyzing unreacted sulfonyl=chloride with sodium hydroxide

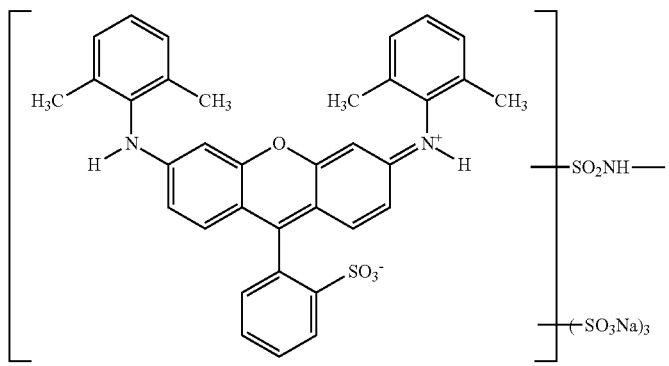

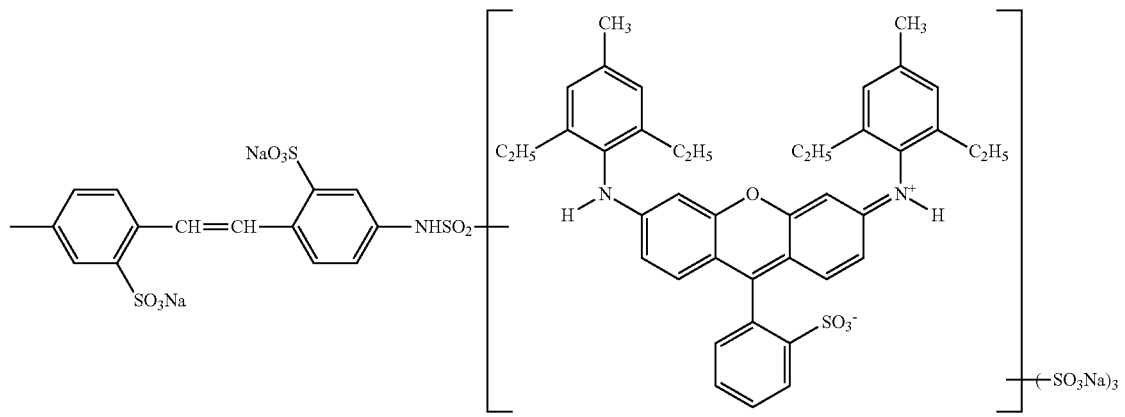

Exemplary Compound 1-21: Reaction mixture containing the following structure, and obtained by: reacting Compound A (2 mol) and 4,4'-diaminostilbene-2,2'-disulfonic acid (1 mol); and then hydrolyzing unreacted sulfonyl=chloride with lithium hydroxide

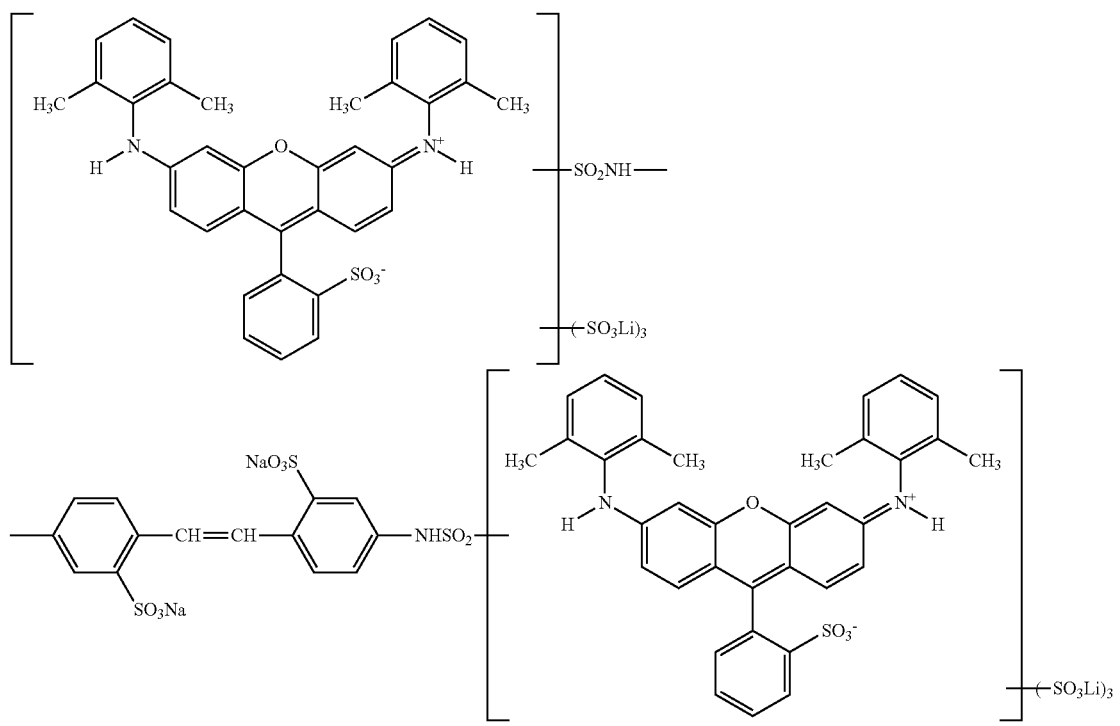
Exemplary Compound 1-22: Reaction mixture containing the following structure, and obtained by: reacting Compound A (2 mol) and 4,4'-diaminostilbene-2,2'-disulfonic acid (1 mol); and then hydrolyzing unreacted sulfonyl=chloride with potassium hydroxide
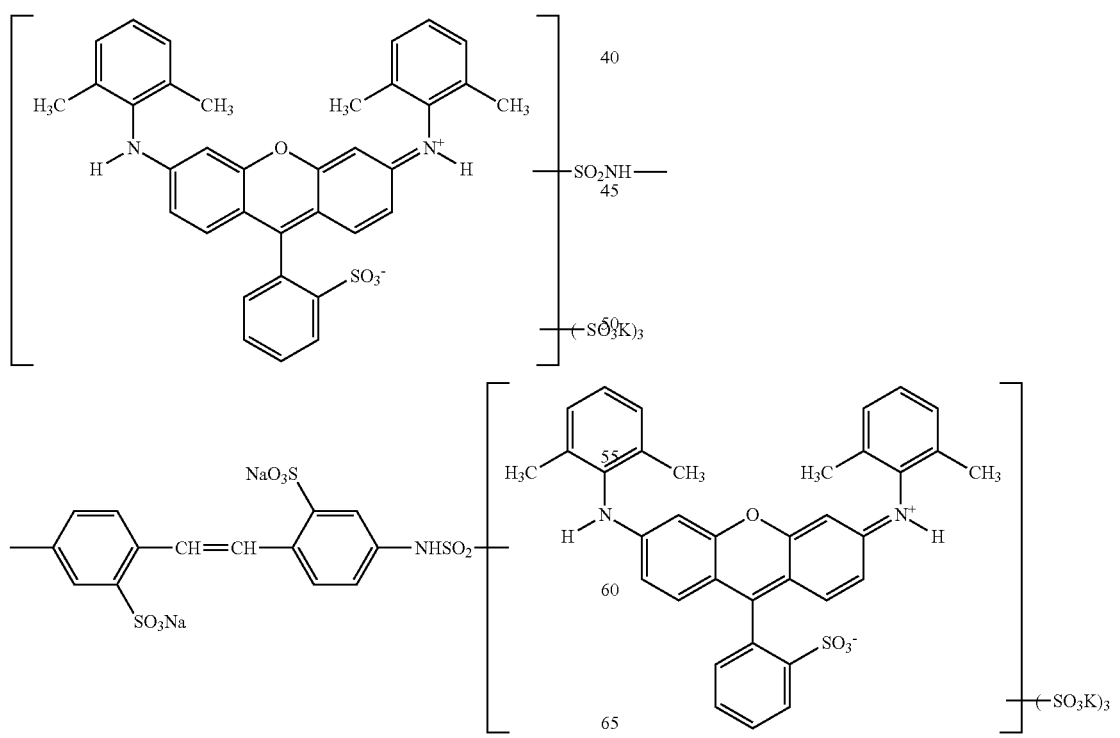

Exemplary Compound 1-23: Reaction mixture containing the following structure, and obtained by: reacting Compound A (2 mol) and 4,4'-diaminostilbene-2,2'-disulfonic acid (1 mol); hydrolyzing unreacted sulfonyl=chloride sodium hydroxide; and being converted into an ammonium salt by using an ion exchange resin

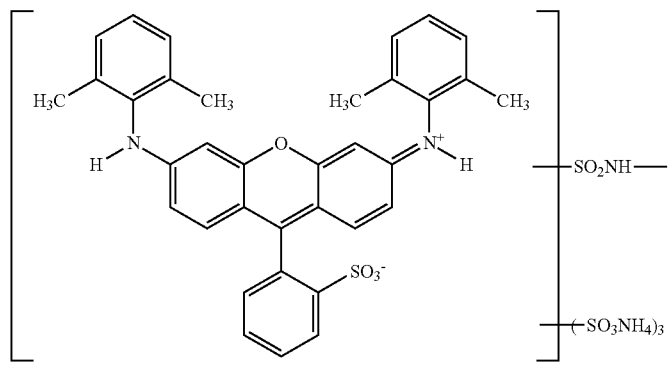

Exemplary Compound 1-24: Reaction mixture containing the following structure, and obtained by: reacting Compound E (2 mol) and 4,4'-diaminostilbene-2,2'-disulfonic acid (1 mol); and then hydrolyzing unreacted sulfonyl=chloride with sodium hydroxide

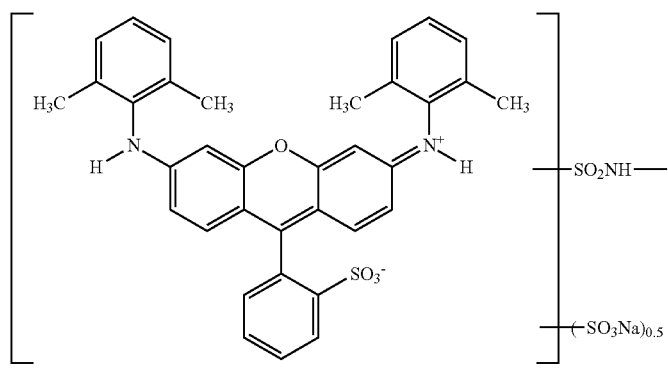

Compound E: Approximately 1:1 mixture of Compounds E1 and E2
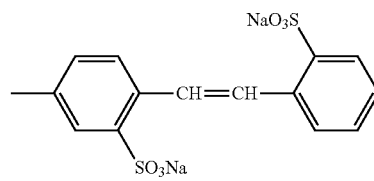
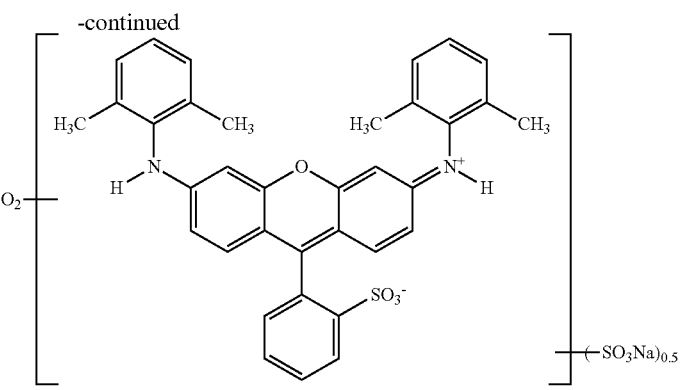
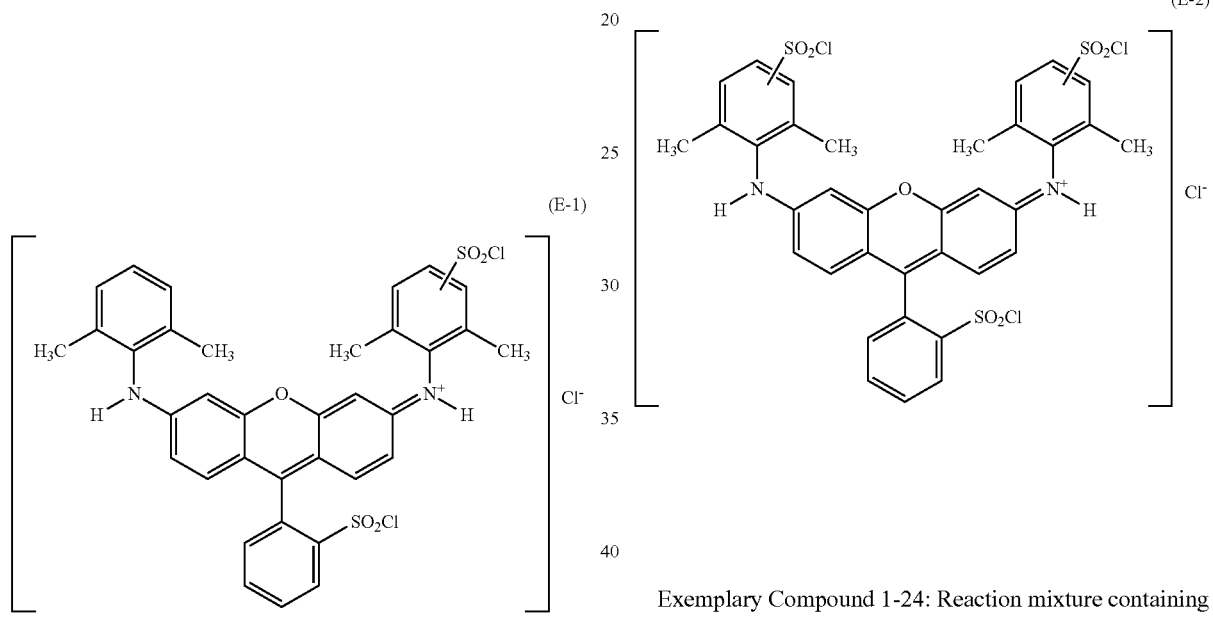
Exemplary Compound 1-24: Reaction mixture containing the following structure, and obtained by: reacting Compound E (2 mol) and disodium 4,6-di(2-aminoethylamino)-1,3,5-triazin-2-ylaminoisophthalate (1 mol); and then hydrolyzing unreacted sulfonyl=chloride with sodium hydroxide
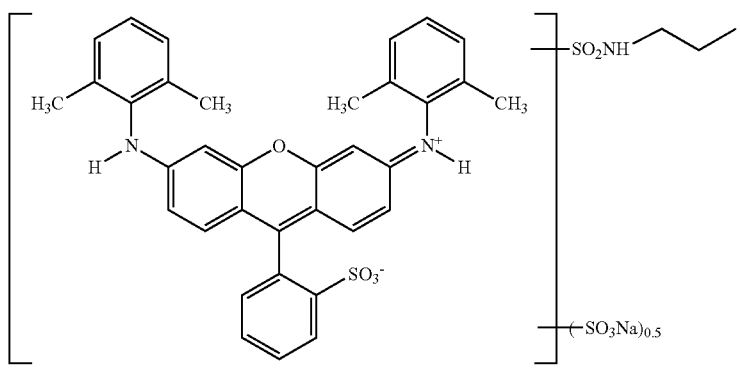

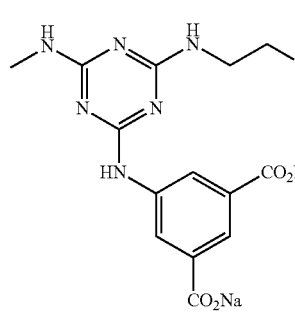
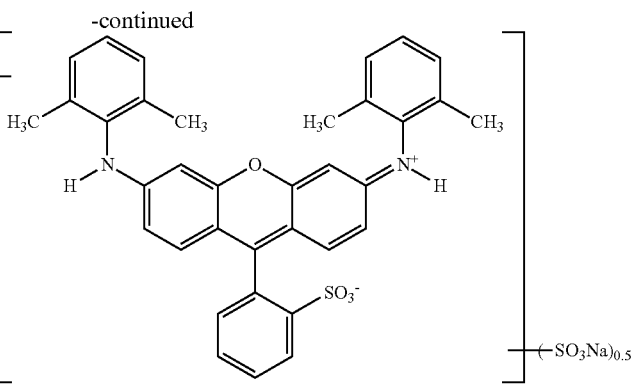
-continued

[Copper Compound that is Soluble in Water]

The coloring composition of the present invention contains a copper compound that is soluble in water. Herein, the term "soluble in water" means dissolution in a ratio of 0.5% by mass or more in water, at 25° C.

The copper compound used in the present invention may be preferably at least one kind selected from the group consisting of copper (II) chlorate, copper (II) chloride, copper (II) salicylate, copper (II) gluconate, copper (II) formate, copper (II) disodium ethylenediaminetetraacetate, and copper (II) acetate. The copper compound may be more preferably at least one kind selected from the group consisting of copper (II) chloride, copper (II) chlorate, copper (II) gluconate, copper (II) formate, and copper (II) disodium ethylenediaminetetraacetate from the viewpoint of the solubility in ink. The copper compound may be more preferably copper (II) gluconate and/or copper (II) disodium ethylenediaminetetraacetate, and most preferably copper (II) gluconate, from the viewpoint of the safety. By containing the compound in the coloring composition of the present invention, it is possible to realize a recording image having a good light fastness without damaging the hue of the coloring material.

[Coloring Composition]

The coloring composition of the present invention contains at least one kind of the compound represented by Formula (1) or the compound represented by Formula (4), and the copper compound that is soluble in water. Although a detailed mechanism in which the light fastness becomes further better by addition of the copper compound to a dye is not clear, it is assumed that the copper compound has a function to relax the excited state of the dye caused by photo-excitation. Also, it can be surprisingly seen that the coloring composition of the present invention is excellent in stability over time beyond expectation. The cause for this is assumed that the compound represented by Formula (1) or Formula (4) used in the coloring composition of the present invention has excessive sulfo groups in its structure, and thus is dissolved in water instead of being insolubilized (lake pigmented) by the copper compound of the dye.

The coloring composition of the present invention may include a medium. Especially, the coloring composition is suitable for ink for inkjet recording if a solvent is used as the medium. The coloring composition of the present invention may be prepared by dissolving and/or dispersing the compound of the present invention using an oleophilic medium or an aqueous medium as the medium. Preferably, the aqueous medium may be used. The coloring composition of the present invention also includes a composition for ink except the medium.

In the present invention, the content of the compound represented by Formula (1) or the compound represented by Formula (4) contained in the coloring composition is determined depending on, for example, the kind of a substituent in Formula (1) or Formula (4) to be used or the kind of a solvent component used for preparing the coloring composition. However, the content of the compound represented by Formula (1) or Formula (4) in the coloring composition is preferably 1% by mass to 20% by mass, more preferably 1% by mass to 10% by mass, and particularly preferably 2% by mass to 6% by mass based on the total mass of the coloring composition.

If the content of the compound represented by Formula (1) or Formula (4) contained in the coloring composition is 1% by mass or more, the color strength of the ink printed on a recording medium may be good and also a required image density may be secured. Also, if the total amount of the compound represented by Formula (1) or Formula (4) contained in the coloring composition is 20% by mass or less, there can be achieved effects in that a discharging property of the coloring composition is good, and further, an inkjet nozzle is suppressed from being clogged when used in an inkjet recording method.

In the present invention, the content of the copper compound contained in the coloring composition is preferably 0.05% by mass to 5% by mass, more preferably 0.1% by mass to 4% by mass, and still more preferably 0.25% by mass to 1.5% by mass. By setting within this range, a recording image having a good light fastness may be achieved without damaging the hue of the coloring material.

The mass ratio of the contents of the compound represented by Formula (1) or Formula (4) and the copper compound that is soluble in water contained in the coloring composition is preferably 350/1 to 7/3, more preferably 35/1 to 7/3, and particularly preferably 14/1 to 7/3. By setting within the range of 350/1 to 7/3, a recording image having a good light fastness may be realized without damage to a color, and also a high reliability in storage stability in an ink solution, clogging in inkjet printing and the like is achieved.

The coloring composition of the present invention may contain other additives in a range not impairing the effects of the present invention, if necessary. Other additives may include additives that may be used in ink for inkjet recording as described below.

[Ink for Inkjet Recording]

Hereinafter, ink for inkjet recording of the present invention will be described.

The present invention also relates to an ink for inkjet recording which contains the coloring composition of the present invention.

The ink for inkjet recording may be prepared by dissolving and/or dispersing the compound (mixture) of the present invention in an oleophilic medium or an aqueous medium. Preferably, the ink is prepared by the aqueous medium.

If necessary, other additives may be contained in a range not impairing the effects of the present invention. For example, other additives may be known additives such as, for example, a drying preventing agent (wetting agent), a discoloration preventing agent, an emulsion stabilizer, a permeation promoting agent, a UV absorbent, a preservative, a mycostat, a pH adjusting agent, a surface tension regulator, an antifoaming agent, a viscosity regulator, a dispersant, a dispersion stabilizer, a rust inhibitor and a chelating agent. These various kinds of additives are directly added to an ink solution in the case of a water-soluble ink. In the case where an oil-soluble dye is used in a form of a dispersant, the additives are generally added to the dispersant after preparation of the dye dispersant, but may be added in an oil phase or an aqueous phase during the preparation.

The drying preventing agent is appropriately used for the purpose of suppressing an ink discharging hole of a nozzle used in an inkjet recording method from being clogged due to the dryness of the ink for inkjet recording.

The drying preventing agent is preferably a water-soluble organic solvent having vapor pressure lower than that of water. Specific examples thereof may include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerine and trimethylolpropan, lower alkyl ethers of polyhydric alcohol such as ethylene glycol monomethyl (or ethyl)ether, diethylene glycol monomethyl (or ethyl)ether and triethylene glycol monoethyl (or butyl)ether, heterocyclic rings such as 2-pyrrolidone, N-methyl-2-pyrrolidone, 1,3-dimethyl-2-imidazolidinone and N-ethylmorpholine, a sulfur-containing compound such as sulfolan, dimethylsulfoxide and 3-sulfolene, a polyfunctional compound such as diacetone alcohol or diethanol amine, and a urea derivative. Among them, polyhydric alcohol such as glycerine or diethylene glycol is more preferred. Further, the drying preventing agent may be used either alone or in combination of two kinds or more thereof. It is preferred that the drying preventing agent is contained in the ink in an amount of 10% by mass to 50% by mass.

The permeation promoting agent is appropriately used for the purpose of allowing the ink for inkjet recording to be permeated through paper well. As the permeation promoting agent, alcohols such as ethanol, isopropanol, butanol, di(tri) ethylene glycol monobutylether and 1,2-hexanediol, sodium lauryl sulfate, sodium oleate and a non-ionic surfactant, or the like may be used. If the aforementioned permeation promoting agent is included in the ink in an amount of 5% by mass to 30% by mass in the ink, there is generally a sufficient effect, and it is preferred to use the permeation promoting agent in the range of the addition amount not causing spreading of print and print-through.

The UV absorbent is used for the purpose of improving a preservation property of an image. As the UV absorbent, a compound absorbing UV to emit fluorescence, that is, a so-called fluorescent brightening agent, which is represented by a benzotriazole-based compound described in Japanese Patent Application Laid-Open Nos. S58-185677, S61-190537, H2-782, H5-197075 and H9-34057, a benzophenone-based compound described in Japanese Patent Application Laid-Open Nos. S46-2784, H5-194483 and U.S. Pat. No. 3,214,463, a cinnamic acid-based compound described in Japanese Patent Publication Nos. S48-30492, S56-21141 and H10-88106, a triazine-based compound described in Japanese Patent Application Laid-Open Nos. H4-298503, H8-53427, H8-239368, H10-182621 and H8-501291, a compound described in Research Disclosure No. 24239, or a stilbene-based or benzooxazole-based compounds may be used.

The discoloration prevention agent is used for the purpose of improving a preservation property of an image. As the discoloration prevention agent, various kinds of organic and metal complex-based discoloration prevention agents may be used. The organic discoloration prevention agent is hydroquinones, alkoxyphenols, dialkoxyphenols, phenols, anilines, amines, indanes, cromanes, alkoxyanilines, heterocyclics or the like, and the metal complex is a nickel complex, a zinc complex or the like. More specifically, the compound described in the patent documents cited in Paragraphs I to J of VII of Research Disclosure No. 17643, Research Disclosure Nos. 15162, the left column on page 650 of Research Disclosure No. 18716, page 527 of Research Disclosure No. 36544, page 872 of Research Disclosure No. 307105 and Research Disclosure No. 15162, or a compound included in the formula of a representative compound and examples of the compounds described on pages 127 to 137 of Japanese Patent Application Laid-Open No. S62-215272 may be used.

The mycostat may be sodium dehydroacetic acid, sodium benzoate, sodium pyridinethione-1-oxide, ethylester p-hydroxybenzoate, 1,2-benzisothiazolin-3-one or a salt thereof. These may be preferably used in the ink in an amount of 0.02% by mass to 1.00% by mass.

As the pH adjusting agent, a neutralizing agent (organic base or inorganic alkali) may be used. The pH adjusting agent is added for the purpose of improving the storage stability of the ink for inkjet recording, so that the pH of the ink for inkjet recording is preferably 6 to 10, and more preferably 7 to 10.

The surface tension regulator may be a non-ionic, cationic or anionic surfactant. Also, the surface tension of the ink for inkjet recording of the present invention preferably ranges from 25 mN/m to 70 mN/m, and more preferably ranges from 25 mN/m to 60 mN/m. Also, the viscosity of ink for inkjet recording of the present invention is preferably 30 mPa·s or less, and is more preferably adjusted to 20 mPa·s or less. Examples of the surfactant preferably include an anionic surfactant such as a fatty acid salt, an alkyl ester sulfate salt, an alkylbenzene sulfonate salt, an alkylnaphthalene sulfonate salt, a dialkyl sulfosuccinate salt, an alkyl ester phosphate salt, a naphthalene sulfonic acid formaline condensate and a polyoxyethylenealkyl ester sulfate salt, or a non-ionic surfactant such as polyoxyethylenealkylether, polyoxyethylenealkylallylether, polyoxyethylene fatty acid ester, sorbitan fatty acid ester, polyoxyethylene sorbitan fatty acid ester, polyoxyethylenealkylamine, glycerine fatty acid ester and an oxyethyleneoxypropylene block copolymer. Further, SUR-FYNOLS (AirProducts & Chemicals, Co., Ltd.) that is an acetylene-based polyoxyethylene oxide surfactant is preferably used. Further, an amine oxide type ampholytic surfactant such as N,N-dimethyl-N-alkylamine oxide is preferred. Moreover, a matter exemplified as a surfactant on pp. 37 to 38 of Japanese Patent Application Laid-Open No. S59-157,636 and Research Disclosure No. 308119 (1989) may be used.

As the antifoaming agent, a fluorine-based or silicon-based compound, a chelating agent represented by EDTA, or the like may be used if necessary In the case where the compound of the present invention is dispersed in an aqueous medium, it is preferred that coloring fine particles containing the compound and an oil-soluble polymer are dispersed in the aqueous medium as described in Japanese Patent Application Laid-Open No. H11-286637, Japanese Patent Application Nos. 2000-78491, 2000-80259 and 2000-62370, or the compound of the present invention dissolved in a high boiling point organic solvent is dispersed in the aqueous medium as described in Japanese Patent Application Nos. H2000-78454, 2000-78491, 2000-203856 and 2000-203857. In the case where the compound of the present invention is dispersed in the aqueous medium, a specific method, an oil-soluble polymer, a high boiling point organic solvent, additives, and the amounts thereof to be used may preferably refer to the description in the aforementioned patent documents. Otherwise, the compound of the present invention may be dispersed in a solid fine particle state. In the dispersion, a dispersant or a surfactant may be used. As a dispersion device, a simple stirrer or impeller agitation type, an inline agitation type, a mill type (for example, a colloid mill, a ball mill, a sand mill, an attritor, a roll mill or an agitator mill), an ultrasonic type, and a high pressure emulsification and dispersion type (high pressure homogenizer; Goehring homogenizer, microfluidizer, DeBEE2000 or the like as a specific commercially-available device) may be used. The aforementioned method of preparing the ink for inkjet recording is described in detail in Japanese Patent Application Laid-Open Nos. H5-148436, H5-295312, H7-97541, H7-82515, H7-118584 and H11-286637, and Japanese Patent Application No. 2000-87539, in addition to the aforementioned patent documents, and may be used for the ink for inkjet recording of the present invention.

As the aqueous medium, a mixture that contains water as a main component, and if necessary, is added with a water-miscible organic solvent may be used. Examples of the water-miscible organic solvent may include alcohol (for example, methanol, ethanol, propanol, isopropanol, butanol, isobutanol, sec-butanol, t-butanol, pentanol, hexanol, cyclohexanol and benzylalcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerine, hexanetriol and thiodiglycol), a glycol derivative (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether), amine (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethylpropylenediamine), and other polar solvents (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone). Meanwhile, the water-miscible organic solvents may be used in combination of two or more thereof.

In 100 parts by mass of the ink for inkjet recording of the present invention, the compound represented by Formula (1) or Formula (4) is contained preferably in an amount of 0.2 parts by mass to 10 parts by mass, and more preferably in an amount of 1 part by mass to 6 parts by mass. Also, in the ink for inkjet recording of the present invention, the compound of the present invention may be used in combination with other colorants. When two or more kinds of colorants are used in combination, the total content of the colorants is preferably within the aforementioned range.

The ink for inkjet recording of the present invention preferably has a viscosity of 30 mPa·s or less. Also, the surface tension is preferably 25 mN/m to 70 mN/m. The viscosity and the surface tension may be adjusted by addition of various kinds of additives, such as, for example, a viscosity regulator, a surface tension regulator, a specific fastness adjusting agent, a film regulator, a UV absorbent, an antioxidant, a discoloration prevention agent, a mycostats, a rust inhibitor, a dispersant and a surfactant.

The ink for inkjet recording of the present invention may be used to form a monochromic image or form an image of a full color. In order to form the full color image, a magenta hue ink, a cyan hue ink and a yellow hue ink may be used, and also a black hue ink may be further used so as to set up hues.

As an applicable yellow dye, arbitrary matters may be used. Examples thereof may include an aryl or heterylazo dye having heterocyclic rings such as phenols, naphthols, anilines, pyrazolone or pyridones, chain-opening active methylene compounds, or the like as a coupling component (hereinafter, referred to as "coupler component"); an azomethine dye having chain-opening active methylene compounds or the like as a coupler component; a methine dye such as, for example, a benzylidene dye and a monomethineoxonol dye; and a quinine-based dye such as, for example, a naphthoquinone dye and an anthraquinone dye. Examples of other kinds of the dye may include a quinophthalon dye, a nitro and nitroso dye, an acridine dye, an acrydinone dye and the like.

As an applicable magenta dye, arbitrary matters may be used. Examples thereof may include an aryl or heterylazo dye having phenols, naphthols, anilines or the like as a coupler component; an azomethine dye having pyrazolones, pyrazolotriazoles or the like as a coupler component; a methine dye such as an arylidene dye, a styryl dye, a melocyanine dye, a cyanine dye and an oxonol dye; a carbonium dye such as a diphenylmethane dye, a triphenylmethane dye and a xanthene dye, a quinone-based dye such as naphthoquinone, anthraquinone and anthrapyridone, and a condensed polycyclic ring-based dye such as a dioxadin dye.

As an applicable cyan dye, arbitrary matters may be used. Examples thereof may include an aryl or heterylazo dye having phenols, naphthols, anilines or the like as a coupler component; an azomethine dye having heterocyclic rings such as phenols, naphthols, and pyrrolotriazoles, or the like as a coupler component; a polymethine dye such as a cyanine dye, an oxonol dye and a melocyanine dye; a carbonium dye such as a diphenylmethane dye, a triphenylmethane dye and a xanthene dye; a phthalocyanine dye; an anthraquinone dye; indigo and thioindigo dyes and the like.

Each of the aforementioned dyes may be a matter in which a portion of chromophore is dissociated to initially have each color of yellow, magenta and cyan, and in this case, the countercation may be an inorganic cation such as alkali metal or ammonium, an organic cation such as pyridinium or a quaternary ammonium salt, or a polymer cation having the aforementioned cations as a partial structure.

Examples of an applicable black coloring material may include a dispersing element of carbon black besides disazo, trisazo and tetrazo dyes.

The ink composition of the present invention may be used in a recording method such as, for example, sealing, copying, marking, writing, drawing and stamping, and is particularly suitably used in an inkjet recording method.

[Inkjet Recording Method]

The present invention also relates to an inkjet recording method of forming an image by using the coloring composition or the ink for inkjet recording of the present invention.

The inkjet recording method of the present invention donates energy to the ink for inkjet recording, and forms an image on known image-receiving materials, that is, plain paper, resin-coated paper, exclusive inkjet paper described in, for example, Japanese Patent Application Laid-Open Nos. H8-169172, H8-27693, H2-276670, H7-276789, H9-323475, S62-238783, Japanese H10-153989, H10-217473, H10-235995, H10-337947, H10-217597 and H10-337947, film, paper for use in electrophotography, fabric, glass, metal, ceramic, or the like.

When an image is formed, a polymer fine particle dispersion (also known as polymer latex) may be used in combination in order to impart a glossiness or a water fastness, or improve a weather fastness. The polymer latex may be added to the image-receiving material before, after or simultaneously with application of a colorant, and accordingly, may be added into image-receiving paper, or ink, or used alone as a liquid. Specifically, the methods described in Japanese Patent Application Nos. 2000-363090, 2000-315231, 2000-354380, 2000-343944, 2000-268952, 2000-299465, 2000-297365, and the like may be preferably used.

Hereinafter, the recording paper and the recording film used to perform inkjet printing by using ink of the present invention will be described.

In the recording paper and the recording film, a support is formed of a chemical pulp such as LBKP and NBKP, a mechanical pulp such as GP, PGW, RMP, TMP, CTMP, CMP and CGP, a used-paper pulp such as DIP, or the like, and, if necessary, a matter manufactured by various kinds of devices such as a fourdrinier paper machine or a rotoformer paper machine by mixing additives known in the art, such as a pigment, a binder, a sizing agent, a settlement agent, a cationic agent, a strength additive for paper, or the like may be used. In addition to the aforementioned support, any matter of a synthetic paper and a plastic film sheet may be used, and it is preferred that the thickness of the support is 10 mm to 250 µm, and the basis weight thereof is 10 g/m² to 250 g/m².

The support may be provided with an ink-receiving layer and a backcoat layer at once, or may be provided with an ink-receiving layer and a backcoat layer after a size press or an anchor coat layer is formed by starch, polyvinyl alcohol or the like. Further, the support may be subjected to planarization treatment by a calender device such as a machine calender, a TG calender, or a soft calender. In the present invention, paper and plastic films in which polyolefins (for example, polyethylene, polystyrene, polyethylene terephthalate, polybutene, and a copolymer thereof) are laminated on both surfaces thereof are more preferably used as the support. It is preferred that a white pigment (e.g., titanium oxide or zinc oxide) or a coloring dye (e.g., cobalt blue, navy blue or neodymium oxide) is added to polyolefins.

The ink-receiving layer formed on the support contains a pigment or an aqueous binder. As the pigment, a white pigment is preferred, and examples of the white pigment may include an inorganic white pigment such as calcium carbonate, kaolin, talc, clay, diatomite, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and an organic pigment such as a styrene-based pigment, an acrylic pigment, a urea resin and a melamine resin. As the white pigment contained in the ink-receiving layer, a porous inorganic pigment is preferred, and in particular, for example, synthetic amorphous silica having a large fine pore area is appropriate. As the synthetic amorphous silica, any of silicic acid anhydride obtained by a dry manufacturing method and water-containing silicic acid obtained by a wet manufacturing method may be used. In particular, water-containing silicic acid is preferably used.

Examples of the aqueous binder contained in the ink-receiving layer may include water-soluble polymer such as polyvinyl alcohol, silanol denatured polyvinyl alcohol, starch, cationic starch, casein, gelatin, carboxymethyl cellulose, hydroxyethyl cellulose, polyvinylpyrrolidone, polyalkylene oxide and a polyalkylene oxide derivative, and a water dispersible polymer such as a styrenebutadiene latex and an acryl emulsion. The aqueous binder may be used either alone or in combination of two kinds or more thereof. In the present invention, among them, polyvinyl alcohol or silanol denatured polyvinyl alcohol is particularly suitable from the viewpoints of the attachment property to the pigment and the stripping fastness of an ink-receiving layer.

The ink-receiving layer may contain a mordant, an insolubilizer, a light fastness improving agent, a surfactant or other additives in addition to the pigment and the aqueous binder.

It is preferred that a mordant added to the ink-receiving layer is immobilized. To this end, a polymer-mordant is preferably used.

The polymer-mordant is described in Japanese Patent Application Laid-Open Nos. S48-28325, S54-74430, S54-124726, S55-22766, S55-142339, S60-23850, S60-23851, S60-23852, S60-23853, S60-57836, S60-60643, S60-118834, S60-122940, S60-122941, S60-122942, S60-235134 and H1-161236, and U.S. Pat. Nos. 2,484,430, 2,548,564, 3,148,061, 3,309,690, 4,115,124, 4,124,386, 4,193,800, 4,273,853, 4,282,305 and 4,450,224.

An image-receiving material including the polymer-mordant described on pages 212 to 215 of Japanese Patent Application Laid-Open No. H1-161236 is particularly preferred. If the polymer-mordant described in the aforementioned patent document is used, an image having an excellent image quality may be obtained, and the light fastness of the image is improved.

The insolubilizer is effective to insolubilization of the image, and it is particularly preferred that a cation resin is an insolubilizer. The cation resin may be polyamidepolyamineepichlorohydrin, polyethyleneimine, polyaminesulfone, dimethyldiallylammonium chloride polymer, cation polyacrylamide, colloidal silica or the like. Among the cation resins, polyamidepolyamineepichlorohydrin is particularly appropriate. The content of the cation resin is preferably 1% by mass to 15% by mass and particularly preferably 3% by mass to 10% by mass based on the total solid of the ink-receiving layer.

Examples of the light fastness improving agent may include zinc sulfide, zinc oxide, hindered amine-based antioxidant, a benzotriazole-based UV absorbent such as benzophenone, and the like. Among them, zinc sulfide is particularly appropriate.

The surfactant serves as a coating aid, a stripping improving agent, a slipping preventing agent or an antistatic agent. The surfactant is described in Japanese Patent Application Laid-Open Nos. S62-173463 and S62-183457. An organic fluoro compound may be used instead of the surfactant. It is preferred that the organic fluoro compound is hydrophobic. Examples of the organic fluoro compound include a fluorine-based surfactant, an oil phase fluorine-based compound (for example, fluorine oil), and a solid type fluorine compound resin (for example, a tetrafluoroethylene resin). The organic fluoro compound is described in Japanese Patent Publication No. S57-9053 (8th to 17th columns), and Japanese Patent Application Laid-Open Nos. S61-20994 and S62-135826. Other additives to be added to the ink-receiving layer may include a pigment dispersant, a thickener, an antifoaming agent, a dye, a fluorescent brightening agent, a preservative, a pH adjusting agent, a matting agent, a hardening agent or the like. Also, the ink-receiving layer may have one layer or two layers.

The backcoat layer may be provided into the recording paper and the recording film, and the component that may be added to the layer may be a white pigment, a water-based binder or other components. Examples of the white pigment contained in the backcoat layer may include a white inorganic pigment such as precipitated calcium carbonate, ground calcium carbonate, kaolin, talc, calcium sulfate, barium sulfate, titanium dioxide, zinc oxide, zinc sulfide, zinc carbonate, satin white, aluminum silicate, diatomite, calcium silicate, magnesium silicate, synthetic amorphous silica, colloidal silica, colloidal alumina, pseudo boehmite, aluminum hydroxide, alumina, lithopone, zeolite, hydrate halloysite, magnesium carbonate and magnesium hydroxide, an organic pigment such as a styrene-based plastic pigment, an acrylic plastic pigment, polyethylene, microcapsules, a urea resin and a melamine resin, and the like.

Examples of the water-based binder contained in the backcoat layer may include a water-soluble polymer such as a styrene/maleate copolymer, a styrene/acrylate copolymer, polyvinyl alcohol, silanol-modified polyvinyl alcohol, starch, cationic starch, casein, gelatin, carboxymethyl cellulose, hydroxyethyl cellulose and polyvinylpyrrolidone, a water-dispersible polymer such as a styrenebutadiene latex and an acryl emulsion, and the like. Examples of the other component contained in the backcoat layer may include an antifoaming agent, a defoaming agent an antifoaming agent, a dye, a fluorescent brightening agent, a preservative, an insolubilizer and the like.

Polymer latex may be added to a constitutional layer (including the backcoat layer) of the inkjet recording paper and the recording film. Polymer latex is used for the purpose of improvement in physical properties of the layer, such as dimensional stabilization, curling prevention, attachment prevention, and crack prevention of the layer. Polymer latex is described in Japanese Patent Application Laid-Open Nos. S62-245258, S62-136648 and S62-110066. When polymer latex having a low glass transition temperature (40° C. or less) is added to the layer including the mordant, cracks or curling of the layer may be prevented. Further, even though polymer latex having a high glass transition temperature is added to the backcoat layer, curling may be prevented.

The inkjet recording method using the ink of the present invention is not limited, and is used in a known manner, for example, a charge control manner discharging an ink using electrostatic force, a drop-on-demand manner (pressure pulse manner) using vibration pressure of a piezo element, a sound inkjet manner discharging an ink using radiation pressure by changing an electric signal into a sound beam and radiating the beam to the ink, a thermal inkjet manner using pressure generated by heating an ink to form bubbles, and the like.

In the inkjet recording method, a manner of injecting ink that is called photo ink at a low concentration in a plurality of small volumes, a manner of improving an image by using a plurality of inks having substantially the same color and different concentrations, and a manner of using colorless transport ink are included.

EXAMPLES

Hereinafter, the present invention will be described in more detail by the Examples but is not limited by the Examples.

<Preparation of the Ink Composition>

Each ink composition prepared based on the composition noted in Tables 4 to 10 below was stirred for 1 hour while heated at 30° C. to 40° C. Then, the resultant product was prepared with 10 mol/L of KOH so as to have pH=9, and filtered under reduced pressure with a micro-filter having an average pore size of 0.25 μm to prepare a magenta ink solution.

The values noted in Tables 4 to 10 below indicate mass ratios of respective components.

=Ink Solution A=

| | |
|---|---|
| Triethylene glycol monobutyl ether | 10 g |
| Glycerin | 10 g |
| Triethylene glycol | 5 g |
| Olfine E1010 (acetylene glycol-based surfactant, manufactured by Nissin Chemical Industry Co., Ltd) | 2 g |

TABLE 4

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Exemplary Compound (1) | 3.5 | 3.5 | 3.5 | 3.5 | 3.5 | 3.5 | | | 2.8 | 1.75 | 0.7 |
| Exemplary Compound (4) | | | | | | | 3.5 | | | | |
| Exemplary Compound (6) | | | | | | | | 3.5 | | | |
| Azo dye 1 | | | | | | | | | 0.7 | 1.75 | 2.8 |
| C. I. Acid Red 289 | | | | | | | | | | | |
| C. I. Acid Red 52 | | | | | | | | | | | |
| Copper (II) gluconate | 0.01 | 0.1 | 0.25 | 0.5 | 1.0 | 1.5 | 0.25 | 0.25 | 1.0 | 0.5 | 0.25 |
| Copper (II) disodium ethylenediaminetetraacetate | | | | | | | | | | | |
| Copper (II) chlorate | | | | | | | | | | | |
| Copper (II) salicylate | | | | | | | | | | | |
| Copper (II) formate | | | | | | | | | | | |
| Copper (II) acetate | | | | | | | | | | | |
| Copper (II) chloride | | | | | | | | | | | |
| Sodium gluconate | | | | | | | | | | | |
| tetrasodium ethylenediaminetetraacetate | | | | | | | | | | | |
| Nickel (II) disodium ethylenediaminetetraacetate | | | | | | | | | | | |
| Ink solution A | 27 | 27 | 27 | 27 | 27 | 27 | 27 | 27 | 27 | 27 | 27 |
| Water | Balance | Balance | Balance | Balance | Balance | Balance | Balance | Balance | Balance | Balance | Balance |
| Total | 100 | 100 | 100 | 100 | 100 | 100 | 100 | 100 | 100 | 100 | 100 |

TABLE 5

|  | Example 12 | Example 13 | Example 14 | Example 15 | Example 16 |
|---|---|---|---|---|---|
| Exemplary Compound (1) | 3.5 | 3.5 | 3.5 | 3.5 | 3.5 |
| Exemplary Compound (4) | | | | | |
| Exemplary Compound (6) | | | | | |
| Azo dye 1 | | | | | |
| C. I. Acid Red 289 | | | | | |
| C. I. Acid Red 52 | | | | | |
| Copper (II) gluconate | | | | | |
| Copper (II) disodium ethylenediaminetetraacetate | 0.25 | | | | |
| Copper (II) chlorate | | 0.25 | | | |
| Copper (II) salicylate | | | 0.25 | | |
| Copper (II) formate | | | | 0.25 | |
| Copper (II) acetate | | | | | 0.25 |
| Copper (II) chloride | | | | | |
| Sodium gluconate | | | | | |
| tetrasodium ethylenediaminetetraacetate | | | | | |
| Nickel (II) disodium ethylenediaminetetraacetate | | | | | |
| Ink solution A | 27 | 27 | 27 | 27 | 27 |
| Water | Balance | Balance | Balance | Balance | Balance |
| Total | 100 | 100 | 100 | 100 | 100 |

TABLE 6

|  | Example 17 | Example 18 | Example 19 | Example 20 | Example 21 | Example 22 |
|---|---|---|---|---|---|---|
| Exemplary Compound 1-1 | 3.5 | | | 2.8 | 1.75 | 0.7 |
| Exemplary Compound 1-4 | | 3.5 | | | | |
| Exemplary Compound 1-17 | | | 3.5 | | | |
| Azo dye 1 | | | | 0.7 | 1.75 | 2.8 |
| C. I. Acid Red 289 | | | | | | |
| C. I. Acid Red 52 | | | | | | |
| Copper (II) gluconate | 0.25 | 0.25 | 0.25 | 1.0 | 0.5 | 0.25 |
| Copper (II) disodium ethylenediaminetetraacetate | | | | | | |
| Copper (II) chlorate | | | | | | |
| Copper (II) salicylate | | | | | | |
| Copper (II) formate | | | | | | |
| Copper (II) acetate | | | | | | |
| Copper (II) chloride | | | | | | |
| Sodium gluconate | | | | | | |
| tetrasodium ethylenediaminetetraacetate | | | | | | |
| Nickel (II) disodium ethylenediaminetetraacetate | | | | | | |
| Ink solution A | 27 | 27 | 27 | 27 | 27 | 27 |
| Water | Balance | Balance | Balance | Balance | Balance | Balance |
| Total | 100 | 100 | 100 | 100 | 100 | 100 |

TABLE 7

|  | Example 23 | Example 24 | Example 25 | Example 26 | Example 27 | Example 28 | Example 29 | Example 30 | Example 31 | Example 32 |
|---|---|---|---|---|---|---|---|---|---|---|
| Exemplary Compound 1-1 | 3.5 | 3.5 | 3.5 | 3.5 | 3.5 | 3.5 | 3.5 | 3.5 | 3.5 | 3.5 |
| Exemplary Compound 1-4 | | | | | | | | | | |
| Exemplary Compound 1-17 | | | | | | | | | | |
| Azo dye 1 | | | | | | | | | | |
| C. I. Acid Red 289 | | | | | | | | | | |
| C. I. Acid Red 52 | | | | | | | | | | |
| Copper (II) gluconate | 0.01 | 0.1 | 0.5 | 1.0 | 1.5 | | | | | |
| Copper (II) disodium ethylenediaminetetraacetate | | | | | | 0.25 | | | | |
| Copper (II) chlorate | | | | | | | 0.25 | | | |
| Copper (II) salicylate | | | | | | | | 0.25 | | |
| Copper (II) formate | | | | | | | | | 0.25 | |
| Copper (II) acetate | | | | | | | | | | 0.25 |
| Copper (II) chloride | | | | | | | | | | |
| Sodium gluconate | | | | | | | | | | |
| tetrasodium ethylenediaminetetraacetate | | | | | | | | | | |
| Nickel (II) disodium ethylenediaminetetraacetate | | | | | | | | | | |
| Ink solution A | 27 | 27 | 27 | 27 | 27 | 27 | 27 | 27 | 27 | 27 |
| Water | Balance | Balance | Balance | Balance | Balance | Balance | Balance | Balance | Balance | Balance |
| Total | 100 | 100 | 100 | 100 | 100 | 100 | 100 | 100 | 100 | 100 |

TABLE 8

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Exemplary Compound (1) | 3.5 |  |  | 2.8 | 1.75 | 0.7 | 3.5 | 3.5 | 3.5 |
| Exemplary Compound (4) |  | 3.5 |  |  |  |  |  |  |  |
| Exemplary Compound (6) |  |  | 3.5 |  |  |  |  |  |  |
| Azo dye 1 |  |  |  | 0.7 | 1.75 | 2.8 |  |  |  |
| C. I. Acid Red 289 |  |  |  |  |  |  |  |  |  |
| C. I. Acid Red 52 |  |  |  |  |  |  |  |  |  |
| Copper (II) gluconate |  |  |  |  |  |  |  |  |  |
| Copper (II) disodium ethylenediaminetetraacetate |  |  |  |  |  |  |  |  |  |
| Copper (II) chlorate |  |  |  |  |  |  |  |  |  |
| Copper (II) salicylate |  |  |  |  |  |  |  |  |  |
| Copper (II) formate |  |  |  |  |  |  |  |  |  |
| Copper (II) acetate |  |  |  |  |  |  |  |  |  |
| Copper (II) chloride |  |  |  |  |  |  |  |  |  |
| Sodium gluconate |  |  |  |  |  |  | 0.5 |  |  |
| tetrasodium ethylenediaminetetraacetate |  |  |  |  |  |  |  | 0.5 |  |
| Nickel (II) disodium ethylenediaminetetraacetate |  |  |  |  |  |  |  |  | 0.5 |
| Ink solution A | 27 | 27 | 27 | 27 | 27 | 27 | 27 | 27 | 27 |
| Water | Balance | Balance | Balance | Balance | Balance | Balance | Balance | Balance | Balance |
| Total | 100 | 100 | 100 | 100 | 100 | 100 | 100 | 100 | 100 |

TABLE 9

|  | Comparative Example 10 | Comparative Example 11 | Comparative Example 12 | Comparative Example 13 | Comparative Example 14 | Comparative Example 15 |
|---|---|---|---|---|---|---|
| Exemplary Compound 1-1 | 3.5 |  |  | 2.8 | 1.75 | 0.7 |
| Exemplary Compound 1-4 |  | 3.5 |  |  |  |  |
| Exemplary Compound 1-17 |  |  | 3.5 |  |  |  |
| Azo dye 1 |  |  |  | 0.7 | 1.75 | 2.8 |
| C. I. Acid Red 289 |  |  |  |  |  |  |
| C. I. Acid Red 52 |  |  |  |  |  |  |
| Copper (II) gluconate |  |  |  |  |  |  |
| Copper (II) disodium ethylenediaminetetraacetate |  |  |  |  |  |  |
| Copper (II) chlorate |  |  |  |  |  |  |
| Copper (II) salicylate |  |  |  |  |  |  |
| Copper (II) formate |  |  |  |  |  |  |
| Copper (II) acetate |  |  |  |  |  |  |
| Copper (II) chloride |  |  |  |  |  |  |
| Sodium gluconate |  |  |  |  |  |  |
| tetrasodium ethylenediaminetetraacetate |  |  |  |  |  |  |
| Nickel (II) disodium ethylenediaminetetraacetate |  |  |  |  |  |  |
| Ink solution A | 27 | 27 | 27 | 27 | 27 | 27 |
| Water | Balance | Balance | Balance | Balance | Balance | Balance |
| Total | 100 | 100 | 100 | 100 | 100 | 100 |

TABLE 10

|  | Comparative Example 16 | Comparative Example 17 | Comparative Example 18 | Comparative Example 19 | Comparative Example 20 | Comparative Example 21 |
|---|---|---|---|---|---|---|
| Azo dye 1 | 3.5 |  |  | 3.5 |  |  |
| C. I. Acid Red 289 |  | 3.5 |  |  | 3.5 |  |
| C. I. Acid Red 52 |  |  | 3.5 |  |  | 3.5 |
| Copper (II) gluconate | 0.5 | 0.5 | 0.5 |  |  |  |
| Copper (II) disodium ethylenediaminetetraacetate |  |  |  |  |  |  |
| Copper (II) chlorate |  |  |  |  |  |  |
| Copper (II) salicylate |  |  |  |  |  |  |
| Copper (II) formate |  |  |  |  |  |  |

TABLE 10-continued

|  | Comparative Example 16 | Comparative Example 17 | Comparative Example 18 | Comparative Example 19 | Comparative Example 20 | Comparative Example 21 |
|---|---|---|---|---|---|---|
| Copper (II) acetate |  |  |  |  |  |  |
| Copper (II) chloride |  |  |  |  |  |  |
| Sodium gluconate |  |  |  |  |  |  |
| tetrasodium ethylenediaminetetraacetate |  |  |  |  |  |  |
| Nickel (II) disodium ethylenediaminetetraacetate |  |  |  |  |  |  |
| Ink solution A | 27 | 27 | 27 | 27 | 27 | 27 |
| Water | Balance | Balance | Balance | Balance | Balance | Balance |
| Total | 100 | 100 | 100 | 100 | 100 | 100 |

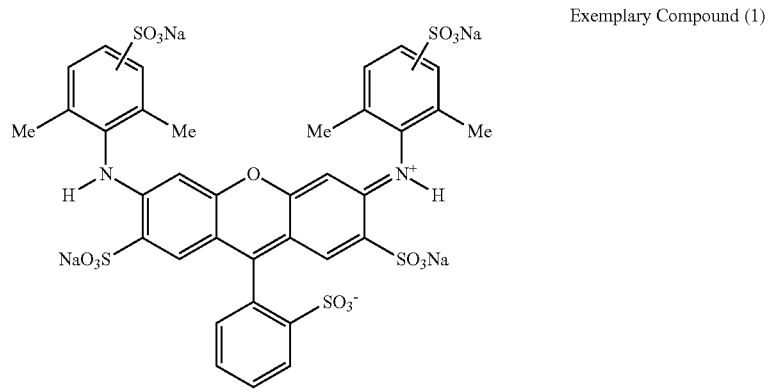

Exemplary Compound (1)

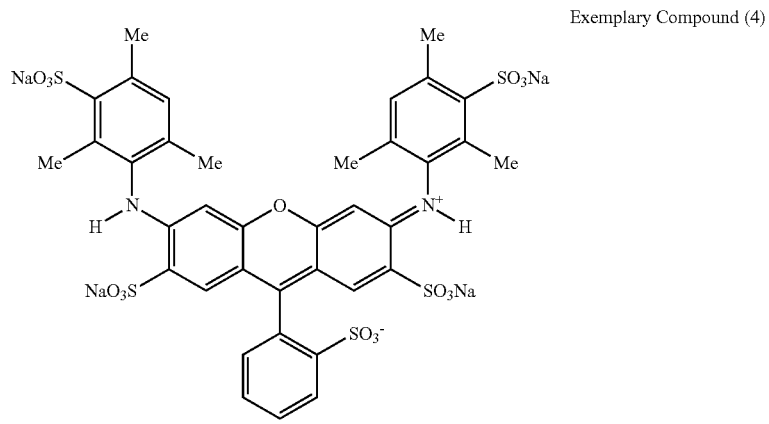

Exemplary Compound (4)

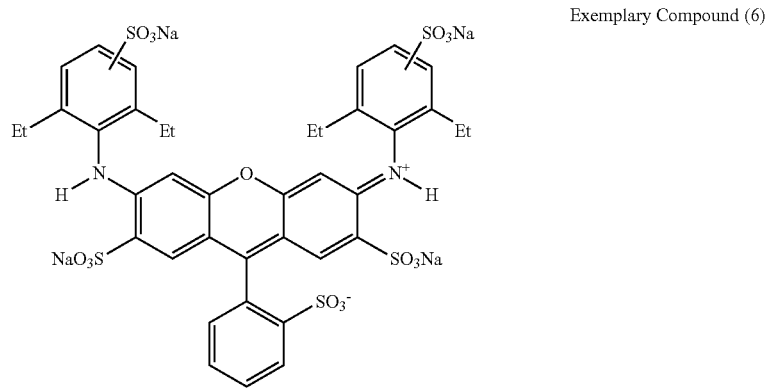

Exemplary Compound (6)

-continued
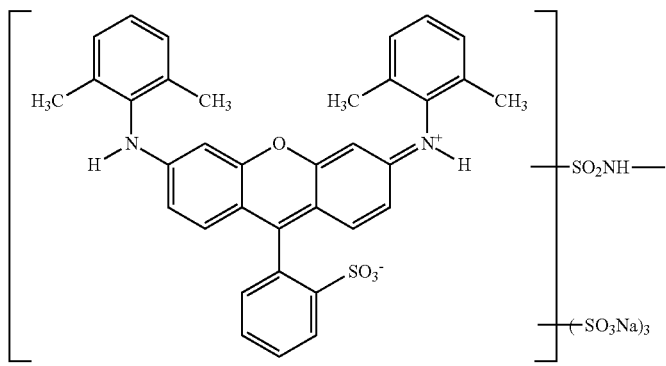
Exemplary Compound 1-1
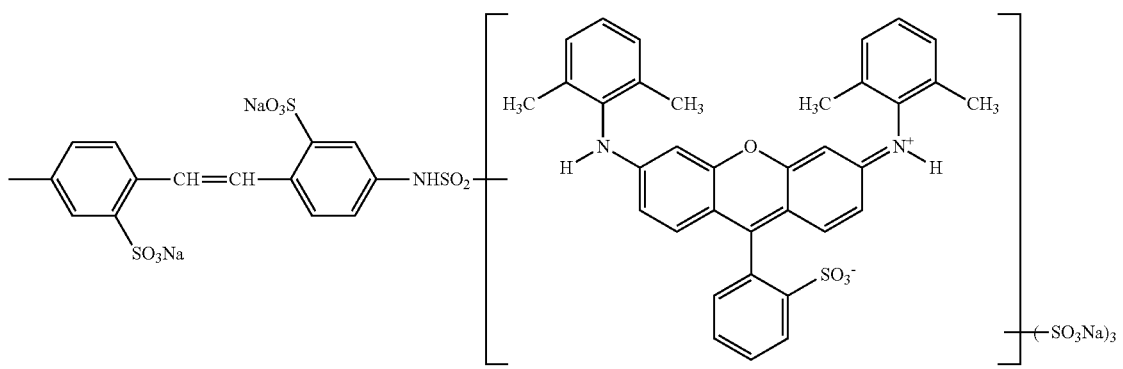
Exemplary Compound 1-4
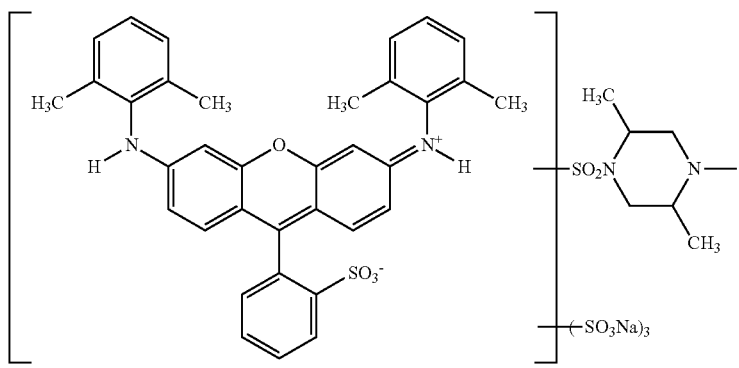
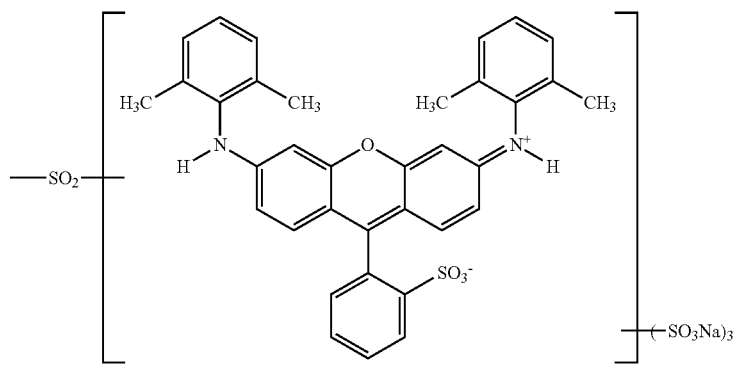

-continued
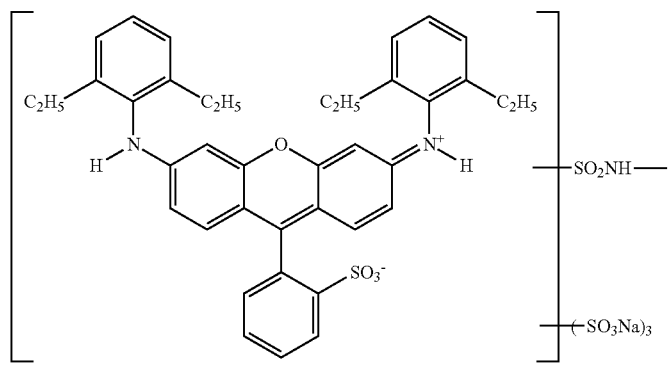
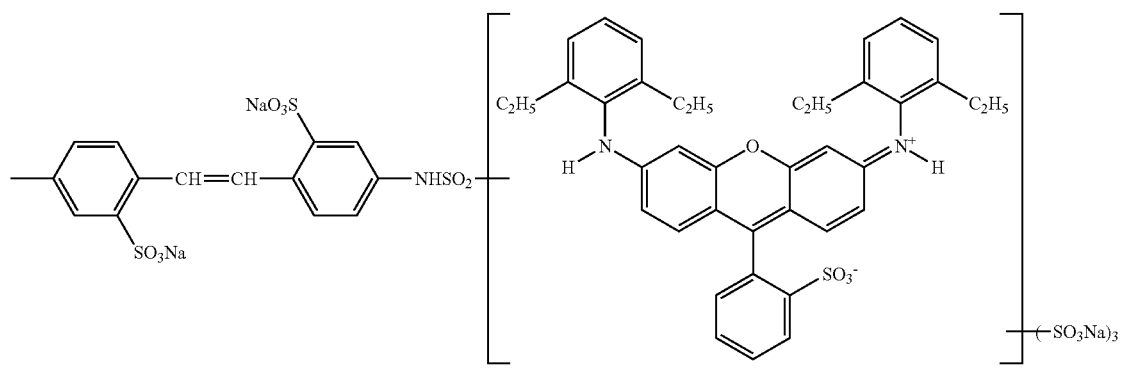
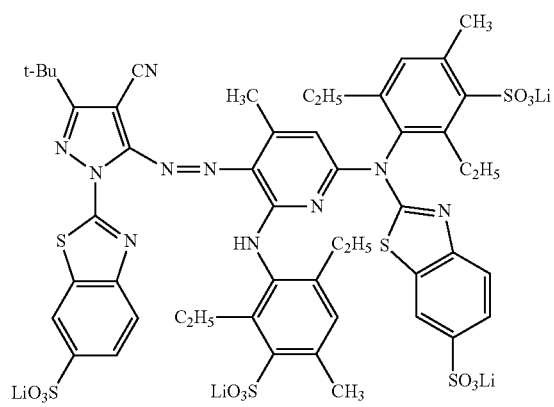
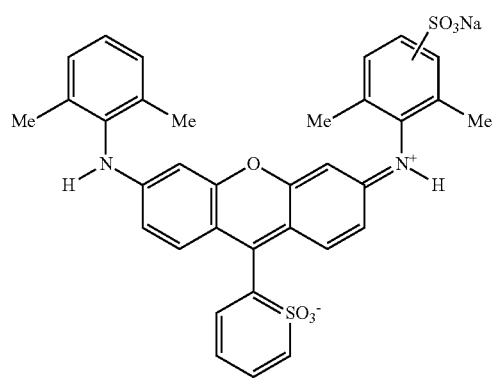
Exemplary Compound 1-17
Azo Dye (1)
C.I. Acid Red 289

-continued
C.I. Acid Red 52

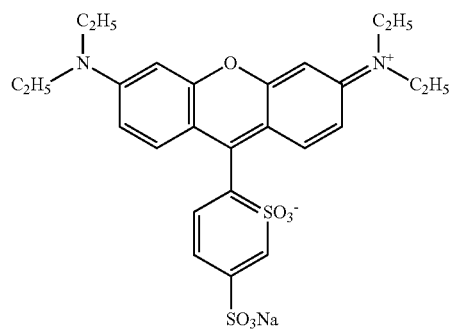

(Image Recording and Evaluation)

The following evaluation was performed on each ink for inkjet recording in Examples and Comparative Examples. The results are shown in Tables 11 to 18.

Further, in Tables 11 to 18, the hue, ozone fastness and light fastness were evaluated after using each ink for inkjet recording to record its image on a photo gloss paper (PM Photo paper <Glossy> (KA420PSK, EPSON) manufactured by EPSON Co., Ltd.) by an inkjet printer (PM-700C, manufactured by EPSON Co., Ltd.).

<Image Light Fastness>

Beta printing of Magenta was performed while an applied duty was adjusted so that OD (Optical Density) was within a range of 0.9 to 1.1. The obtained printed matter was exposed by using an Xenon light fastness tester XL-75s (trade name: manufactured by Suga Test Co., Ltd.), under conditions of 23° C., 50% R.H., and 75000 lux for 20 days.

After the exposure, an OD value of the printed matter was measured using reflection densitometry ("Spectrilino" (trade name: manufactured by Gretag), and the ratio of relict optical density (ROD) was obtained by using the following Equation. Then, the light fastness was tested by the following judgment criteria.

ROD(%)=(D/D0)×100

D: the OD value after the exposure test D0: the OD value before the exposure test (measurement condition: light source; D50, viewing angle; 2°, DIN-NB)

S: ROD is 95% or more
A: ROD is 90% or more and less than 95%
B: ROD is 80% or more and less than 90%
C: ROD is 70% or more and less than 80%
D: ROD is 60% or more and less than 70%
E: ROD is less than 60%<

<Improvement Degree of Image Light Fastness>

Compared with an "ink not added with the copper compound", an "ink added with the copper compound" which shows a higher image light fastness grade by 2 or more grades was evaluated as A, an "ink added with the copper compound" which shows a higher grade by 1 grade was evaluated as B, and an "ink added with the copper compound" which shows the same grade as that of the "ink not added with the copper compound" was evaluated as C. The case where image light fastness is lowered by adding the copper compound was evaluated as D.

Also, for the test, Comparative Example 1 was set as the "ink not added with the copper compound" with respect to Examples 1 to 6 and Examples 12 to 16, Comparative Example 2 was set as the "ink not added with the copper compound" with respect to Example 7, Comparative Example 3 was set as the "ink not added with the copper compound" with respect to Example 8, Comparative Examples 4, 5 and 6 were set as the "inks not added with the copper compound" with respect to Examples 9, 10 and 11, respectively, Comparative Examples 10, 11 and 12 were set as the "inks not added with the copper compound" with respect to Examples 17, 18 and 19, respectively, Comparative Examples 13, 14 and 15 were set as the "inks not added with the copper compound" with respect to Examples 20, 21 and 22, respectively, Comparative Example 10 was set as the "ink not added with the copper compound" with respect to Examples 23 to 32, and Comparative Examples 19, 20 and 21 were set as the "inks not added with the copper compound" with respect to Comparative Examples 16, 17 and 18, respectively.

<Hue>

The hue was evaluated by a three-stage rating, specifically best, good and poor by naked eyes. In Tables 11 to 18 below, A denotes that the hue is the best, B denotes that the hue is good and C denotes that the hue is poor.

<Ozone Fastness>

In a box set to an ozone gas concentration of 0.5±0.1 ppm, room temperature and dark place using a Siemens-type ozonizer to which an a.c. voltage of 5 kV was applied while passing a dry air through the double glass tube, the photo gloss paper having the image formed thereon was left standing for 7 days. The image density before and after standing in an ozone gas atmosphere was measured by a reflection densitometer (X-Rite 310TR) and evaluated as the colorant residual ratio. The reflection density was measured at one point of 1. The ozone gas concentration in the box was set using an ozone gas monitor (Model OZG-EM-01) manufactured by APPLICS.

S: ROD is 95% or more
A: ROD is 90% or more and less than 95%
B: ROD is 80% or more and less than 90%
C: ROD is 70% or more and less than 80%
D: ROD is 60% or more and less than 70%
E: ROD is less than 60%<

<Stability Over Time>

The prepared ink solution was left at room temperature for 2 weeks, and it was observed if there exist precipitates, turbidity or the like with eyes by projecting a 200 W fluorescent lamp. The ink solution was evaluated by three grades: solution has no precipitation or turbidity at all was evaluated as A, solution has no positive precipitation but slight turbidity was evaluated as B, and solution has positive precipitation was evaluated as C.

TABLE 11

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Light fastness | A | A | A | A | S | S | A | A | S | S | S |
| Improvement degree of light fastness | B | B | B | B | A | A | B | B | B | B | B |
| Ozone fastness | S | S | S | S | S | S | S | S | S | S | S |
| Hue | A | A | A | A | A | A | A | A | A | A | A |
| Stability over time | A | A | A | A | A | A | A | A | A | A | A |

TABLE 12

|  | Example 12 | Example 13 | Example 14 | Example 15 | Example 16 |
|---|---|---|---|---|---|
| Light fastness | A | A | A | A | A |
| Improvement degree of light fastness | B | B | B | B | B |
| Ozone fastness | S | S | S | S | S |
| Hue | A | A | A | A | A |
| Stability over time | A | A | A | A | A |

TABLE 13

|  | Example 17 | Example 18 | Example 19 | Example 20 | Example 21 | Example 22 |
|---|---|---|---|---|---|---|
| Light fastness | A | A | A | S | S | S |
| Improvement degree of light fastness | A | A | A | A | B | B |
| Ozone fastness | S | S | S | S | S | S |
| Hue | A | A | A | A | A | A |
| Stability over time | A | A | A | A | A | A |

TABLE 14

|  | Example 23 | Example 24 | Example 25 | Example 26 | Example 27 |
|---|---|---|---|---|---|
| Light fastness | B | A | A | A | A |
| Improvement degree of light fastness | B | A | A | A | A |
| Ozone fastness | S | S | S | S | S |
| Hue | A | A | A | A | A |
| Stability over time | A | A | A | A | A |

TABLE 15

|  | Example 28 | Example 29 | Example 30 | Example 31 | Example 32 |
|---|---|---|---|---|---|
| Light fastness | A | A | A | A | A |
| Improvement degree of light fastness | A | A | A | A | A |
| Ozone fastness | S | S | S | S | S |
| Hue | A | A | A | A | A |
| Stability over time | A | A | A | A | A |

TABLE 16

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Light fastness | B | B | B | A | A | A | D | C | B |
| Improvement degree of light fastness | — | — | — | — | — | — | — | — | — |
| Ozone fastness | S | S | S | S | S | S | S | S | S |
| Hue | A | A | A | A | A | A | A | A | A |
| Stability over time | A | A | A | A | A | A | A | A | A |

TABLE 17

|  | Comparative Example 10 | Comparative Example 11 | Comparative Example 12 | Comparative Example 13 | Comparative Example 14 | Comparative Example 15 |
|---|---|---|---|---|---|---|
| Light fastness | C | C | C | B | A | A |
| Improvement degree of light fastness | — | — | — | — | — | — |
| Ozone fastness | S | S | S | S | S | S |
| Hue | A | A | A | A | A | A |
| Stability over time | A | A | A | A | A | A |

TABLE 18

|  | Comparative Example 16 | Comparative Example 17 | Comparative Example 18 | Comparative Example 19 | Comparative Example 20 | Comparative Example 21 |
|---|---|---|---|---|---|---|
| Light fastness | S | C | E | S | B | C |
| Improvement degree of light fastness | C | D | D | — | — | — |
| Ozone fastness | S | D | E | S | D | E |
| Hue | B | A | A | B | A | A |
| Stability over time | A | C | C | A | A | A |

As seen from the results, the ink of Examples, in which the coloring composition of the present invention including the compound represented by Formula (1) or Formula (4), and the copper compound is used, may improve the light fastness, and also is excellent in stability over time without degrading hue, and an ozone fastness.

While the present invention has been shown and described with reference to certain exemplary embodiments thereof, it will be understood by those skilled in the art that various changes modifications may be made therein without departing from the spirit and scope of the present invention as defined by the appended claims.

What is claimed is:

1. A coloring composition comprising:
a compound represented by Formula (1) or Formula (4); and
a copper compound that is soluble in water:

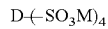

Formula (1)

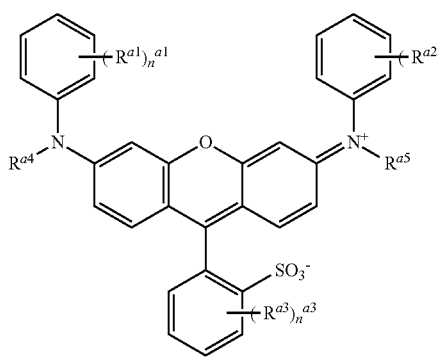

Formula (2)

wherein, in Formula (1),
D represents a residue structure in which four hydrogen atoms are removed from the compound represented by Formula (2),
M represents a hydrogen atom or a counteraction, and a plurality of M may be the same or different,
in Formula (2),
$R^{a1}$, $R^{a2}$ and $R^{a1}$ each independently represent a monovalent substituent,
$R^{a4}$ and $R^{a5}$ each independently represent a hydrogen atom or a monovalent substituent,
$n^{a1}$ and $n^{a2}$ each independently represent the number of 0 to 5, and $n^{a3}$ represents the number of 0 to 4, and
when $n^{a1}$, $n^{a2}$ and $n^{a3}$ each represent the number of 2 or more, each of pluralities of $R^{a1}$, $R^{a2}$ and $R^{a3}$ may be the same or different:

Formula (4)

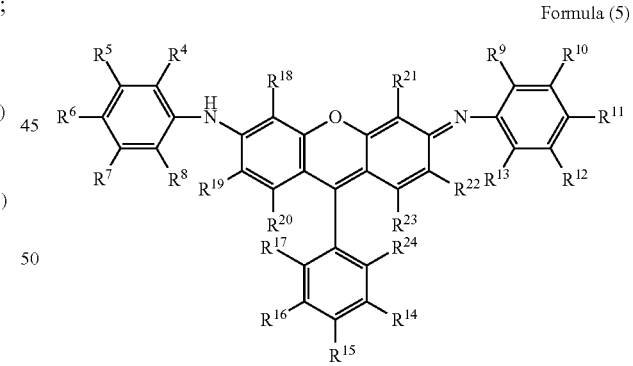

Formula (5)

wherein in Formula (4),
L represents a di- to tetravalent linking group,
D' represents a residue structure in which one hydrogen atom is removed or two, three, four, or five hydrogen atoms are removed, from the compound represented by Formula (5),
m represents an integer of 1 to 10, provided that a plurality of L may be the same or different when m represents an integer of 2 to 10,
n represents an integer of 2 to 10, provided that a plurality of D' may be the same or different,
in Formula (5), $R^4$ to $R^{24}$ each independently represent a hydrogen atom or a substituent, and Formula (5) has at least one ionic hydrophilic group.

2. The coloring composition according to claim 1, wherein the compound represented by Formula (1) is a compound represented by Formula (3):

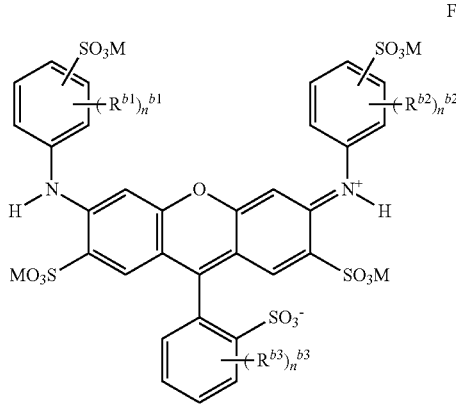

Formula (3)

wherein in Formula (3), $R^{b1}$, $R^{b2}$ and $R^{b3}$ each independently represent a monovalent substituent;

$n^{b1}$ and $n^{b2}$ each independently represent the number of 0 to 4, and $n^{b3}$ represents the number of 0 to 4;

when $n^{b1}$, $n^{b2}$ and $n^{b3}$ each represent the number of 2 or more, each of pluralities of $R^{b1}$, $R^{b2}$ and $R^{b3}$ may be the same or different, and M represents a hydrogen atom or a counteraction, and a plurality of M may be the same or different.

3. The coloring composition according to claim 1, wherein $R^{a1}$, $R^{a2}$, $R^{a3}$, $R^{b1}$, $R^{b2}$ and $R^{b3}$ each independently represent an alkyl group or an acylamino group.

4. The coloring composition according to claim 1, wherein $R^{a1}$, $R^{a2}$, $R^{a3}$, $R^{b1}$, $R^{b2}$ and $R^{b3}$ each independently represent an alkyl group having 1 to 6 carbon atoms.

5. The coloring composition according to claim 1, wherein $n^{a1}$, $n^{a1}$, $n^{b1}$ and $n^{b2}$ each independently represent the number of 2 to 4.

6. The coloring composition according to claim 1, wherein $n^{a3}$ and $n^{b3}$ represent 0.

7. The coloring composition according to claim 1, wherein M is one selected from the group consisting of lithium ion, a sodium ion, and a potassium ion.

8. The coloring composition according to claim 1, wherein $R^4$, $R^8$, $R^9$ and $R^{13}$ in Formula (5) each independently represent a hydrogen atom or an alkyl group.

9. The coloring composition according to claim 1, wherein $R^5$ to $R^7$, $R^{10}$ to $R^{12}$ and $R^{14}$ to $R^{23}$ in Formula (5) represent a hydrogen atom.

10. The coloring composition according to claim 9, wherein D' represents a residue structure in which one hydrogen atom is removed or two, three, four, or five hydrogen atoms are removed, from the hydrogen atoms as $R^5$ to $R^7$, $R^{10}$ to $R^{12}$, $R^{19}$, $R^{22}$ or $R^{24}$ in the compound represented by Formula (5).

11. The coloring composition according to claim 1, wherein the copper compound is at least one kind selected from the group consisting of copper (II) chlorate, copper (II) chloride, copper (II) salicylate, copper (II) gluconate, copper (II) formate, copper (II) disodium ethylenediaminetetraacetate, and copper (II) acetate.

12. The coloring composition according to claim 1, wherein the compound represented by Formula (1) or Formula (4) is contained in an amount of 1% by mass to 20% by mass.

13. The coloring composition according to claim 1, wherein a mass ratio of a content of the compound represented by Formula (1) or Formula (4) to a content of the copper compound that is soluble in water is 350/1 to 7/3.

14. An ink for inkjet recording comprising the coloring composition according to claim 1.

15. An inkjet recording method comprising forming an image by using the coloring composition according to claim 1.

16. An inkjet recording method comprising forming an image by using the ink for inkjet recording according to claim 14.

* * * * *